(12) United States Patent  
Zhu

(10) Patent No.: US 11,140,602 B2  
(45) Date of Patent: Oct. 5, 2021

(54) END MARKER SENDING METHOD

(71) Applicant: HUAWEI TECHNOLOGIES CO., LTD., Guangdong (CN)

(72) Inventor: Qianghua Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 16/573,433

(22) Filed: Sep. 17, 2019

(65) Prior Publication Data

US 2020/0015138 A1      Jan. 9, 2020

Related U.S. Application Data

(63) Continuation of application No. PCT/CN2017/077123, filed on Mar. 17, 2017.

(51) Int. Cl.
*H04W 36/22* (2009.01)
*H04W 28/02* (2009.01)
(Continued)

(52) U.S. Cl.
CPC ....... *H04W 36/22* (2013.01); *H04W 28/0263* (2013.01); *H04W 36/0016* (2013.01); *H04W 40/36* (2013.01); *H04W 80/10* (2013.01)

(58) Field of Classification Search
CPC ..... H04W 80/10; H04W 36/22; H04W 40/36; H04W 36/12; H04W 28/0263; H04W 36/0016; H04W 28/02; H04W 36/00
(Continued)

(56) References Cited

U.S. PATENT DOCUMENTS 7,350,070 B2 *   3/2008   Smathers .............. H04L 9/0643
                                                          713/150
8,837,310 B2 *   9/2014   Wang ....................... H04J 3/06
                                                          370/252
(Continued)

FOREIGN PATENT DOCUMENTS

CN         101572928 A        11/2009
CN         102045802 A         5/2011

OTHER PUBLICATIONS

3GPP TS 23.214 V0.1.0 (Jul. 2016), "3rd Generation Partnership Project; Technical Specification Group Services and System Aspects;Architecture enhancements for control and user plane separation of EPC nodes; Stage 2 (Release 14)," 22 Jul. 2, 2016, XP051138920, 34 pages.
(Continued)

*Primary Examiner* — Man U Phan
(74) *Attorney, Agent, or Firm* — Fish & Richardson P.C.

(57) ABSTRACT

Example end marker sending methods are described. In one example method, a user plane gateway (UP GW) determines when to send an end marker based on trigger information, so as to sort one or more downlink data packets received on a target user plane path based on the end marker. The UP GW receives trigger information and an identifier (ID) of a source user plane path of user equipment (UE) that are sent by a control plane (CP) node, where the UP GW is located on the source user plane path. The UP GW sends an end marker to an access network (AN) node on the source user plane path based on the trigger information and the ID of the source user plane path.

13 Claims, 28 Drawing Sheets

(51) Int. Cl.
  *H04W 36/00* (2009.01)
  *H04W 40/36* (2009.01)
  *H04W 80/10* (2009.01)
(58) Field of Classification Search
  USPC .......................................................... 370/331
  See application file for complete search history.

(56) References Cited

U.S. PATENT DOCUMENTS

| | | | | |
|---|---|---|---|---|
| 8,902,852 | B2* | 12/2014 | Jaiswal | H04W 36/023 370/331 |
| 9,538,563 | B2* | 1/2017 | Wang | H04W 40/04 |
| 10,264,501 | B2* | 4/2019 | Shi | H04W 36/38 |
| 10,419,982 | B1* | 9/2019 | Gundavelli | H04L 47/825 |
| 10,524,173 | B2* | 12/2019 | Nagesh Shetigar | H04J 11/00 |
| 10,524,176 | B2* | 12/2019 | Decarreau | H04W 36/30 |
| 10,660,006 | B2* | 5/2020 | Shi | H04W 36/28 |
| 10,667,187 | B2* | 5/2020 | Zhu | H04W 36/06 |
| 10,716,045 | B2* | 7/2020 | Allan | H04W 36/0055 |
| 2010/0111041 | A1 | 5/2010 | Lim et al. | |
| 2012/0294276 | A1* | 11/2012 | Jaiswal | H04W 36/023 370/331 |
| 2013/0058308 | A1* | 3/2013 | Jaiswal | H04L 47/34 370/331 |
| 2016/0127959 | A1* | 5/2016 | Miao | H04W 36/12 370/331 |
| 2019/0261246 | A1* | 8/2019 | Zhu | H04W 68/005 |
| 2019/0327648 | A1* | 10/2019 | Gundavelli | H04W 36/023 |
| 2019/0394669 | A1* | 12/2019 | Han | H04W 28/0268 |
| 2020/0092302 | A1* | 3/2020 | Xiao | H04L 63/1441 |

OTHER PUBLICATIONS

Extended European Search Report issued in European Application No. 17900529.3 dated Dec. 6, 2019, 9 pages.
R3-100855—Motorola:, "End marker clarification, Missing procedures and Init Context Setup cleanup," 3GPP Draft; 3GPP TSG-RAN WG3 Meeting #67, San Francisco, USA, Feb. 22-26, 2010, XP050424684, 8 pages.
R3-170492—LG Electronics Inc, "Evaluation and Conclusion for Intra-system mobility procedures," 3GPP Draft; 3GPP TSG-RAN Meeting #95, Athens, Greece, Feb. 13-17, 2017, XP051213079, 4 pages.
S2-164799—Huawei et al, "Update of Sending of End Marker Solution," 3GPP Draft; SA WG2 Meeting #116BIS, Sanya, P.R. China, Aug. 29-Sep. 2, 2016, XP051141647, 2 pages.
5G network excellent mercenary, "How powerful is the 5G with 1 millisecond delay?", Jul. 29, 2016, [Retrieved on Nov. 13, 2019], retrieved from: URL <https://chuansongme.com/n/613265943333>, 5 pages.
3GPP TS 23.214 V14.2.0 (Mar. 2017),3rd Generation Partnership Project;Technical Specification Group Services and System Aspects;Architecture enhancements for control and user plane separation of EPC nodes;Stage 2 (Release 14), Mar. 2017, 78 pages.
3GPP TR 23.799 V14.0.0 (Dec. 2016), 3rd Generation Partnership Project;Technical Specification Group Services and System Aspects;Study on Architecture for Next Generation System(Release 14), Dec. 2016, 522 pages.
PCT International Search Report and Written Opinion in International Application No. PCT/CN2017/077,123, dated Dec. 20, 2017, 23 pages (With English Translation).
Guangqiao et al, "Research of Traffic Flow Template in EPS System" 2012, 3 pages (With English Abstract).
Office Action issued in Chinese Application No. 201780084718.5 dated Feb. 3, 2020, 36 pages (With English Translation).

* cited by examiner

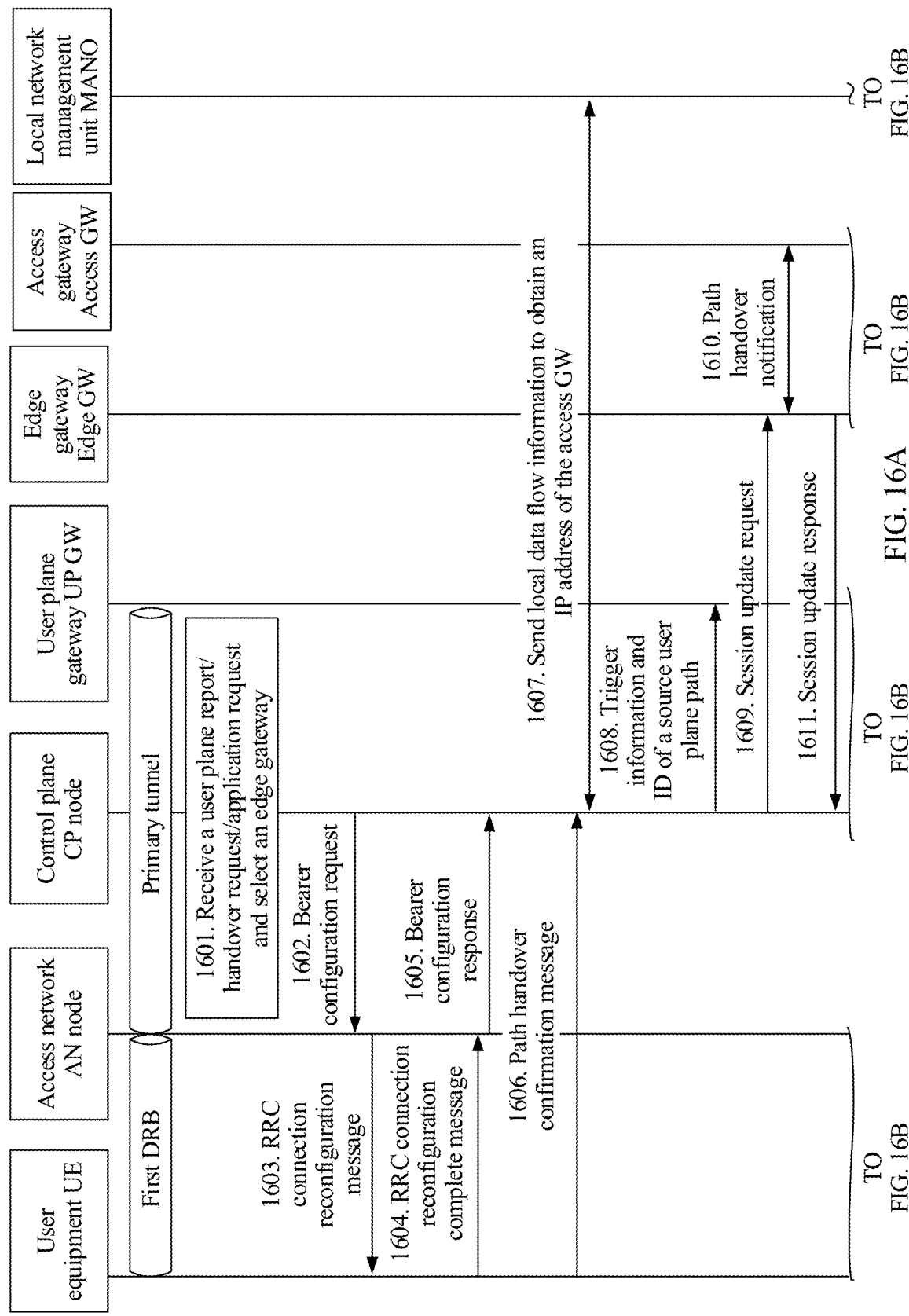

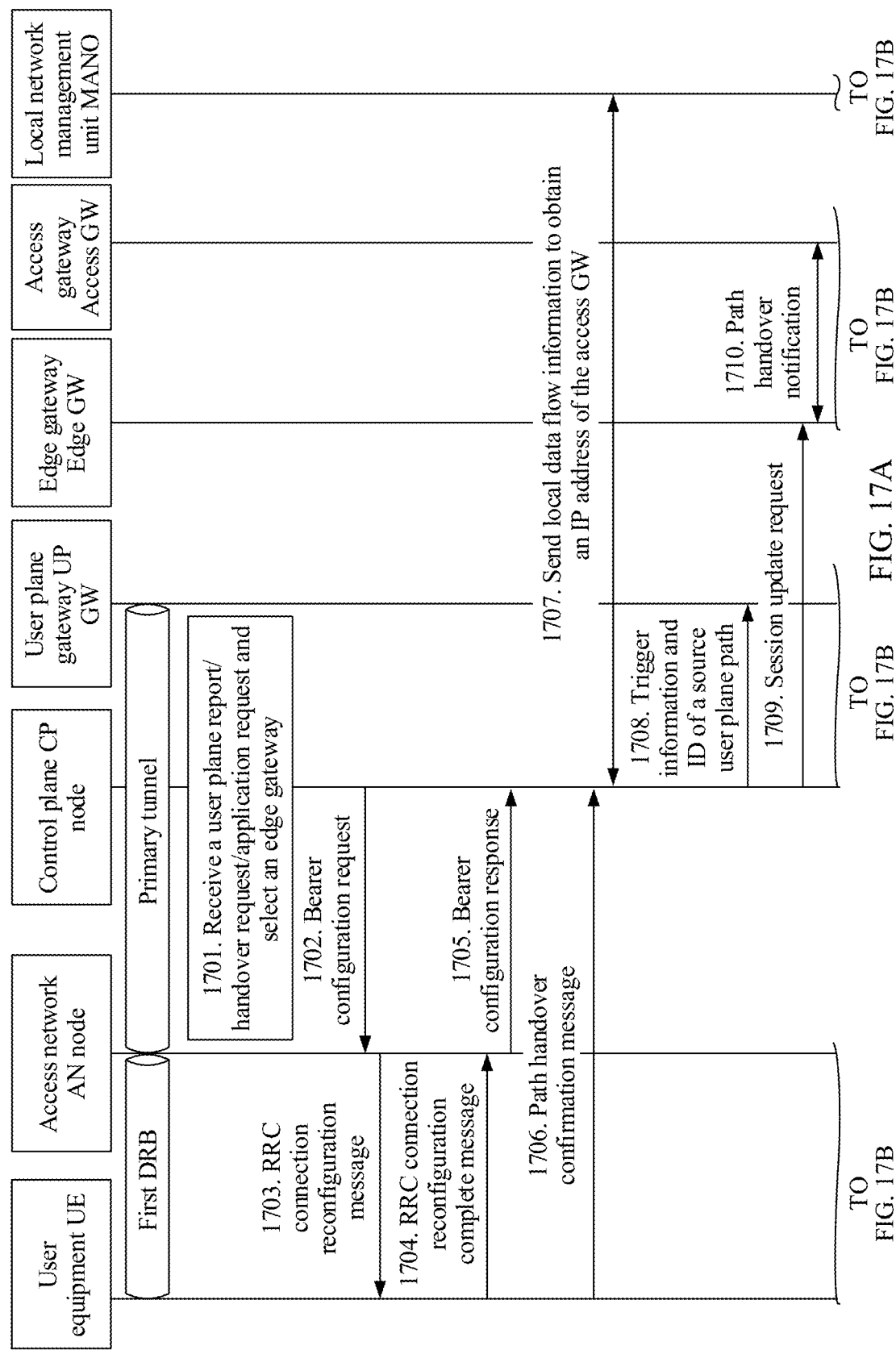

END MARKER SENDING METHOD

CROSS-REFERENCE TO RELATED APPLICATIONS

This application is a continuation of International Application No. PCT/CN2017/077123, filed on Mar. 17, 2017, the disclosure of which is hereby incorporated by reference in its entirety.

TECHNICAL FIELD

This application relates to the communications field, and in particular, to an end marker sending method, a control plane node, a user plane gateway, an access gateway, and an access network node.

BACKGROUND

In a conventional evolved packet system (EPS), a user plane path of user equipment (UE) is reselected in a handover process. For example, the UE is handed over from a source base station to a target base station. In this case, a user plane gateway (serving gateway/packet data network gateway) of the UE remains unchanged, that is, a user plane gateway on a source user plane path is the same as a user plane gateway on a target user plane path. To assist the target base station of the UE in sorting downlink data, after handover is completed, the user plane gateway immediately sends an end marker on the source user plane path to indicate that sending of downlink data on the source user plane path ends, and then sends, to the UE through the target user plane path, downlink data sent by a data network.

In a 5G mobile network, to obtain a user plane path (data path) with a low latency and high bandwidth, a core network control plane may select an edge gateway for a local data flow of the UE through path reselection, to route the local data flow to the UE, that is, the user plane gateway changes. For example, before the path reselection, the local data flow can reach the UE by using the Internet. After the path reselection, the local data flow may directly reach the UE by using the edge gateway, thereby avoiding an Internet latency and reducing a transmission latency of the local data flow. The local data flow is a data packet sent by a local network. Specifically, a path reselection process of the UE may include two scenarios shown in FIG. 1 and FIG. 2. As shown in FIG. 1, the UE is handed over from a source access network (AN) node to a target AN node, and the UE is handed over from a user plane gateway (UP GW) to an edge gateway. As shown in FIG. 2, a control plane node selects a more effective data path for the local data flow of the UE without changing an AN node of the UE, and changes only a user plane gateway in a core network to make the UE closer to the local network.

However, a downlink data sorting problem still exists in the scenarios shown in FIG. 1 and FIG. 2. It is roughly estimated that there is 50 Mb residual data on the Internet in the scenario shown in FIG. 1, and there is 15 Mb residual data on the Internet (a parameter data amount in the EPS system is 5 Mb) in the scenario shown in FIG. 2. This has a great impact on mobile edge computing (MEC) services having session and service continuity, such as the Internet of vehicles, an augmented reality (AR) technology, and a mobile game. However, because a gateway of the UE changes, a source user plane gateway does not know when sending of the residual data on the Internet ends, and therefore cannot determine when to send an end marker to indicate that sending of the local data flow (and a residual data flow on the Internet) on the source user plane path ends. For example, if the end marker is sent before sending of the residual data on the Internet is completed, this part of residual data is lost, making it difficult for the UE to sort downlink data on the target user plane path.

SUMMARY

Embodiments of this application provide an end marker sending method that is used by a user plane gateway to determine, based on trigger information, when to send an end marker, so as to sort, based on the end marker, one or more downlink data packets received on a target user plane path.

A first aspect of the embodiments of this application provides an end marker sending method. The method may be applied to a user plane path handover process of UE, and the method may include the following: A control plane (CP) node selects an edge gateway based on a path handover request, a handover notification, or the like. The control plane (CP) node sends a session update request to the edge gateway. The control plane (CP) node receives a session update response fed back by the edge gateway. The session update response includes an identifier (ID) of a source user plane path of the user equipment (UE) or an ID of a target user plane path of the UE, the source user plane path includes a user plane gateway (UP GW), and the target user plane path includes the edge gateway. The CP node sends trigger information and the ID of the source user plane path to the UP GW based on the session update response. The trigger information and the ID of the source user plane path are used by the UP GW to send an end marker to an access network (AN) node on the source user plane path. When an AN node on the source user plane path is the same as that on the target user plane path, the source user plane path is a path including the UE, the AN, the UP GW, and an access gateway (access GW), and the target user plane path is a path including the UE, the AN, the edge gateway (edge GW), and an access GW. Alternatively, when an AN node on the source user plane path is different from that on the target user plane path, the source user plane path is a path including the UE, an AN 1, the UP GW, and an access GW, and the target user plane path is a path including the UE, an AN 2, the edge GW, and an access GW.

In this embodiment of this application, the CP node may send the trigger information and the ID of the source user plane path to the UP GW based on the session update response. In this way, the UP GW may determine, based on the trigger information and the ID of the source user plane path, when to send the end marker, so as to reduce a probability that a downlink data packet on the source user plane path is lost due to user plane path handover for the UE, thereby effectively assisting the AN or a target AN in sorting one or more downlink data packets received on the target user plane path.

Optionally, in some embodiments of this application, the trigger information may include at least one of a first traffic flow template and a timer parameter.

In this embodiment of this application, the trigger information is further described, and several optional implementations are provided. The trigger information may include the first traffic flow template, or the first traffic flow template and the timer parameter, or the timer parameter, or another indication identifier. The first traffic flow template is used to identify an end data packet.

Optionally, in some embodiments of this application, the method may further include the following: The CP node may select an edge gateway based on a path handover request, an application request, or a user plane report, and the CP node further needs to send a flow handover indication message to the AN node. The flow handover indication message includes the ID of the source user plane path, and the flow handover indication message is used to instruct the AN node to determine, when the end marker is received, whether one or more downlink data packets received by the AN node on the source user plane path are successfully sent to the UE. The embodiments of this application may be applied to a case in which the AN node on the source user plane path is the same as that on the target user plane path, a first bearer is between the AN node and the UE on the source user plane path, and a second bearer is between the AN node and the UE on the target user plane path.

It should be understood that the one or more downlink data packets received by the AN node may include a local data flow or an Internet data flow. The local data flow is a data packet sent by a local network through the Internet, and the Internet data flow is a data packet sent by the Internet. This embodiment of this application is specific to path handover for the local data flow, but the AN node cannot identify the local data flow. Consequently, if the local data flow on the source user plane path fails to be sent to the UE, when the AN node sorts the received one or more downlink data packets on the target user plane path based on the end marker, the local data flow on the source user plane path is lost. Therefore, when the AN node receives the flow handover indication message, the AN node may send, on the first bearer between the AN node and the UE, the one or more downlink data packets (the local data flow and/or the Internet data flow) received by the AN node on the source user plane path. If all the one or more downlink data packets are successfully sent to the UE, it is ensured that the local data flow on the source user plane path is not lost. Then the AN node sorts, based on the end marker, the one or more downlink data packets received on the target user plane path.

Optionally, in some embodiments of this application, because the AN node cannot identify a local data flow, when a path handover resource is prepared, an offloading node may be selected from a core network, and the offloading node identifies the local data flow. Herein, the offloading node is described by using the UP GW as an example. The method may further include the following: The CP node sends a first flow handover indication message to the AN node. The first flow handover indication message includes the ID of the source user plane path, and the first flow handover indication message is used to instruct the AN node to send one or more downlink data packets received by the AN node on the source user plane path to the UP GW. Because the AN node cannot identify the local data flow, the CP node sends the first flow handover indication message to the AN node, so that the AN node may forward the one or more downlink data packets received on the source user plane path to the UP GW for identification. The CP node further sends a second flow handover indication message to the UP GW. The second flow handover indication message includes the ID of the source user plane path and a second traffic flow template, and the second flow handover indication message is used to instruct the UP GW to identify, based on the second traffic flow template and the ID of the source user plane path, a data packet sent by a local network from the one or more downlink data packets received by the UP GW on the source user plane path, and send the identified data packet to the edge gateway. The edge gateway is located on the target user plane path. The embodiments of this application may be applied to a case in which the AN node on the source user plane path is the same as that on the target user plane path, a first bearer is between the AN node and the UE on the source user plane path, and a second bearer is between the AN node and the UE on the target user plane path.

In this embodiment of this application, because the AN node cannot identify the local data flow from the one or more downlink data packets received on the source user plane path, the AN node selects the offloading node UP GW for identification. The CP node sends the first flow handover indication message to the AN node, so that the AN node forwards the one or more downlink data packets received on the source user plane path to the UP GW for identification. However, the UP GW has no traffic flow template for identifying the local data flow. Therefore, the CP node sends the second flow handover indication message to the UP GW. The second flow handover indication message includes the second traffic flow template and the ID of the source user plane path. After identifying the local data flow, the AN node forwards the local data flow to the edge gateway, and the edge gateway forwards the local data flow back to the AN node. In this way, the AN node may send the local data flow to the UE on the second bearer. It should be noted that the AN node further receives an end marker on the source user plane path. When receiving the end marker, the AN node stops forwarding a downlink data packet received on the source user plane path to the UP GW, and then forwards the end marker to the UP GW. The UP GW forwards the end marker to the edge gateway, and the edge gateway forwards the end marker back to the AN node. In this case, the AN node may sort, based on the end marker, the one or more downlink data packets received on the target user plane path.

Optionally, in some embodiments of this application, because the AN node cannot identify the local data flow, the solution provided herein enables the AN to identify the local data flow. The method may further include the following: The CP node sends a flow handover indication message to the AN node. The flow handover indication message includes a second traffic flow template and the ID of the source user plane path, and the flow handover indication message is used to instruct the AN node to identify, based on the second traffic flow template and the ID of the source user plane path, a data packet sent by a local network from one or more downlink data packets received by the AN node on the source user plane path, and send the identified data packet to the UE by using a target DRB. The target DRB is a transmission path between the UE and the AN node on the target user plane path. The embodiments of this application may be applied to a case in which the AN node on the source user plane path is the same as that on the target user plane path, a first bearer is between the AN node and the UE on the source user plane path, and a second bearer is between the AN node and the UE on the target user plane path. In this case, the target DRB is the second bearer herein.

In this embodiment of this application, the CP node may send the flow handover indication message to the AN node, and the flow handover indication message includes the second traffic flow template and the ID of the source user plane path. In this case, the AN node may identify, based on the second traffic flow template and the ID of the source user plane path, the local data flow from the one or more downlink data packets received on the source user plane path, and then send the identified local data flow to the UE by using the second bearer between the UE and the AN. This embodiment of this application is simple and convenient and is easy to implement. A latency of forwarding the local data flow to the offloading node for identification is reduced. The AN node directly identifies and sends the local data flow to the UE, and therefore the AN node may effectively sort, based on the end marker, the one or more downlink data packets received on the target user plane path.

A second aspect of the embodiments of this application provides an end marker sending method. The method may include: receiving, by a user plane gateway UP GW, trigger information and an identifier ID of a source user plane path of user equipment UE that are sent by a control plane CP node, where the UP GW is located on the source user plane path; and sending, by the UP GW, an end marker to an access network AN node on the source user plane path based on the trigger information and the ID of the source user plane path. When an AN node on the source user plane path is the same as that on a target user plane path, the source user plane path is a path including the UE, the AN, the UP GW, and an access gateway access GW, and the target user plane path is a path including the UE, the AN, an edge gateway edge GW, and an access GW. Alternatively, when an AN node on the source user plane path is different from that on a target user plane path, the source user plane path is a path including the UE, an AN 1, the UP GW, and an access GW, and the target user plane path is a path including the UE, an AN 2, an edge GW, and an access GW.

In this embodiment of this application, the UP GW receives the trigger information and the ID of the source user plane path that are sent by the CP node. When some conditions at the UP GW meet a requirement of the trigger information, the UP GW may send the end marker to the AN node. The UP GW may determine, based on the trigger information and the ID of the source user plane path, when to send the end marker to the AN node, and the end marker may indicate that transmission of a local data flow transmitted on the source user plane path is completed. Therefore, a probability that a downlink data packet on the source user plane path is lost after a user plane path of the UE is handed over is reduced.

Optionally, in some embodiments of this application, the trigger information includes at least one of a first traffic flow template and a timer parameter.

In this embodiment of this application, the trigger information is further described, and several optional implementations are provided. The trigger information may include the first traffic flow template, or the first traffic flow template and the timer parameter, or the timer parameter, or another indication identifier. The first traffic flow template is used to identify an end data packet.

Optionally, in some embodiments of this application, the trigger information includes the first traffic flow template, and the sending, by the UP GW, an end marker to an AN node on the source user plane path based on the trigger information and the ID of the source user plane path may include: when IP 5-tuple information of a downlink data packet for the UE that is received by the UP GW is the same as any IP 5-tuple information in the first traffic flow template, sending, by the UP GW, the end marker to the AN node on the source user plane path based on the ID of the source user plane path. The first traffic flow template includes at least one piece of IP 5-tuple information and is used to obtain an end data packet through filtering.

In this embodiment of this application, an implementation solution to sending the end marker by the UP GW is provided. The UP GW receives, on the source user plane path, a downlink data packet transmitted to the UE. When the trigger information is the first traffic flow template, the UP GW may determine IP 5-tuple information of the received downlink data packet. When the IP 5-tuple information of the received downlink data packet is the same as any IP 5-tuple information in the first traffic flow template, it indicates that the received downlink data packet is an end data packet. In this case, the UP GW may send the end marker to the AN node, to indicate that local data flow transmission on the source user plane path is completed.

Optionally, in some embodiments of this application, the trigger information includes the timer parameter, and the sending, by the UP GW, an end marker to an AN node on the source user plane path based on the trigger information and the ID of the source user plane path may include: setting, by the UP GW, a timer based on the timer parameter; starting, by the UP GW, the timer when the UP GW receives the timer parameter; and when the timer expires, sending, by the UP GW, the end marker to the AN node on the source user plane path based on the ID of the source user plane path. It should be understood that the timer parameter is usually an empirical value.

In this embodiment of this application, another implementation solution to sending the end marker by the UP GW is provided. After receiving the timer parameter, the UP GW may set the timer based on the timer parameter. The UP GW resets the timer after the UP GW receives a downlink data packet in a time set for the timer, to indicate that data is still transmitted on the source user plane path. The UP GW cannot send the end marker to the AN node until receiving no downlink data packet and the timer expires, to indicate that transmission of a data packet transmitted on the source user plane path is completed.

Optionally, in some embodiments of this application, the trigger information includes the first traffic flow template and the timer parameter, and the sending, by the UP GW, an end marker to an AN node on the source user plane path based on the trigger information and the ID of the source user plane path may include: starting, by the UP GW, a timer when IP 5-tuple information of a downlink data packet for the UE that is received by the UP GW is the same as any IP 5-tuple information in the first traffic flow template, where the timer is set based on the timer parameter; restarting, by the UP GW, the timer if the UP GW receives an end data packet and the timer does not expire, where IP 5-tuple information of the end data packet is the same as any IP 5-tuple information in the first traffic flow template; or restarting, by the UP GW, the timer if the UP GW receives another downlink data packet; and when the timer expires, sending, by the UP GW, the end marker to the AN node based on the ID of the source user plane path. The first traffic flow template includes at least one piece of IP 5-tuple information and is used to obtain an end data packet through filtering.

In this embodiment of this application, another implementation solution to sending the end marker by the UP GW is provided. Herein, determining conditions for sending the end marker by the UP GW include the first traffic flow template and the timer parameter. The timer may be set based on the timer parameter. The access gateway sends a plurality of end data packets in this embodiment to ensure data transmission reliability. When the UP GW receives a first end data packet, the UP GW needs to start the timer. Then the UP GW needs to restart the timer if the UP GW receives another technical data packet or downlink data packet in a time in which the timer does not expire, to indicate that a downlink data packet is still transmitted on the source user plane path. When the timer expires, it indicates that downlink data packet transmission on the source user plane path is completed, and the UP GW may send the end marker to the AN node based on the ID of the source user plane path.

Optionally, in some embodiments of this application, because the AN node cannot identify a local data flow, when a path handover resource is prepared, an offloading node may be selected from a core network, and the offloading node identifies the local data flow. Herein, the offloading node is described by using the UP GW as an example. The method may further include: receiving, by the UP GW, a flow handover indication message sent by the CP node, where the flow handover indication message includes the ID of the source user plane path and a second traffic flow template; identifying, by the UP GW based on the second traffic flow template and the ID of the source user plane path, a data packet sent by a local network from one or more downlink data packets sent by the AN node that are received on the source user plane path; and sending, by the UP GW, the identified data packet to an edge gateway, where the edge gateway is located on the target user plane path of the UE. The embodiments of this application may be applied to a case in which the AN node on the source user plane path is the same as that on the target user plane path, a first bearer is between the AN node and the UE on the source user plane path, and a second bearer is between the AN node and the UE on the target user plane path.

In this embodiment of this application, because the AN node cannot identify the local data flow from the one or more downlink data packets received on the source user plane path, the offloading node UP GW is selected for identification. The CP node sends a second flow handover indication message to the UP GW, and the second flow handover indication message includes the second traffic flow template and the ID of the source user plane path. After identifying the local data flow, the AN node forwards the local data flow to the edge gateway, and the edge gateway forwards the local data flow back to the AN node. In this way, the AN node may send the local data flow to the UE on the second bearer. It should be noted that the AN node further receives an end marker on the source user plane path. When receiving the end marker, the AN node stops forwarding a downlink data packet received on the source user plane path to the UP GW, and then forwards the end marker to the UP GW. The UP GW forwards the end marker to the edge gateway, and the edge gateway forwards the end marker back to the AN node. In this case, the AN node may sort, based on the end marker, the one or more downlink data packets received on the target user plane path.

A third aspect of the embodiments of this application provides an end marker sending method. The method may be applied to a user plane path handover process of UE, and the method may include: receiving, by an access gateway access GW, a path handover notification, where the path handover notification includes a traffic flow template, and the path handover notification herein may further indicate that the access GW needs to send a downlink data packet to an edge gateway next; and sending, by the access GW, an end data packet to a UP GW based on the traffic flow template. The traffic flow template includes at least one piece of IP 5-tuple information. When an AN node on a source user plane path is the same as that on a target user plane path, the source user plane path is a path including the UE, the AN, the UP GW, and the access gateway access GW, and the target user plane path is a path including the UE, the AN, the edge gateway edge GW, and an access GW. Alternatively, when an AN node on the source user plane path is different from that on the target user plane path, the source user plane path is a path including the UE, an AN 1, the UP GW, and the access GW, and the target user plane path is a path including the UE, an AN 2, the edge GW, and an access GW.

In this embodiment of this application, the path handover notification received by the access gateway includes the traffic flow template, and the traffic flow template includes at least one piece of IP 5-tuple information. In this case, the access GW may determine, based on the traffic flow template, IP 5-tuple information of an end data packet that needs to be sent. The end data packet is used to indicate a last data packet sent on the source user plane path after a user plane path of the UE is handed over. The UP GW may send an end marker based on the end data packet.

Optionally, in some embodiments of this application, the receiving, by an access GW, a path handover notification may include: receiving, by the access GW, the path handover notification sent by an edge gateway or a local management unit. In this embodiment of this application, the path handover notification may be sent by the edge gateway, or may be sent by the local management unit. Several optional implementations are provided to improve feasibility of the solution.

A fourth aspect of the embodiments of this application provides an end marker sending method. The method may be applied to a case in which an AN node on a source user plane path is the same as that on a target user plane path, a first bearer is between the AN node and UE on the source user plane path, and a second bearer is between the AN node and the UE on the target user plane path. The method may include: receiving, by an access network AN node, a flow handover indication message sent by a control plane CP node, where the flow handover indication message includes an identifier ID of a source user plane path of user equipment UE, and the flow handover indication message is used to instruct the AN node to determine, when an end marker on the source user plane path is received, whether one or more downlink data packets received by the AN node on the source user plane path are successfully sent to the UE; and it should be noted that the one or more downlink data packets received by the AN node on the source user plane path include a data packet sent by the Internet and a data packet sent by a local network; when the AN node receives the end marker on the source user plane path, determining, by the AN node, whether the one or more downlink data packets received by the AN node on the source user plane path are successfully sent to the UE; and if the one or more downlink data packets for the UE that are received by the AN node on the source user plane path are successfully sent to the UE, sorting, by the AN node based on the end marker, one or more downlink data packets received by the AN node on a target user plane path of the UE.

This embodiment of this application is specific to path handover for a local data flow, but the AN node cannot identify the local data flow. Consequently, if the local data flow on the source user plane path fails to be sent to the UE, when the AN node sorts the received one or more downlink data packets on the target user plane path based on the end marker, the local data flow on the source user plane path is lost. Therefore, when the AN node receives the flow handover indication message, the AN node may send, on the first bearer between the AN node and the UE, the one or more downlink data packets (the local data flow and/or the Internet data flow) received by the AN node on the source user plane path. If all the one or more downlink data packets are successfully sent to the UE, it is ensured that the local data flow on the source user plane path is not lost. Then the AN node sorts, based on the end marker, the one or more downlink data packets received on the target user plane path.

Optionally, in some embodiments of this application, the method may further include: if at least one data packet in the one or more downlink data packets received by the AN node on the source user plane path fails to be sent to the UE, sending, by the AN node, the at least one data packet to the UE.

In this embodiment of this application, when the AN node receives the end marker, if at least one data packet in the one or more downlink data packets received on the source user plane path fails to be sent to the UE, the AN node needs to successfully send, to the UE, the data packet that fails to be sent to the UE, thereby effectively preventing the one or more downlink data packets sent to the UE on the source user plane path from being lost due to user plane path handover.

A fifth aspect of the embodiments of this application provides an end marker sending method, and the method may include: receiving, by an access network AN node, a flow handover indication message from a control plane CP node, where the flow handover indication message includes an identifier ID of a source user plane path of user equipment UE; and sending, by the AN node based on the flow handover indication message, one or more downlink data packets received by the AN node on the source user plane path, where the source user plane path includes a user plane gateway UP GW. The embodiments of this application may be applied to a case in which an AN node on the source user plane path is the same as that on the target user plane path, a first bearer is between the AN node and the UE on the source user plane path, and a second bearer is between the AN node and the UE on the target user plane path.

In this embodiment of this application, the AN node receives the flow handover indication message sent by the CP node. The AN node may send, based on the flow handover indication message, the one or more downlink data packets received by the AN node on the source user plane path. For example, the AN node may send the one or more downlink data packets received on the source user plane path to the UE, or the AN node may send the one or more downlink data packets received on the source user plane path to the UP GW. The AN node may process, based on the flow handover indication message, the one or more downlink data packets received on the source user plane path.

Optionally, in some embodiments of this application, because the AN node cannot identify a local data flow, when a path handover resource is prepared, an offloading node may be selected from a core network, and the offloading node identifies the local data flow. Herein, the offloading node is described by using the UP GW as an example. The flow handover indication message is used to instruct the AN node to send the one or more downlink data packets received by the AN node on the source user plane path to the UP GW. The sending, by the AN node based on the flow handover indication message, one or more downlink data packets received by the AN node on the source user plane path may include: sending, by the AN node based on the flow handover indication message, the one or more downlink data packets received by the AN node on the source user plane path to the UP GW.

In this embodiment of this application, because the AN node cannot identify the local data flow from the one or more downlink data packets received on the source user plane path, the offloading node UP GW is selected for identification. The CP node sends the flow handover indication message to the AN node, so that the AN node forwards the one or more downlink data packets received on the source user plane path to the UP GW for identification. The UP GW may forward the identified local data flow to an edge gateway, and then the edge gateway forwards the identified local data flow back to the AN node. In this way, the AN node may send the local data flow to the UE on the second bearer. It should be noted that the AN node further receives an end marker on the source user plane path. When receiving the end marker, the AN node stops forwarding a downlink data packet received on the source user plane path to the UP GW, and then forwards the end marker to the UP GW. The UP GW forwards the end marker to the edge gateway, and the edge gateway forwards the end marker back to the AN node. In this case, the AN node may sort, based on the end marker, the one or more downlink data packets received on the target user plane path.

Optionally, in some embodiments of this application, because the AN node cannot identify the local data flow, the solution provided herein enables the AN to identify the local data flow. The flow handover indication message further includes a traffic flow template, and the flow handover indication message is used to instruct the AN node to send, to the UE based on the traffic flow template and the ID of the source user plane path by using a target DRB, a data packet that is sent by a local network and that is received by the AN node on the source user plane path. The target DRB is a transmission path between the UE and the AN node on the target user plane path of the UE. The sending, by the AN node based on the flow handover indication message, one or more downlink data packets received by the AN node on the source user plane path of the UE may include: identifying, by the AN node based on the traffic flow template, the data packet sent by the local network; and sending, by the AN node, the identified data packet to the UE based on the flow handover indication message and the ID of the source user plane path by using the target DRB.

In this embodiment of this application, the AN node receives the flow handover indication message sent by the CP node, and the flow handover indication message includes the traffic flow template and the ID of the source user plane path. In this case, the AN node may identify, based on the traffic flow template and the ID of the source user plane path, the local data flow from the one or more downlink data packets received on the source user plane path, and then send the identified local data flow to the UE by using the second bearer between the UE and the AN. This embodiment of this application is simple and convenient and is easy to implement. A latency of forwarding the local data flow to the offloading node for identification is reduced. The AN node directly identifies and sends the local data flow to the UE, and therefore the AN node may effectively sort, based on the end marker, the one or more downlink data packets received on the target user plane path.

A sixth aspect of the embodiments of this application provides a control plane CP node, and the CP node has a function of determining, based on trigger information and a source user plane path, to send an end marker provided in the first aspect. The function may be implemented by hardware, or may be implemented by hardware by executing corresponding software. The hardware or software includes one or more modules corresponding to the function.

A seventh aspect of the embodiments of this application provides a user plane gateway UP GW, and the UP GW has a function of determining, based on trigger information and a source user plane path, to send an end marker provided in the second aspect. The function may be implemented by hardware, or may be implemented by hardware by executing corresponding software. The hardware or software includes one or more modules corresponding to the function.

An eighth aspect of the embodiments of this application provides an access gateway access GW, and the access GW has a function of determining, based on trigger information and a source user plane path, to send an end marker provided in the third aspect. The function may be implemented by hardware, or may be implemented by hardware by executing corresponding software. The hardware or software includes one or more modules corresponding to the function.

A ninth aspect of the embodiments of this application provides an access network AN node, and the AN node has a function of determining, based on trigger information and a source user plane path, to send an end marker provided in the fourth aspect. The function may be implemented by hardware, or may be implemented by hardware by executing corresponding software. The hardware or software includes one or more modules corresponding to the function.

A tenth aspect of the embodiments of this application provides an access network AN node, and the AN node has a function of determining, based on trigger information and a source user plane path, to send an end marker provided in the fifth aspect. The function may be implemented by hardware, or may be implemented by hardware by executing corresponding software. The hardware or software includes one or more modules corresponding to the function.

An eleventh aspect of the embodiments of this application provides a control plane node, and the control plane node may include:

a transceiver, a memory, and a bus, where the transceiver and the memory are connected by using the bus;

the memory is configured to store an operation instruction; and the transceiver is configured to: receive a session update response, where the session update response includes an identifier ID of a source user plane path of user equipment UE or an ID of a target user plane path of the UE, and the source user plane path includes a user plane gateway UP GW; and send trigger information and the ID of the source user plane path to the UP GW based on the session update response, where the trigger information is used by the UP GW to send an end marker to an access network AN node on the source user plane path.

A twelfth aspect of the embodiments of this application provides a user plane gateway, and the user plane gateway may include:

a transceiver, a memory, and a bus, where the transceiver and the memory are connected by using the bus;

the memory is configured to store an operation instruction; and the transceiver is configured to: receive trigger information and an identifier ID of a source user plane path of user equipment UE that are sent by a control plane CP node, where the UP GW is located on the source user plane path; and send an end marker to an access network AN node on the source user plane path based on the trigger information and the ID of the source user plane path.

A thirteenth aspect of the embodiments of this application provides an access gateway, and the access gateway may include:

a transceiver, a memory, and a bus, where the transceiver and the memory are connected by using the bus;

the memory is configured to store an operation instruction; and the transceiver is configured to: receive a path handover notification, where the path handover notification includes a traffic flow template; and send an end data packet to a UP GW based on the traffic flow template.

A fourteenth aspect of the embodiments of this application provides an access network node, and the access network node may include:

a transceiver, a processor, a memory, and a bus, where the transceiver, the processor, and the memory are connected by using the bus;

the memory is configured to store an operation instruction;

the processor is configured to: when the AN node receives an end marker on a source user plane path, determine, by the determining module, whether one or more downlink data packets received by the AN node on the source user plane path are successfully sent to a UE; and the transceiver is configured to: receive a flow handover indication message sent by a control plane CP node, where the flow handover indication message includes an identifier ID of the source user plane path of the user equipment UE, and the flow handover indication message is used to instruct the AN node to determine, when the end marker on the source user plane path is received, whether the one or more downlink data packets received by the AN node on the source user plane path are successfully sent to the UE; and if the one or more downlink data packets for the UE that are received by the AN node on the source user plane path are successfully sent to the UE, sort, by the transceiver based on the end marker, one or more downlink data packets received by the AN node on a target user plane path of the UE, or send, by the transceiver, the end marker.

A fifteenth aspect of the embodiments of this application provides an access network node, and the access network node may include:

a transceiver, a memory, and a bus, where the transceiver and the memory are connected by using the bus;

the memory is configured to store an operation instruction; and the transceiver is configured to: receive a flow handover indication message from a control plane CP node, where the flow handover indication message includes an identifier ID of a source user plane path of user equipment UE; and send, based on the flow handover indication message, one or more downlink data packets received by the AN node on the source user plane path, where the source user plane path includes a user plane gateway UP GW.

A sixteenth aspect of the embodiments of this application provides a communications system, and the communications system includes a control plane node, a user plane gateway, and an access gateway. The control plane node is the control plane node that performs the first aspect of this application or any optional implementation of the first aspect; the user plane gateway is the user plane gateway that performs the second aspect of this application or any optional implementation of the second aspect; and the access gateway is the access gateway that performs the third aspect of this application or any optional implementation of the third aspect.

A seventeenth aspect of the embodiments of this application provides a communications system, and the communications system includes a control plane node, a user plane gateway, an access gateway, and an access network node. The control plane node is the control plane node that performs the first aspect of this application or any optional implementation of the first aspect; the user plane gateway is the user plane gateway that performs the second aspect of this application or any optional implementation of the second aspect; the access gateway is the access gateway that performs the third aspect of this application or any optional implementation of the third aspect; and the access network node is the access network node that performs the fourth aspect of this application or any optional implementation of the fourth aspect.

An eighteenth aspect of the embodiments of this application provides a communications system, and the communications system includes a control plane node, a user plane gateway, an access gateway, and an access network node. The control plane node is the control plane node that performs the first aspect of this application or any optional implementation of the first aspect; the user plane gateway is the user plane gateway that performs the second aspect of this application or any optional implementation of the second aspect; the access gateway is the access gateway that performs the third aspect of this application or any optional implementation of the third aspect; and the access network node is the access network node that performs the fifth aspect of this application or any optional implementation of the fifth aspect.

A nineteenth aspect of the embodiments of the present invention provides a storage medium. It should be noted that the technical solutions of the present invention essentially, or the part contributing to the prior art, or all or some of the technical solutions may be implemented in a form of a software product. The computer software product is stored in a storage medium. The storage medium is configured to store a computer software instruction for use by the foregoing device. The computer software product includes a program designed for the control plane node, the user plane gateway, the access gateway, or the access network node to implement the first aspect, the second aspect, the third aspect, or the fourth aspect (the fifth aspect).

The storage medium includes any medium that can store program code, such as a USB flash drive, a removable hard disk, a read-only memory (ROM), a random access memory (RAM), a magnetic disk, or an optical disc.

A twentieth aspect of the embodiments of the present invention provides a computer program product including an instruction, and when the instruction runs on a computer, the computer performs the method in the first aspect of this application or any optional implementation of the first aspect.

A twenty-first aspect of the embodiments of the present invention provides a computer program product including an instruction, and when the instruction runs on a computer, the computer performs the method in the second aspect of this application or any optional implementation of the second aspect.

A twenty-second aspect of the embodiments of the present invention provides a computer program product including an instruction, and when the instruction runs on a computer, the computer performs the method in the third aspect of this application or any optional implementation of the third aspect.

A twenty-third aspect of the embodiments of the present invention provides a computer program product including an instruction, and when the instruction runs on a computer, the computer performs the method in the fourth aspect of this application or any optional implementation of the fourth aspect.

A twenty-fourth aspect of the embodiments of the present invention provides a computer program product including an instruction, and when the instruction runs on a computer, the computer performs the method in the fifth aspect of this application or any optional implementation of the fifth aspect.

The technical solutions provided in the embodiments of this application have the following beneficial effects:

In the embodiments of this application, in a user plane path reselection process of the UE, the source user plane path is handed over to the target user plane path, the source user plane path includes the UP GW, and the target user plane path includes the edge gateway. The CP node receives the session update response, and sends the trigger information and the identifier ID of the source user plane path to the UP GW based on the session update response. The trigger information is used by the UP GW to send the end marker to the access network AN node on the source user plane path. The UP GW determines, based on the received trigger information and identifier ID of the source user plane path, when the UP GW to send the end marker to the AN node, to assist the AN node in sorting the one or more downlink data packets received on the target user plane path. In the embodiments of this application, a function of a user plane gateway may be enhanced, and most functions of a conventional network element may also be reused. There is no need to modify an existing handover procedure to a large extent, and therefore the embodiments of this application are simple and clear, and are easy to implement. In this way, a problem that a small amount of data on the source user plane path is lost due to Internet unreliability is resolved.

Further, when the user plane path of the UE is handed over to the target user plane path, and the target user plane path includes the edge gateway, downlink data sent by the local network may be directly sent to the UE by using the edge gateway, and does not need to be sent to the UE by using the UP GW, thereby reducing a transmission latency. However, the one or more downlink data packets received by the AN node on the source user plane path include the data packet sent by the Internet and the data packet sent by the local network. In this case, after the user plane path is handed over, the data packet sent by the local network and transmitted on the source user plane path needs to be forwarded to the target user plane path, to transmit the data packet to the UE. However, in the prior art, the AN node cannot identify the data packet sent by the local network. Therefore, the embodiments of this application propose a solution in which the AN node identifies the data packet sent by the local network, or the offloading node selected from the core network identifies the data packet sent by the local network, or it is directly ensured that the AN node successfully sends all the data packets to the UE on the source user plane path, and then processes, based on the end marker, the one or more downlink data packets received on the target user plane path, so as to weaken disorder and congestion on the Internet to an extent, thereby reducing impact on sorting of the data packets received on the target user plane path.

BRIEF DESCRIPTION OF DRAWINGS

FIG. 16A and FIG. 16B are a schematic diagram of another embodiment of an end marker sending method according to an embodiment of this application;

FIG. 17A and FIG. 17B are a schematic diagram of another embodiment of an end marker sending method according to an embodiment of this application;

DESCRIPTION OF EMBODIMENTS

The following describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

First, an architecture of a conventional communications system and an architecture of a next generation communications system are briefly described.

Mobile networks that can be accessed by user equipment (UE) include 2G, 3G, and 4G networks, and provide transmission channels for a call service, a video service, a webpage service, and the like of the UE.

Figure 1:
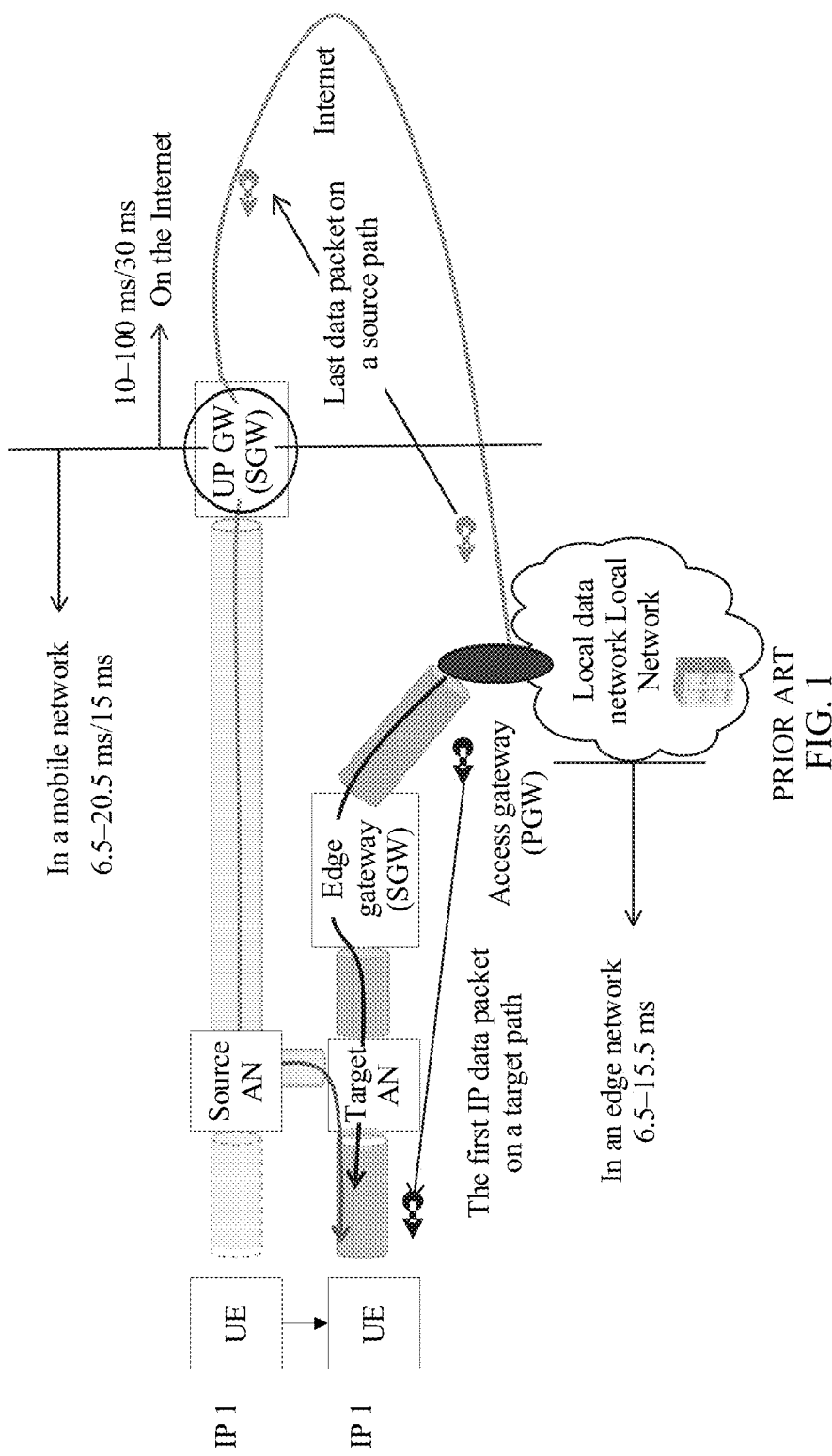
FIG. 1 is a schematic diagram of path reselection performed during UE movement in the prior art.
Figure 2:
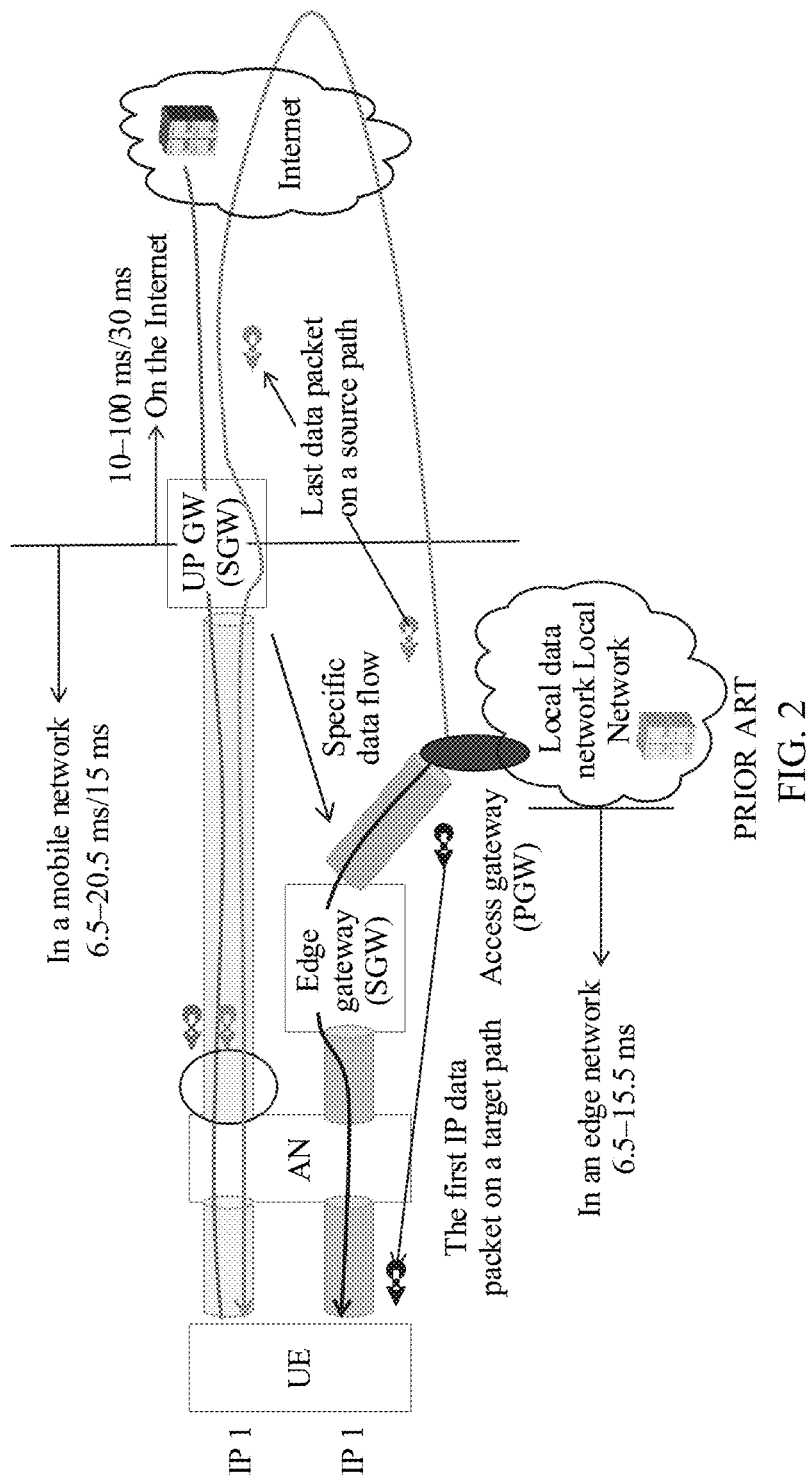
FIG. 2 is a schematic diagram of path reselection performed after UE receives a user plane report in the prior art.
Figure 3:
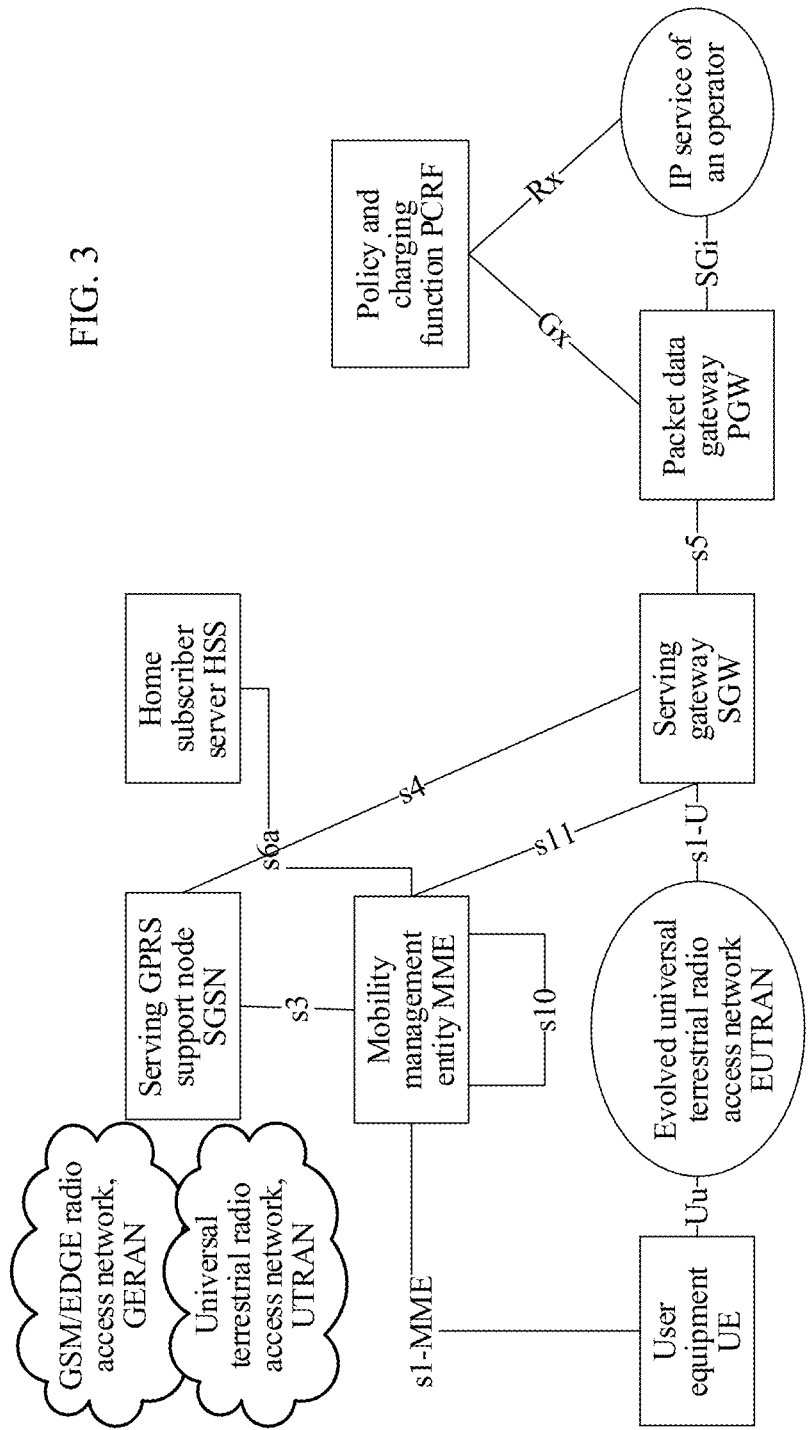
FIG. 3 is a schematic diagram of a network architecture of an evolved packet system EPS according to an embodiment of this application.
Figure 4:
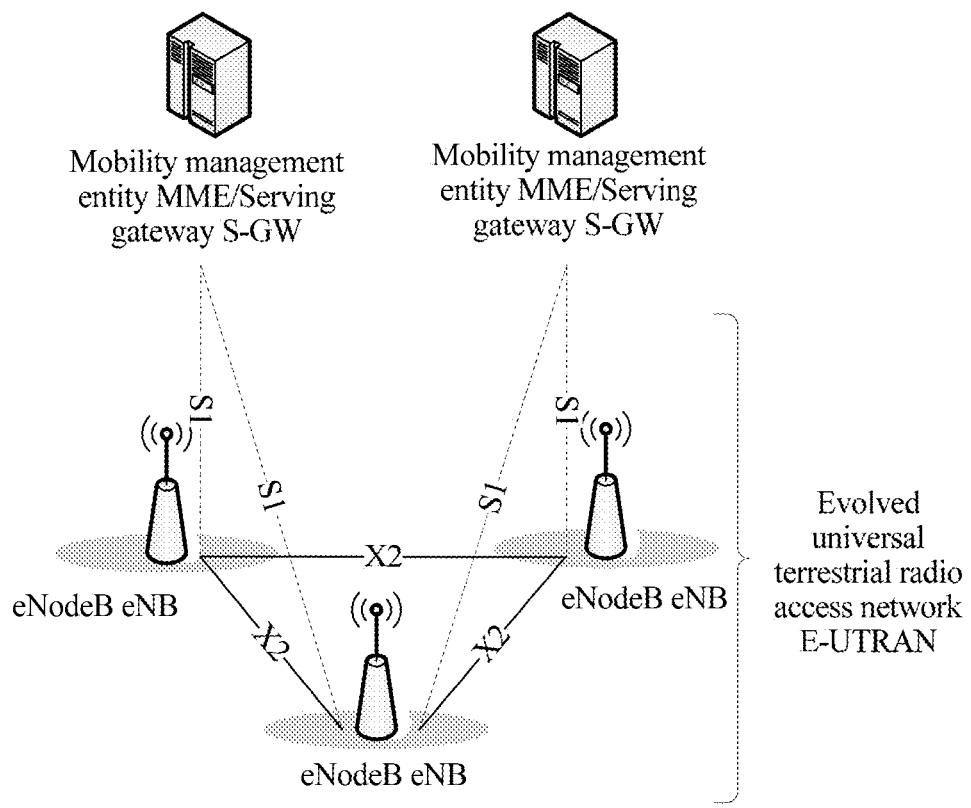
FIG. 4 is a schematic diagram of an architecture of an evolved universal terrestrial radio access network EUTRAN according to an embodiment of this application.

FIG. 3 is a schematic diagram of a network architecture of an evolved packet system (EPS). A 4G network is used as an example to briefly describe a conventional mobile network. Network elements in the EPS mainly include UE, an evolved universal terrestrial radio access network, a mobility management entity, a serving gateway, a packet data network gateway, a serving general packet radio system (GPRS) support node, a home subscriber server, and a policy and charging rules function. FIG. 4 is a schematic diagram of an architecture of an evolved universal terrestrial radio access network (EUTRAN).

Functions of the network entities in FIG. 3 are briefly described below.

The evolved universal terrestrial radio access network (EUTRAN) is a network including a plurality of evolved NodeBs (eNodeBs), and implements a radio physical layer function, resource scheduling and radio resource management, radio access control, and a mobility management function. The eNodeB may be connected to each other through an X2 interface, and may transmit data based on the X2 interface. The eNodeB is connected to the serving gateway (SGW) through a user plane interface S1-U, and transmits user plane data by using a GPRS tunneling protocol-user plane (GTP-U). The eNodeB is connected to the mobility management entity (MME) through a control plane interface S1-MME, and implements a function such as radio access bearer control by using an S1-application protocol (S1-AP), as shown in FIG. 4.

The MME is mainly responsible for a control plane function of user management and a control plane function of session management, including non-access stratum (NAS) signaling and security, tracking area list management, selection of a packet data network gateway (PDN Gateway, PGW) and an SGW, and the like.

The SGW is mainly responsible for data transmission, forwarding, route handover, and the like of the UE, and serves as a local mobility anchor when the UE is handed over between eNodeBs (only one SGW serves each UE at each moment).

The packet data network gateway (PGW) servers as an anchor of a PDN connection, and is responsible for allocating an Internet protocol (IP) address to the UE, filtering a data packet of the UE, controlling a rate, generating charging information, and so on.

The serving general packet radio service supporting node (SGSN) is an access node of a global system for mobile communications (GSM) of a 2G access network/enhanced data rates for GSM evolution (EDGE) radio access network (GERAN), a 3G access network, namely, a universal terrestrial radio access network (UTRAN), and an evolved packet core (EPC) in an evolved packet system (EPS), and is responsible for bearer establishment and data forwarding from each of the GERAN and the UTRAN to the EPC.

The home subscriber server (HSS) stores subscription data of a mobile user.

The policy and charging rules function (PCRF) is responsible for charging management and policy control, and includes a policy and charging control (PCC) rule and a quality of service (QoS) rule.

Figure 5:
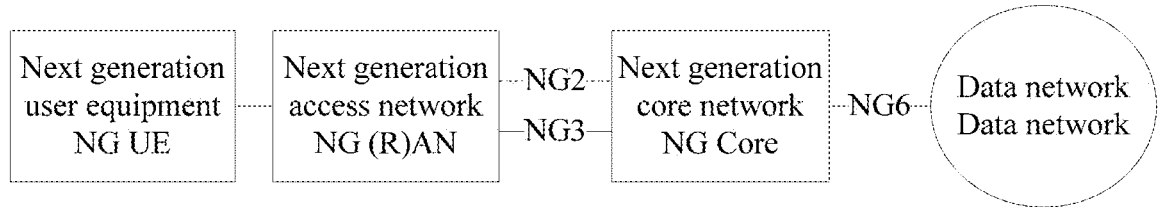
FIG. 5 is a schematic diagram of an architecture of a next generation NG mobile communications system according to an embodiment of this application.

FIG. 5 is a schematic diagram of an architecture of a next generation (NG) mobile communications system. A system architecture that is widely accepted and approved in development of the 3rd generation partnership project (3GPP) standard is used as an example.

NextGen or NG is short for the architecture of the next generation mobile communications system, and includes UE, an AN, a core network (CN), and a data network. The UE, the AN, and the core network are main components for constituting the architecture. Logically, the AN and the core network each may be divided into two parts: a user plane and a control plane. The control plane is responsible for mobile network management, and the user plane is responsible for service data transmission. In FIG. 5, an NG2 reference point is between the control plane of the AN and the control plane of the CN, an NG3 reference point is between the user plane of the AN and the user plane of the CN, and an NG6 reference point is between the user plane of the CN and the data network.

The UE is an ingress for interaction between a mobile user and a network, and can provide a basic computing capability and storage capability, display a service window to the user, and accept user operation input. The NextGen UE uses a next generation air-interface technology to establish a signal connection and a data connection to the access network, to transmit a control signal and service data to a mobile network.

The AN is similar to a base station in a conventional network and is deployed near the UE, provides a network access function for an authorized user in a specific area, and can transmit user data based on a user level and a service requirement through transmission tunnels of different quality. The AN can manage and properly use a radio resource of the AN, provide an access service for the UE according to a requirement, and forward a control signal and user data between the UE and the CN.

The CN is responsible for maintaining subscription data of a mobile network, managing a network element in a mobile network, and providing functions such as session management, mobility management, policy management, and security authentication for the UE. When the UE is attached to the CN, the CN provides network access authentication for the UE; when the UE requests a service, the CN allocates a network resource to the UE; when the UE moves, the CN updates a network resource for the UE; when the UE is idle, the CN provides a fast restoration mechanism for the UE; when the UE is detached from the CN, the CN releases a network resource for the UE; and when the UE has service data, the CN provides a data routing function for the UE, for example, forwards uplink data to the data network; or receives downlink data sent for the UE from the data network, and forwards the downlink data to the AN, to send the downlink data to the UE.

The data network is a data network that provides a service for a user. Usually, a client is in the UE, and a serving end is in the data network. The data network may be a private network, such as a local area network; may be an external network that is not controlled by an operator, such as the Internet; or may be a dedicated network jointly deployed by operators, for example, deployed to configure an IP multimedia network subsystem (IMS) service.

Next, implementation of a data path and forwarding of an end marker in a UE handover process are described below.

Figure 6:
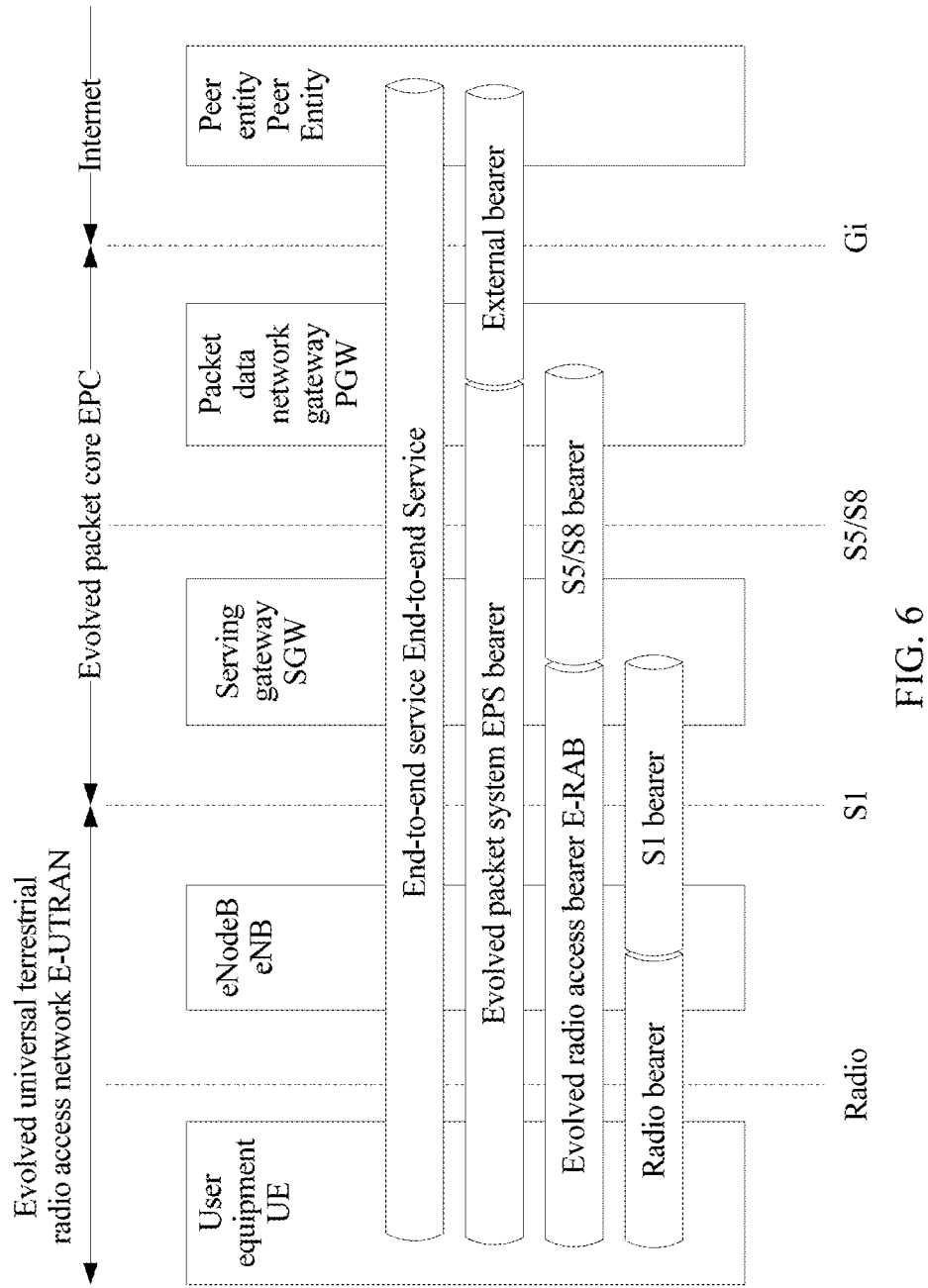
FIG. 6 is a schematic diagram of an EPS path implementation according to an embodiment of this application.
Figure 7:
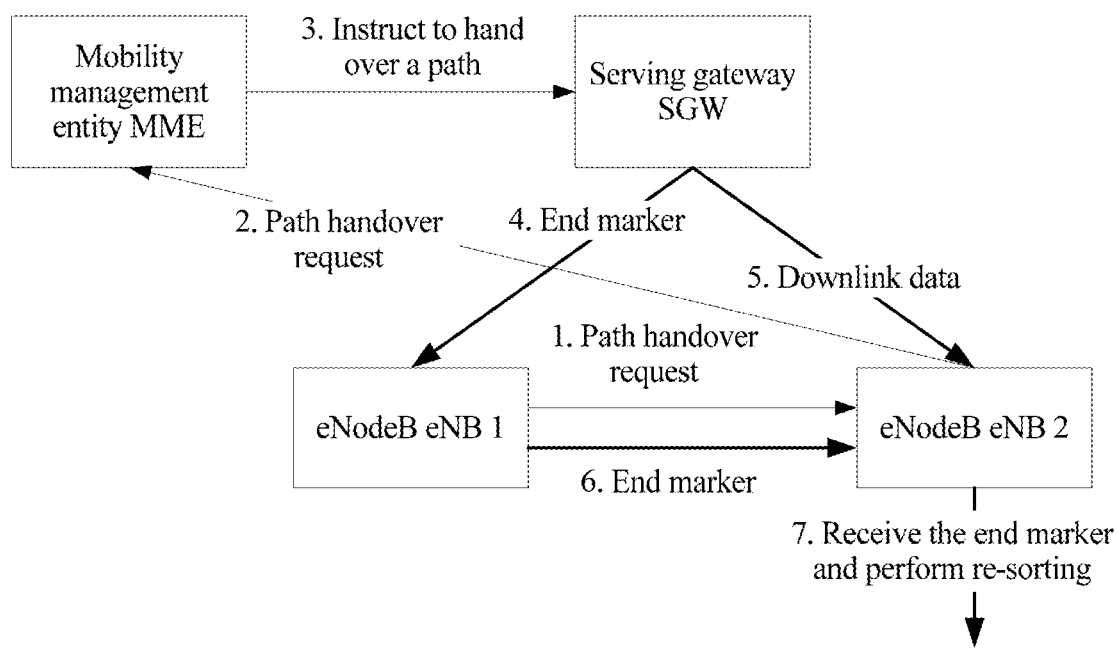
FIG. 7 is a schematic diagram of a handover procedure based on an X2 interface according to an embodiment of this application.
Figure 8:
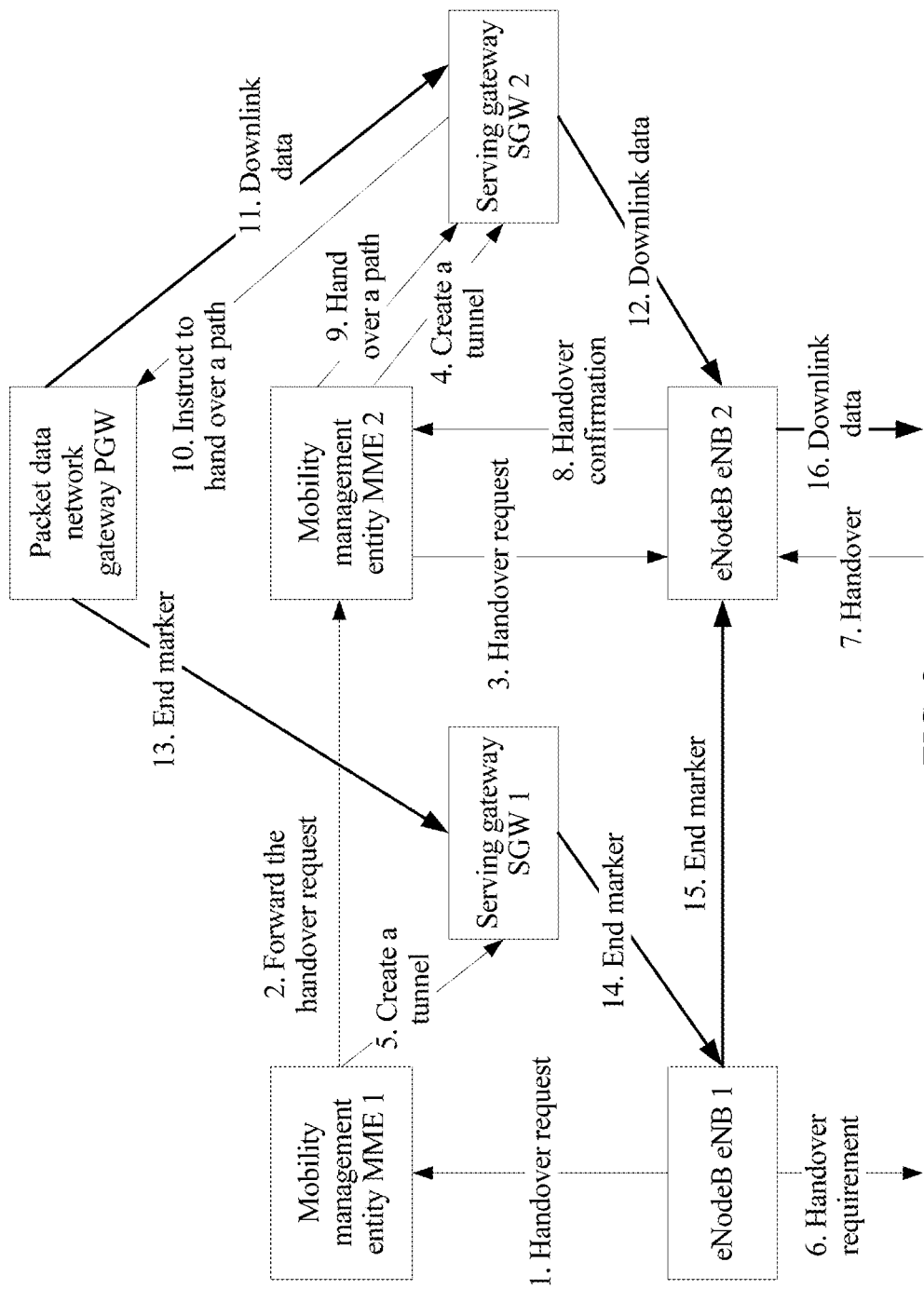
FIG. 8 is a schematic diagram of a handover procedure based on an S1 interface according to an embodiment of this application.

In a conventional mobile network, a data path of UE is implemented by using an evolved packet system (EPS) bearer. FIG. 6 is a schematic diagram of an EPS path implementation. A bearer is established from end to end, and there is a clear correspondence in the EPS system: radio bearer: S1 bearer: S5/S8 bearer=1:1:1. Handover based on an X2 interface and handover based on an S1 interface exist in the UE handover process. FIG. 7 is a schematic diagram of a handover procedure based on an X2 interface, and the handover procedure is triggered when the X2 interface exists between a source eNB and a target eNB. FIG. 8 is a schematic diagram of a handover procedure based on an S1 interface, and the handover procedure is triggered when no X2 interface exists between the source eNB and the target eNB or when the handover procedure based on the X2 interface fails. In descriptions of the embodiments of this application, a source user plane path may be described by using a source path for short, and a target user plane path may be described by using a target path for short.

FIG. 7 is a schematic diagram of a handover procedure based on an X2 interface. An eNB 1 is a source eNB, and an eNB 2 is a target eNB. The handover procedure includes the following steps: 1. The eNB 1 requests the eNB 2 to prepare a path resource, that is, prepare a target user plane path bearer and a forwarding bearer. After the eNB 2 successfully prepare the path resource, the eNB 1 may receive a response message returned by the eNB 2, and then instruct UE to be handed over to the eNB 2. 2. After finding that the UE is handed over to the eNB 2, the eNB 2 instructs an MME to hand over a path, and notifies the MME of corresponding path information. 3. The MME instructs an SGW to hand over a downlink path. 4. The serving gateway hands over the path, and after completing the handover, the serving gateway immediately sends a data end marker on a source path. 5. The SGW sends downlink data on a target user plane path. 6. The eNB 1 receives the end marker sent by the SGW, and forwards the end marker to the eNB 2, to assist the eNB 2 in performing re-sorting.

FIG. 8 is a schematic diagram of a handover procedure based on an S1 interface. The handover procedure includes the following steps: 1. An eNB 1 requests an MME 1 to prepare a path resource in an eNB 2, that is, prepare a target user plane path bearer and a forwarding bearer. 2. The MME 1 forwards the request to an MME 2 controlling the eNB 2. 3. The MME 2 requests the eNB 2 to prepare a target user plane path resource and a handover resource. 4. The MME 2 instructs an SGW 2 to prepare a handover resource. 5. After receiving a response from the MME 2, the MME 1 instructs an SGW 1 to prepare a path handover resource. 6. The MME 1 instructs UE to be handed over to the eNB 2. 7. The UE is handed over to the eNB 2. 8. The eNB 2 notifies the MME 2 that handover of the UE is completed. 9. The MME 2 instructs the SGW 2 to hand over a path. 10. The SGW 2 instructs a PGW to hand over a path. 11. The PGW hands over the path, and sends downlink data on a target user plane path. 12. The SGW 2 forwards the downlink data to the eNB 2 on the target user plane path. 13. The PGW hands over the path, and after completing the handover, the PGW immediately sends an end marker on a source user plane path. 14. The SGW 1 continues to forward the end marker to the eNB 1. 15. The eNB 1 sends the end marker to the eNB 2 along a forwarding path. 16. The eNB 2 receives the end marker, and re-sorts, based on a sequence number in the end marker, downlink data forwarded on the source user plane path and downlink data received on the target user plane path.

Figure 9:
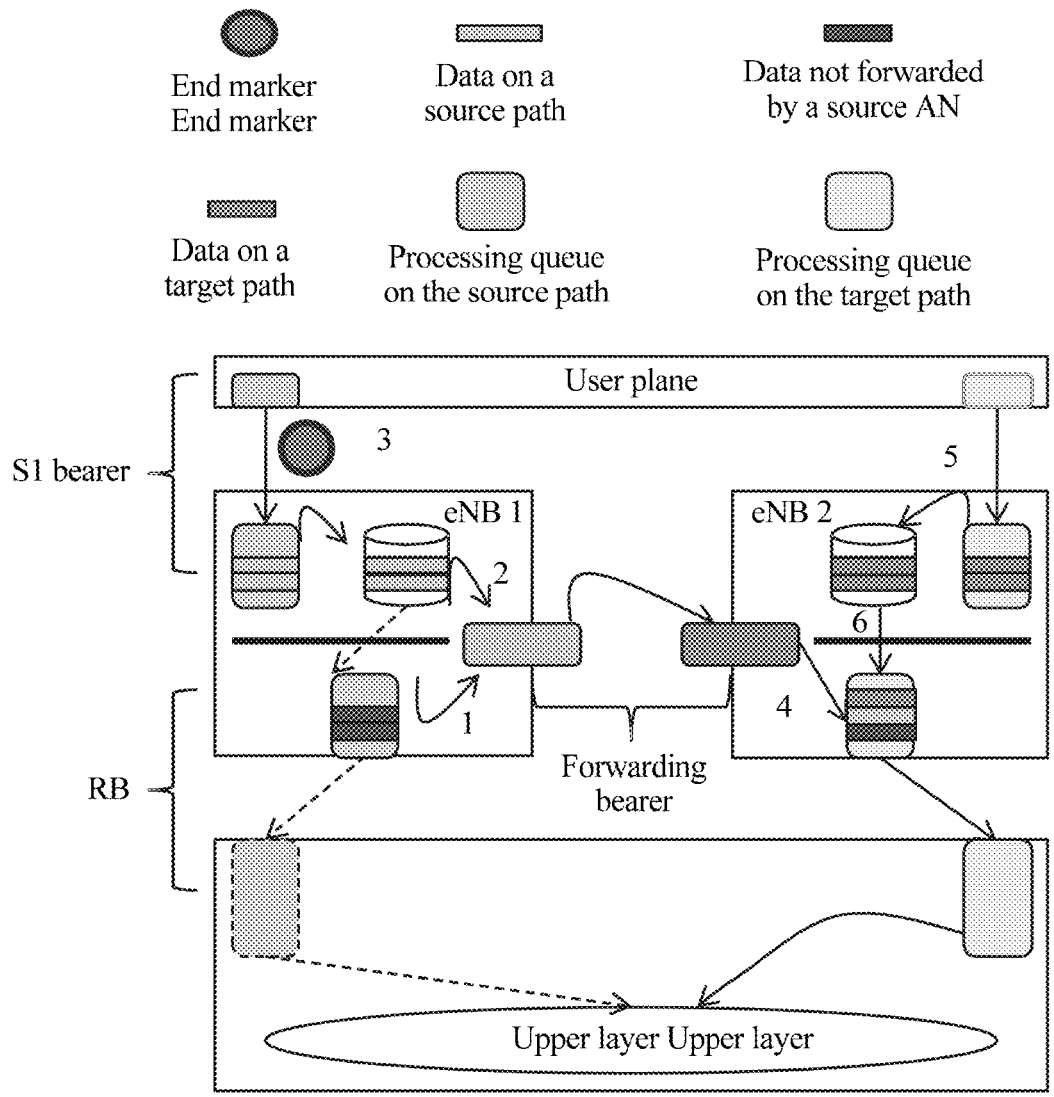
FIG. 9 is an existing schematic diagram of forwarding an end marker according to an embodiment of this application.

FIG. 9 is a schematic diagram of forwarding an end marker. A control plane (CP) node MME in a core network knows such a correspondence, that is, a radio bearer: S1 bearer: S5/S8 bearer: forwarding bearer=1:1:1:1, and establishes a forwarding path based on each EPS bearer. When handing over a path, a user plane (UP) gateway SGW/PGW in the core network sends an end marker on each source user plane path, namely, each bearer, of UE. A source eNB sends the end marker to a target eNB along the forwarding path, to assist the target eNB in performing sorting. In the UE handover process shown in FIG. 7, the UE changes the eNB 1 serving the UE and connects to the eNB 2, and a forwarding bearer is established based on a source user plane path (an S1 bearer, an RB, or the like) by using a 1:1 ratio relationship. Afterwards, the UE processes data in a sequence of 1, 2, 3, 4, 5, and 6 shown in the figure: 1. A packet data convergence layer protocol (PDCP) data packet in the eNB 1 that is not transmitted is preferably transmitted on the forwarding path. 2. The eNB 1 places, on the forwarding path, new downlink data sent from the corresponding source user plane path. 3. After path handover for the UE is completed, the UP gateway (SGW/PGW) sends an end marker on the source user plane path. 4. After receiving the forwarded data, the forwarding bearer in the eNB 2 preferably processes the data. 5. If the eNB 2 receives, before receiving the forwarded end marker, downlink data sent from the target user plane path, the eNB 2 buffers the downlink data. 6. After receiving the end marker on the forwarding path, the eNB 2 continues to sort downlink data received on the target user plane path based on a maximum PDCP sequence number (SN) in the end marker, so that the end marker can assist the eNB 2 in sorting the downlink data.

Finally, user plane path reselection in 5G is described below.

In a user plane path handover process in 5G, a source user plane path is handed over to a target user plane path for UE. A user plane gateway on the target user plane path changes, that is, changes from a UP GW to an edge gateway. Therefore, first, a source user plane gateway cannot determine when to send an end marker because residual data remains on the Internet; and second, when a local data flow and another data flow coexist on the source user plane path, an AN node cannot determine the local data flow that needs to be handed over to the edge gateway and then sent to the UE. Consequently, the AN node cannot resolve a data disorder problem caused by user plane path reselection.

Figure 10:
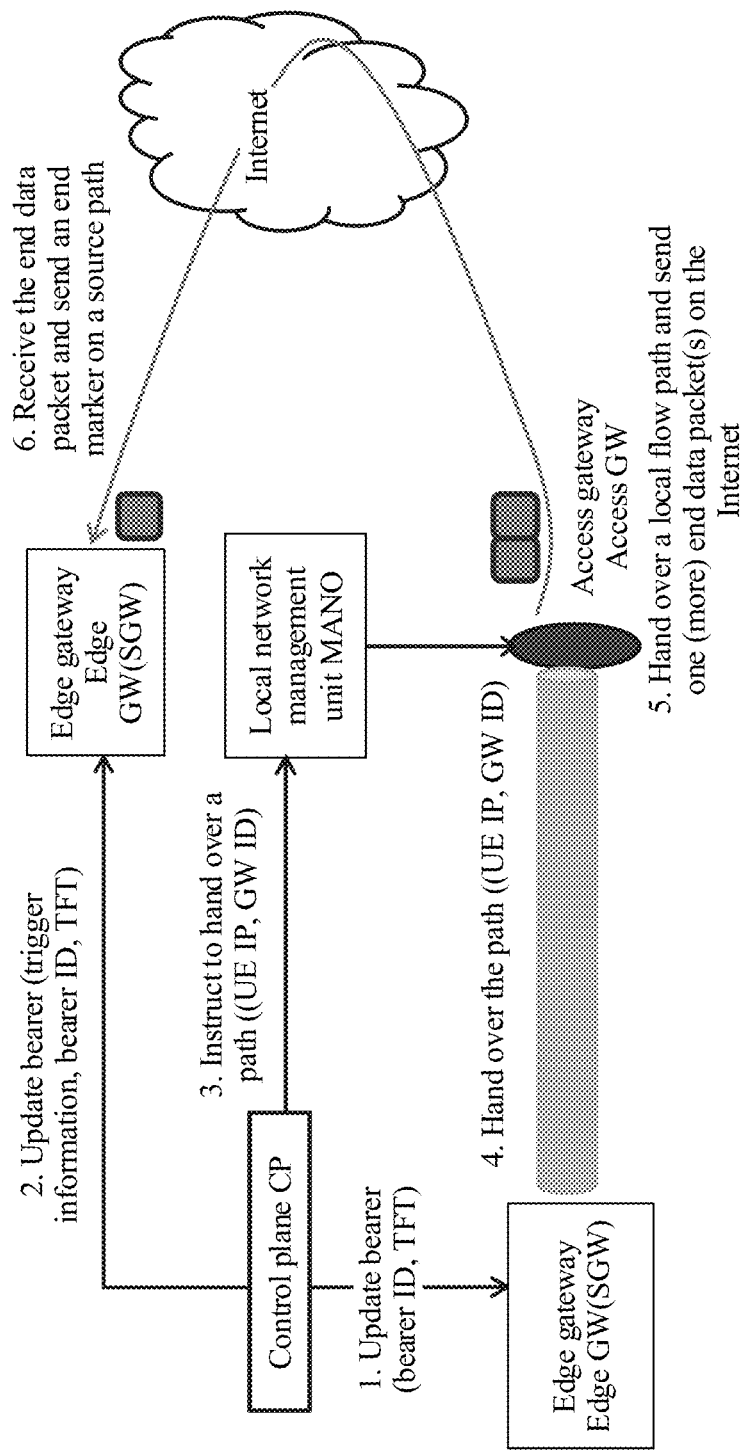
FIG. 10 is a schematic diagram of sending an end marker according to an embodiment of this application.

The embodiments of this application provide an end marker sending method, to resolve a downlink data disorder problem in a user plane path reselection process. As shown in FIG. 10, in a possible implementation, when a control plane CP node receives a session update response, the CP node sends trigger information to a UP GW based on the session update response, and then instructs a MANO (a service management unit in a local data network) to hand over a path for a local data flow. After completing user plane path handover for UE, an access gateway sends one or more end data packets on the Internet. After the UP GW receives the end data packet, because the end data packet is corresponding to the trigger information, the UP GW completes update of a local data flow context based on the trigger information and an end data packet activation trigger, such as a traffic filter template (TFT), quality of service (QoS), or other information. Then the UP GW sends an end marker on a source user plane path.

It should be noted that core network element functions are classified into a control plane function and a user plane function. The core network element functions are divided into a CP and a UP. The UP is mainly responsible for forwarding a data packet, controlling QoS, collecting statistics about charging information, and so on. The CP is mainly responsible for delivering a data packet forwarding policy, a QoS control policy, a charging information statistics reporting policy, and the like to the user plane function.

"UP" is merely a general term for a device that performs the user plane function, and does not specifically indicate a device or some devices. In actual application, a device that performs the user plane function may not be referred to as "UP", and may have another name for replacement. This is not specifically limited herein. In this application, a "UP node" is used as an example for description.

Likewise, "CP" is merely a general term for a device that performs the control plane function, and does not specifically indicate a device or some devices. In actual application, a device that performs the control plane function may not be referred to as "CP", and may have another name for replacement. This is not specifically limited herein. In this application, a "CP node" is used as an example for description.

In actual application, the UP and the CP may be separate devices, or may be a group of function entities on another device (for example, a server). This is not specifically limited herein.

Figure 11:
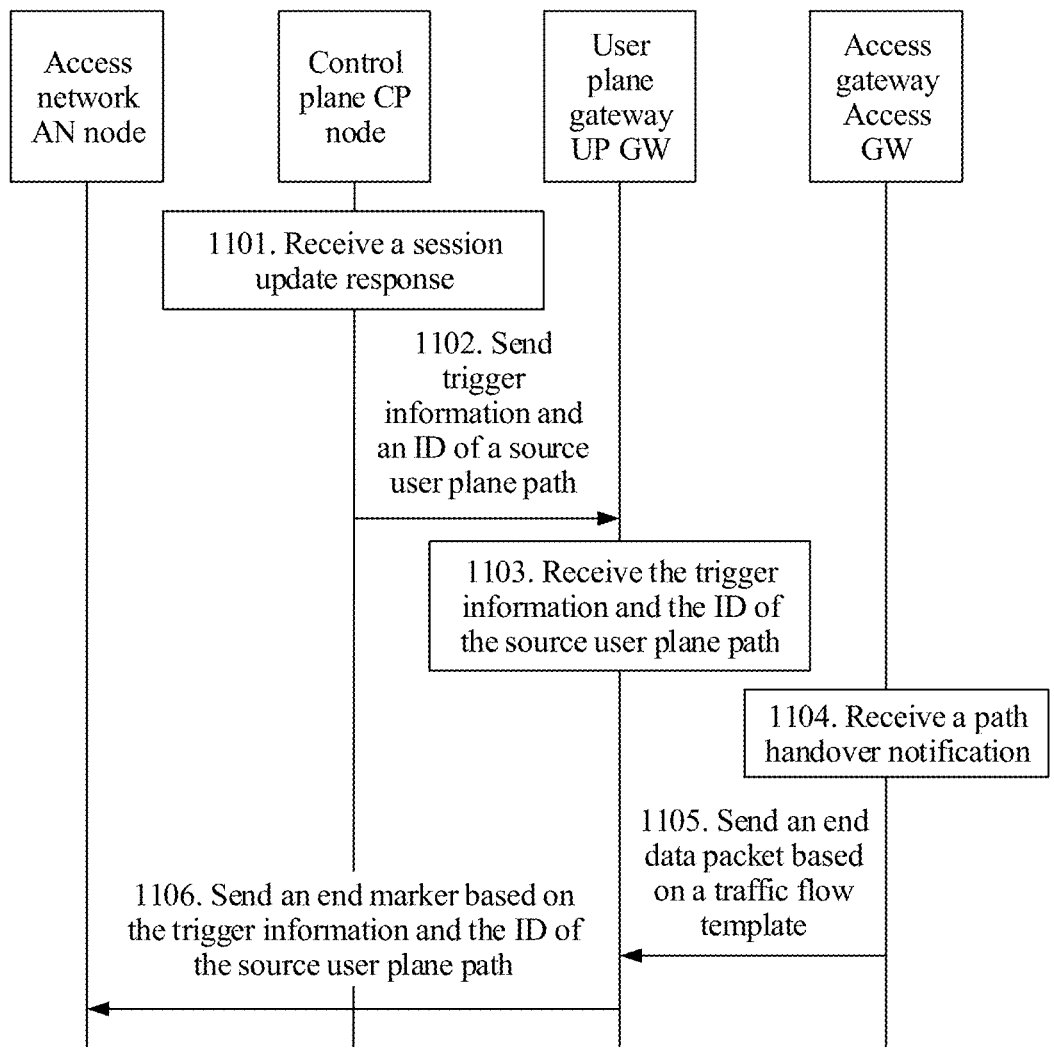
FIG. 11 is a schematic diagram of an embodiment of an end marker sending method according to an embodiment of this application.

The technical solutions of this application are further described by using embodiments. FIG. 11 is a schematic diagram of an embodiment of an end marker sending method according to an embodiment of this application, and the method includes the following steps.

1101. A CP node receives a session update response, where the session update response includes an ID of a source user plane path of UE or an ID of a target user plane path of the UE, and the source user plane path includes a UP GW.

Before the CP node receives the session update response, the CP node may send a session update request to an edge gateway, and then receive the session update response sent by the edge gateway. For example, the session update request herein may be an update bearer request, and the session update response may be an update bearer response. The session update response may include the identifier of the source user plane path of the UE or the identifier of the target user plane path of the UE. The source user plane path includes the UP GW, and the target user plane path includes the edge gateway edge GW.

In this embodiment of this application, if an AN node on the source user plane path is the same as that on the target user plane path, the source user plane path is a path including the UE, the AN node, the UP GW, and an access GW, and the target user plane path is a path including the UE, the AN node, the edge GW, and an access GW. On the source user plane path, a first bearer is between the UE and the AN node, and a first tunnel is between the AN node and the UP GW. On the target user plane path, a second bearer is between the UE and the AN node, a second tunnel is between the AN node and the edge GW, and an external tunnel is between the edge GW and the access GW.

Alternatively, if an AN node on the source user plane path is different that on the target user plane path, an example in which an AN1 node is a source AN node and an AN2 node is a target AN node may be used for description. The source user plane path is a path including the UE, the AN1 node, the UP GW, and an access GW, and the target user plane path is a path including the UE, the AN2, the edge GW, and an access GW. A first bearer is between the UE and the AN1 node, and a first tunnel is between the AN1 node and the UP GW. A second bearer is between the UE and the AN2 node, a second tunnel is between the AN2 node and the edge GW, and an external tunnel is between the edge GW and the access GW.

1102. The CP node sends trigger information and the ID of the source user plane path to the UP GW based on the session update response, where the trigger information is used by the UP GW to send an end marker to an AN node on the source user plane path.

For example, the trigger information herein may be at least one of a first traffic flow template and a timer parameter. The first traffic flow template is used to detect an end data packet, and the end data packet is used to indicate a last data packet transmitted on the source user plane path after a user plane path of the UE is handed over. To be specific, the trigger information herein may have the following several possibilities: (1) the first traffic flow template; (2) the first traffic flow template and the timer parameter; and (3) the timer parameter. The trigger information herein may be information such as an indication identifier. This is not specifically limited. It should be noted that the first traffic flow template herein is used to obtain an end data packet through filtering. To be specific, the UP GW obtains, based on the first traffic flow template, an end data packet sent by the access GW through filtering. When the UP GW obtains the end data packet through filtering, the UP GW sends the end marker to the source AN node.

For example, the first traffic flow template may be shown in Table 1, or a table obtained after the path identifier ID column is removed from Table 1 may be used as the first traffic flow template.

TABLE 1

| Traffic flow template TFT | Path identifier ID |
|---|---|
| First target traffic flow template: {(192.168.1.1: 10000, 121.14.88.76: 80, TCP), (192.168.1.1: 10000, 121.14.88.77: 80, TCP), . . . } | Path 1 |
| Second target traffic flow template: {(192.168.1.2: 10000, 121.14.88.76: 80, TCP), (192.168.1.2: 10000, 121.14.88.77: 80, TCP), . . . } | Path 2 |
| Third target traffic flow template: {(192.168.1.3: 10000, 121.14.88.76: 80, TCP), (192.168.1.3: 10000, 121.14.88.77: 80, TCP), . . . } | Path 3 |

Further, the timer parameter herein may be an example value, for example, 2 ms. In this case, a value of a timer on a UP GW side may be set to 0-2 ms, and the timer expires when the value of the timer exceeds 2 ms; or the timer may be set to 8-10 ms, and the timer expires when the value of the timer exceeds 10 ms. An initial value of the timer may be specifically determined according to an actual situation. The timer parameter may be an interval parameter, to be specific, the interval parameter is [a, b]. In this case, the initial value of the timer may be set to a, an expiration value may be set to b, and the timer expires when the timer exceeds b. Alternatively, the timer parameter may be a and b, where a is the initial value of the timer, and the expiration value is a+b=c. In this case, the timer expires when the timer exceeds c.

It should be further noted that when the trigger information is the timer parameter, after the UP GW receives the trigger information sent by the control plane CP node, the UP GW immediately starts the timer. If the timer of the UP GW expires, the UP GW sends the end marker to the AN1 node, and the UP GW does not need to determine, based on the end packet sent by the access gateway, when to send the end marker.

1103. The UP GW receives the trigger information and the identifier ID of the source user plane path of the UE that are sent by the CP node, where the UP GW is located on the source user plane path.

For example, the trigger information may be at least one of the first traffic flow template and the timer parameter.

1104. An access GW receives a path handover notification, and the path handover notification includes a traffic flow template.

For example, that an access GW receives a path handover notification may include the following: The access GW receives the path handover notification sent by the edge gateway or a local management unit.

1105. The access GW sends an end data packet to the UP GW based on the traffic flow template.

IP 5-tuple information of the end data packet may be determined by the first traffic flow template.

It should be noted that step 1105 is an optional step. To be specific, when the trigger information in the foregoing step includes the first traffic flow template, step 1105 is necessary.

1106. The UP GW sends the end marker to the AN node on the source user plane path based on the trigger information and the ID of the source user plane path.

For example, step 1106 may include the following scenarios.

(1) The trigger information includes the first traffic flow template.

When IP 5-tuple information of a downlink data packet for the UE that is received by the UP GW is the same as any IP 5-tuple information in the first traffic flow template, the UP GW sends the end marker to the AN node on the source user plane path based on the ID of the source user plane path.

The first traffic flow template herein may be understood as an end data packet filter. After detecting an end data packet from an Internet path, the UP GW sends the end marker on the source user plane path, and updates a local data flow context.

(2) The trigger information includes the first traffic flow template and the timer parameter.

The UP GW starts a timer when IP 5-tuple information of a downlink data packet for the UE that is received by the UP GW is the same as any IP 5-tuple information in the first traffic flow template, and the timer is set based on the timer parameter. The UP GW restarts the timer if the UP GW receives an end data packet and the timer does not expire, and IP 5-tuple information of the end data packet is the same as any IP 5-tuple information in the first traffic flow template. When the timer expires, the UP GW sends the end marker to the AN node based on the ID of the source user plane path.

To be specific, the UP GW starts the timer after detecting, based on the first traffic flow template, an end data packet sent from the source user plane path. The UP GW resets the timer if the UP GW receives, in a time in which the timer does not expire, a data packet sent by a local network or another subsequent end data packet; or if the UP GW does not receive a data packet sent by a local network or an end data packet and the timer expires, the UP GW immediately sends the end marker on the source user plane path, and updates a local data flow context.

(3) The trigger information includes the timer parameter.

The UP GW sets a timer based on the timer parameter; the UP GW starts the timer; and when the timer expires, the UP GW sends the end marker to the AN node on the source user plane path based on the ID of the source user plane path.

Herein, the UP GW immediately starts the timer after receiving the timer parameter. The UP GW resets the timer if the UP GW receives, in a time of the timer, a data packet sent by a local network; or if the UP GW continuously receives no data packet sent by a local network and the timer expires, it indicates that transmission of the data packet sent by the local network on the source user plane path (Internet) ends, and the UP GW sends the end marker on the source user plane path, and updates a local data flow context.

When the AN node on the source user plane path is the same as that on the target user plane path, the UP GW sends the end marker to the AN node based on the trigger information and the ID of the source user plane path. After receiving the end marker, the AN node may sort one or more downlink data packets received on the target user plane path, and then send sorted one or more downlink data packets to the UE.

Alternatively, when the AN node on the source user plane path is different that on the target user plane path, the UP GW sends the end marker to the AN1 node based on the trigger information and the ID of the source user plane path, and the AN1 node forwards the end marker to the AN2 node. After receiving the end marker, the AN2 node may sort one or more downlink data packets received on the target user plane path, and then send sorted one or more downlink data packets to the UE.

In this embodiment of this application, in a user plane path reselection process of the UE, the source user plane path is handed over to the target user plane path, the source user plane path includes the UP GW, and the target user plane path includes the edge gateway. The CP node receives the session update response, and sends the trigger information and the identifier ID of the source user plane path to the UP GW based on the session update response. The UP GW determines, based on the received trigger information and identifier ID of the source user plane path, when the UP GW to send the end marker to the AN node, to assist the AN node in sorting one or more downlink data packets received on the target user plane path. In this embodiment of this application, a function of a user plane gateway may be enhanced, and most functions of a conventional network element may also be reused. There is no need to modify an existing handover procedure to a large extent, and therefore this embodiment of this application is simple and clear, and is easy to implement. In this way, a problem that a small amount of data on the source user plane path is lost due to Internet unreliability is resolved.

Figure 12:
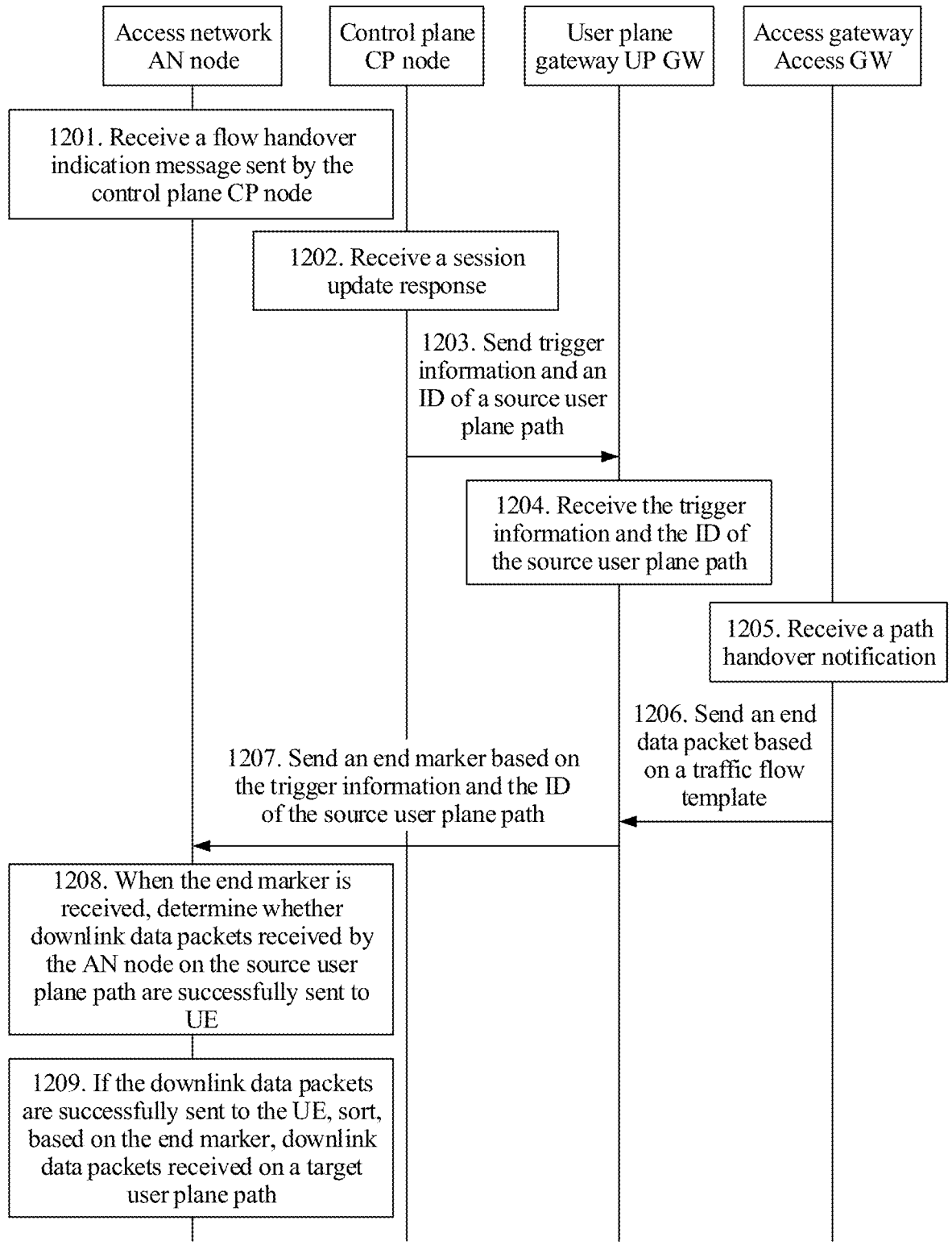
FIG. 12 is a schematic diagram of another embodiment of an end marker sending method according to an embodiment of this application.

FIG. 12 is a schematic diagram of another embodiment of an end marker sending method according to an embodiment of this application, and the method includes the following steps.

1201. An AN node receives a flow handover indication message sent by a CP node, where the flow handover indication message includes an ID of a source user plane path of user equipment UE, and the flow handover indication message is used to instruct the AN node to determine, when an end marker on the source user plane path is received, whether one or more downlink data packets received by the AN node on the source user plane path are successfully sent to the UE.

For example, after the CP node selects an edge gateway based on a user plane report, a handover request, or an application request, the CP node may send the flow handover indication message to the AN node. In this case, the AN node receives the flow handover indication message sent by the control plane CP node.

It should be noted that an AN node on the source user plane path is the same as that on a target user plane path. In this case, the source user plane path is a path including the UE, the AN node, a UP GW, and an access GW, and the target user plane path is a path including the UE, the AN node, the edge GW, and an access GW. On the source user plane path, a first DRB is between the UE and the AN node, and a primary tunnel is between the AN node and the UP GW. On the target user plane path, a second DRB is between the UE and the AN node, a secondary tunnel is between the AN node and the edge GW, and an external tunnel is between the edge GW and the access GW.

It should be understood that the one or more downlink data packets received by the AN node include a data packet sent by a local network and/or a data packet sent by the Internet. User plane path handover for the UE herein is path handover for a local data flow, but the data packets received by the AN node do not include only the local data flow, and the AN node cannot identify the local data flow received on the source user plane path. Consequently, if the local data flow on the source user plane path fails to be sent to the UE, one or more downlink data packets received on the target user plane path cannot be sorted based on the end marker in a timely manner. Therefore, after receiving the flow handover indication message, the AN node may send, on the first DRB based on the flow handover indication message, the one or more downlink data packets (the local data flow and/or the Internet data flow) received by the AN node on the source user plane path to the UE.

1202. The CP node receives a session update response, where the session update response includes the ID of the source user plane path of the UE or an ID of the target user plane path of the UE, and the source user plane path includes the UP GW.

1203. The CP node sends trigger information and the ID of the source user plane path to the UP GW based on the session update response, where the trigger information is used by the UP GW to send the end marker to the AN node on the source user plane path.

1204. The UP GW receives the trigger information and the ID of the source user plane path of the UE that are sent by the CP node, where the UP GW is located on the source user plane path.

1205. The access GW receives a path handover notification, where the path handover notification includes a traffic flow template.

1206. The access GW sends an end data packet to the UP GW based on the traffic flow template.

1207. The UP GW sends the end marker to the AN node on the source user plane path based on the trigger information and the ID of the source user plane path.

In this embodiment of this application, steps 1202 to 1207 are the same as steps 1101 to 1106 shown in FIG. 11, and reference may be made to the steps 1101 to 1106 in FIG. 11. Details are not described again herein.

1208. When the AN node receives the end marker on the source user plane path, the AN node determines whether the one or more downlink data packets received by the AN node on the source user plane path are successfully sent to the UE.

When the AN node receives, on the source user plane path, the end marker sent by the UP GW, the AN node needs to first determine whether the one or more downlink data packets received by the AN node on the source user plane path are successfully sent to the UE.

For example, if the AN node receives ten data packets on the source user plane path, after receiving the end marker, the AN node may first determine whether all the ten data packets are successfully sent to the UE.

1209. If the one or more downlink data packets received by the AN node on the source user plane path are successfully sent to the UE, the AN node sorts, based on the end marker, one or more downlink data packets received by the AN node on the target user plane path of the UE.

If the one or more downlink data packets received by the AN node on the source user plane path are successfully sent to the UE, the AN node sorts, based on the end marker, the one or more downlink data packets received by the AN node on the target user plane path of the UE; or if at least one data packet in the one or more downlink data packets received by the AN node on the source user plane path fails to be sent to the UE, the AN node sends the at least one data packet to the UE.

For example, it should be understood that before receiving the end marker, the AN node sends, on the first DRB, the one or more downlink data packets received on the source user plane path to the UE. If the AN node receives ten downlink data packets on the source user plane path, the AN sends the ten downlink data packets to the UE on the first DRB. If the downlink data packets are successfully sent to the UE, the AN node receives ten success identifiers fed back by the UE.

When the AN node receives the end marker, if the AN node receives the ten success identifiers fed back by the UE, it is proved that all the data packets received source user plane path are successfully sent by the AN node to the UE on the first DRB. In this case, the AN node may sort, based on a sequence number in the end marker, one or more downlink data packets received on the target user plane path, and send sorted one or more downlink data packets to the UE on the second DRB.

Alternatively, when the AN node receives the end marker, if the AN node receives only eight success identifiers fed back by the UE, it is proved that not all the data packets sent by the UE to the UE on the first DRB are successfully sent to the UE. If the remaining two downlink data packets have not been sent, the AN node sends the remaining two downlink data packets to the UE on the first DRB, and waits for success identifiers that are fed back. Alternatively, if the remaining two downlink data packets have been sent, but the AN node has not received success identifiers that are fed back by the UE, the AN node continues to wait until receiving two success identifiers fed back by the UE. In this way, the AN node may sort, based on a sequence number in the end marker, the downlink data packets received on the target user plane path, and send sorted downlink data packets to the UE on the second DRB.

In this embodiment of this application, after receiving the flow handover indication message, the AN node may send, on the first DRB based on the flow handover indication message, one or more downlink data packets received on the source user plane path to the UE. The UP GW may send the end marker to the AN node based on the trigger information and the ID of the source user plane path. When receiving the end marker sent by the UP GW, the AN node needs to first determine whether the data packets received by the AN node on the source user plane path are successfully sent to the UE, that is, ensure that the local data flow received by the AN node on the source user plane path is successfully sent to the UE. In this case, the AN node may sort, based on the end marker, one or more downlink data packets received on the target user plane path. In this way, it is effectively ensured that after a user plane path of the UE is handed over, the local data flow received by the AN node on the source user plane path is successfully sent, thereby reducing a data loss caused by handover of the user plane path of the UE. Further, the AN node processes, based on the end marker, the one or more downlink data packets received on the target user plane path.

Figure 13:
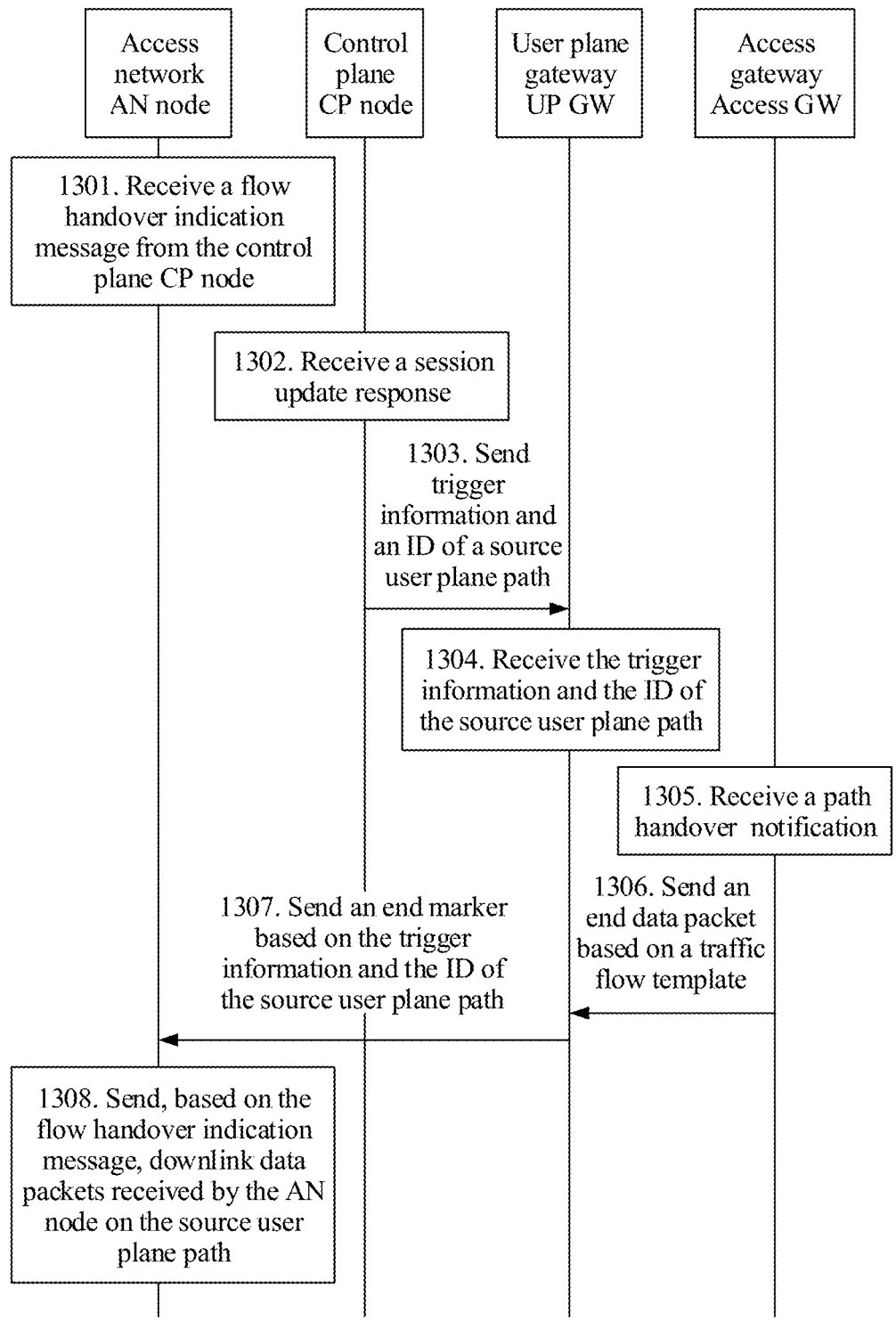
FIG. 13 is a schematic diagram of another embodiment of an end marker sending method according to an embodiment of this application.

FIG. 13 is a schematic diagram of another embodiment of an end marker sending method according to an embodiment of this application, and the method includes the following steps.

1301. An access network AN node receives a flow handover indication message from a control plane CP node, where the flow handover indication message includes an identifier ID of a source user plane path of user equipment UE.

It should be noted that an AN node on the source user plane path is the same as that on a target user plane path. In this case, the source user plane path is a path including the UE, the AN node, a UP GW, and an access GW, and the target user plane path is a path including the UE, the AN node, an edge GW, and an access GW. On the source user plane path, a first DRB is between the UE and the AN node, and a primary tunnel is between the AN node and the UP GW. On the target user plane path, a second DRB is between the UE and the AN node, a secondary tunnel is between the AN node and the edge GW, and an external tunnel is between the edge GW and the access GW.

For example, functions of the flow handover indication message include but are not limited to the following several types:

(1) The flow handover indication message is used to instruct the AN node to send a downlink data packet received by the AN node on the source user plane path to the UP GW.

(2) The flow handover indication message further includes a traffic flow template. The flow handover indication message is used to instruct the AN node to send, to the UE based on the traffic flow template and the ID of the source user plane path by using a target DRB, a data packet that is sent by a local network and that is received by the AN node on the source user plane path. The target DRB is a transmission path between the UE and the AN node on the target user plane path of the UE. It should be understood that the traffic flow template herein is used to filter the data packet, namely, a local data flow, sent by the local data network. The target DRB may be the second DRB.

1302. The CP node receives a session update response, where the session update response includes the ID of the source user plane path of the UE or an ID of the target user plane path of the UE, and the source user plane path includes the UP GW.

1303. The CP node sends trigger information and the ID of the source user plane path to the UP GW based on the session update response, where the trigger information is used by the UP GW to send an end marker to the AN node on the source user plane path.

1304. The UP GW receives the trigger information and the ID of the source user plane path of the UE that are sent by the CP node, where the UP GW is located on the source user plane path.

1305. The access GW receives a path handover notification, where the path handover notification includes a traffic flow template.

1306. The access GW sends an end data packet to the UP GW based on the traffic flow template.

1307. The UP GW sends the end marker to the AN node on the source user plane path based on the trigger information and the ID of the source user plane path.

In this embodiment of this application, steps 1302 to 1307 are the same as steps 1101 to 1106 shown in FIG. 11, and reference may be made to the steps 1101 to 1106 in FIG. 11. Details are not described again herein.

1308. The AN node sends, based on the flow handover indication message, one or more downlink data packet received by the AN node on the source user plane path, where the source user plane path includes the user plane gateway UP GW.

Because functions of the flow handover indication information are different, the AN node performs different content. Specifically, the following scenarios are included.

(1) The flow handover indication message is used to instruct the AN node to send a downlink data packet received by the AN node on the source user plane path to the UP GW.

That the AN node sends, based on the flow handover indication message, a downlink data packet received by the AN node on the source user plane path may include the following: The AN node sends, based on the flow handover indication message, the downlink data packet received by the AN node on the source user plane path to the UP GW.

In actual application, the UP GW receives a flow handover indication message sent by the CP node. The flow handover indication message includes the ID of the source user plane path and a second traffic flow template. It should be understood that the second traffic flow template herein is used to filter the data packet sent by the local network. The UP GW identifies, based on the second traffic flow template and the ID of the source user plane path, the data packet sent by the local network from the one or more downlink data packets sent by the AN node that are received on the source user plane path. The UP GW sends the identified data packet to the edge gateway, and the edge gateway is located on the target user plane path of the UE. The edge gateway receives the identified data packet sent by the UP GW, and then forwards the identified data packet back to the AN node. In this way, the AN node may transmit the identified data packet on the second DRB.

It should be noted that when receiving the end marker sent by the UP GW, the AN node stops forwarding a downlink data packet received by the AN node on the source user plane path to the UP GW, and forwards the end marker back to the UP GW. After receiving the end marker, the UP GW forwards the end marker to the edge gateway. After receiving the end marker forwarded back by the edge gateway, the AN node may sort, based on the end marker, one or more downlink data packets received on the target user plane path.

It should be understood that because the AN node cannot identify the local data flow, the offloading node UP GW selected from a core network is used to identify the data packet sent by the local network, and send the identified data packet to the UE by using the second DRB, so as to effectively reduce a loss of the local data flow caused by user plane path handover for the UE, and hand over the local data flow on the source user plane path to the target user plane path, to transmit the local data flow to the UE.

(2) The flow handover indication message further includes a traffic flow template. The flow handover indication message is used to instruct the AN node to send, to the UE based on the traffic flow template and the ID of the source user plane path by using a target DRB, a data packet that is sent by a local network and that is received by the AN node on the source user plane path. The target DRB is a transmission path between the UE and the AN node on the target user plane path of the UE.

That the AN node sends, based on the flow handover indication message, one or more downlink data packets received by the AN node on the source user plane path of the UE may include the following: The AN node identifies, based on the traffic flow template, the data packet sent by the local network, and the AN node sends the identified data packet to the UE based on the flow handover indication message and the ID of the source user plane path by using the target DRB.

It should be understood that in this optional implementation solution, the AN node may temporarily identify the data packet sent by the local network, and transmit the identified data packet to the UE on the target user plane path obtained after handover. Therefore, after receiving the end marker, the AN node may sort, based on the end marker, one or more downlink data packets received by the AN node on the target user plane path, and may further send sorted one or more downlink data packets to the UE.

It should be noted that there is no limitation on a time sequence of step 1308 and steps 1302 to 1307.

In this embodiment of this application, the AN node receives the flow handover indication message from the control plane CP node, and the AN node sends, based on the flow handover indication message, one or more downlink data packets received by the AN node on the source user plane path. For example implementation, refer to the foregoing descriptions. One implementation is to identify, by using the offloading node UP GW, the local data flow received on the source user plane path. The other implementation is that the AN node may identify the local data flow received on the source user plane path, and send the identified local data to the UE. The UP GW may send the end marker to the AN node based on the trigger information and the ID of the source user plane path. When receiving the end marker sent by the UP GW, the AN node may sort, based on the end marker, one or more downlink data packets received on the target user plane path.

Figure 14A:
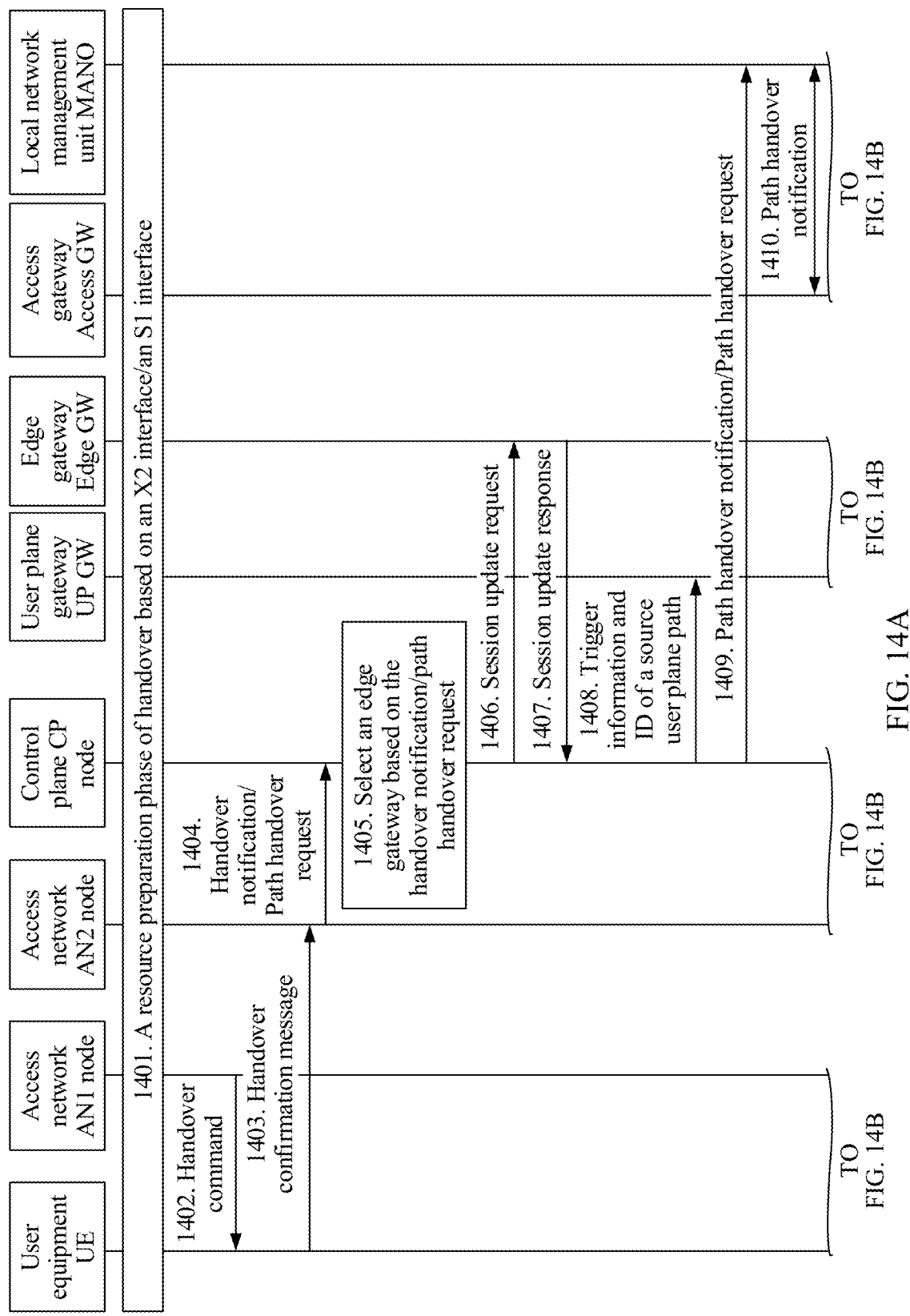
FIG. 14A and FIG. 14B are a schematic diagram of another embodiment of an end marker sending method according to an embodiment of this application.
Figure 14B:
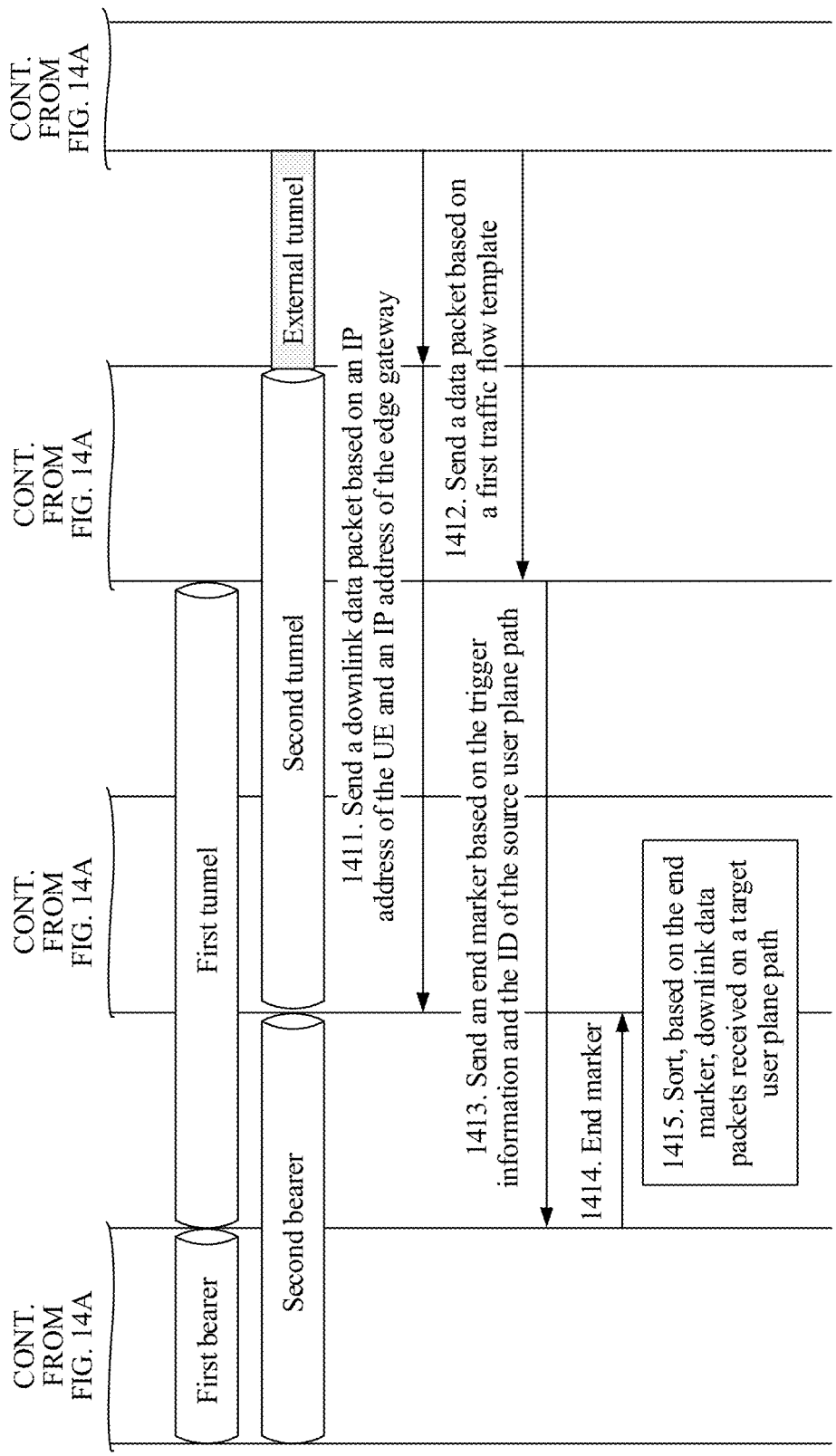

FIG. 14A and FIG. 14B are a schematic diagram of another embodiment of an end marker sending method according to an embodiment of this application, and the method includes the following steps.

In this embodiment of this application, before instructing a management and orchestration (MANO) network element to hand over a path for a local data flow, a control plane first needs to notify a UP GW (a user plane gateway before path handover) of trigger information, and then instruct the MANO to hand over the path for the local data flow. The MANO instructs an access gateway in a local data network to complete path handover by creating a tunnel or updating a tunnel context to activate, for the local data flow, transmission of downlink data on a target user plane path. The UP GW sends an end marker on a source user plane path based on the trigger information, and updates a local data flow context. Details are shown below.

1401. A resource preparation phase of handover based on an S1 interface or an X2 interface.

UE, an AN1 node, an AN2 node, a CP node, the user plane gateway UP GW, an edge gateway edge GW, an access gateway access GW, and the MANO prepare network resources on the target user plane path in a handover procedure of the UE, for example, may prepare network resources for handover based on the X2 interface, or may prepare network resources for handover based on the S1 interface. In this embodiment of this application, an example in which the AN1 node is a source AN node and the AN2 node is a target AN node may be used for description. The source user plane path is a path including the UE, the AN1, the UP GW, and the access GW, and the target user plane path is a path including the UE, the AN2, the edge GW, and an access GW. A first bearer is between the UE and the AN1, and a first tunnel is between the AN1 and the UP GW. A second bearer is between the UE and the AN2, a second tunnel is between the AN2 and the edge GW, and an external tunnel is between the edge GW and the access GW.

1402. The source AN node sends a handover command to the UE.

The source AN node sends the handover command to the UE. The UE receives the handover command sent by the source AN node, that is, the AN1 node instructs the UE to hand over a path.

1403. The UE sends a handover confirmation message to the target AN node.

To be specific, after the UE hands over the path, the AN2 node receives the handover confirmation message sent by the UE.

1404. The target AN node sends a handover notification or a path handover request to the CP node.

To be specific, the AN2 node notifies the CP node that the UE is successfully handed over to an AN2.

1405. The CP node selects the edge gateway based on the handover notification or the path handover request.

The CP node selects, for the UE based on the handover notification or the path handover request, the edge gateway (Edge GW) included on the target user plane path, and activates, for the local data flow, a path from the edge GW to the AN2 node. In other words, the CP node selects a new edge gateway for the local data flow and activates a new user plane path. The local data flow is a data packet sent by a local network. It should be understood that the handover notification or the path handover request herein includes an IP address of the UE and an IP address of the edge gateway.

1406. The CP node sends a session update request to the edge gateway.

It should be understood that the session update request herein may be an update bearer request, and the update bearer request may further carry NG3 interface information. The CP node sends the update bearer request to the edge gateway, and the edge gateway receives the update bearer request sent by the CP node. To be specific, the CP node instructs the edge gateway to create the target user plane path for the local data flow. Information carried in the session update request includes but is not limited to path information of the AN2 node, which is specifically an IP address and a tunnel ID of the AN2 node; path information of the edge gateway: an IP address and a tunnel ID of the edge gateway; a second flow filter template (TFT), which is also referred to as a second traffic flow template; quality of service (QoS) information, and the like. It should be noted that the second traffic flow template herein is used to filter the data packet sent by the local network. In actual application, the second traffic flow template is non-access stratum (NAS) information, and the AN node transmits the second traffic flow template to the UE, so that the UE prepares a context.

1407. The edge gateway sends a session update response to the CP node.

It should be understood that the session update response herein may be an update bearer response. The edge gateway sends the update bearer response to the CP node, and the control plane CP node receives the session update response sent by the edge gateway. The session update response includes an identifier of the target user plane path of the UE, and the target user plane path includes the edge gateway edge GW. In other words, the CP node receives a confirmation message sent by the edge gateway.

1408. The CP node sends trigger information and an ID of the source user plane path to the UP GW based on the session update response.

The CP node sends the trigger information and the ID of the source user plane path to the UP GW based on the session update response. The trigger information and the ID of the source user plane path are used by the UP GW to send the end marker to the AN node on the source user plane path. The user plane gateway UP GW receives the trigger information and the ID of the source user plane path that are sent by the control plane CP node, and the UP GW is located on the source user plane path of the user equipment UE. The CP node may further send the second traffic flow template to the UP GW, and the second traffic flow template herein is used to filter the data packet sent by the local network.

For example, the trigger information herein may be at least one of a first traffic flow template and a timer parameter. The first traffic flow template is used to detect an end data packet, and the end data packet is used to indicate a last data packet transmitted on the source user plane path. To be specific, the trigger information herein has the following several possibilities: (1) the first traffic flow template; (2) the first traffic flow template and the timer parameter; and (3) the timer parameter. The trigger information herein may be an indication identifier. This is not specifically limited. It should be noted that the first traffic flow template herein is different from the second traffic flow template described above. The first traffic flow template herein is used to obtain an end data packet through filtering. To be specific, the UP GW obtains, based on the first traffic flow template, an end data packet sent by the access GW through filtering. When the UP GW obtains the end data packet through filtering, the UP GW sends the end marker to the source AN node.

For example, the second traffic flow template may be further shown in Table 2, or a table obtained after a path identifier ID column is removed from Table 2 may be used as the second traffic flow template.

TABLE 2

| Traffic flow template TFT | Path identifier ID |
|---|---|
| First target traffic flow template: {(192.168.1.1: 10000, 121.14.88.76: 80, TCP), (192.168.1.1: 10000, 121.14.88.77: 80, TCP), . . . } | Path 1 |
| Second target traffic flow template: {(192.168.1.2: 10000, 121.14.88.76: 80, TCP), (192.168.1.2: 10000, 121.14.88.77: 80, TCP), . . . } | Path 2 |
| Third target traffic flow template: {(192.168.1.3: 10000, 121.14.88.76: 80, TCP), (192.168.1.3: 10000, 121.14.88.77: 80, TCP), . . . } | Path 3 |

Further, the timer parameter herein may be an example value, for example, 2 ms. In this case, a value of a timer on a UP GW side may be set to 0-2 ms, and the timer expires when the value of the timer exceeds 2 ms; or the timer may be set to 8-10 ms, and the timer expires when the value of the timer exceeds 10 ms. An initial value of the timer may be specifically determined according to an actual situation. The timer parameter may be an interval parameter, that is, the interval parameter is [a, b]. In this case, the initial value of the timer may be set to a, an expiration value may be set to b, and the timer expires when the timer exceeds b.

Alternatively, the timer parameter may be a and b, where a is the initial value of the timer, and the expiration value is a+b=c. In this case, the timer expires when the timer exceeds c.

It should be further noted that when the trigger information is the timer parameter, after the UP GW receives the trigger information sent by the control plane CP node, the UP GW immediately starts the timer.

Before triggering path handover for the local data flow, the CP node sends an update context request to the UP GW, and the update context request carries the trigger information. The trigger information may be information such as the first traffic flow template and/or the timer parameter, related path information, and a local data flow TFT. The second traffic flow template may also be referred to as a local data flow TFT, and the second traffic flow template may further include one or more pieces of IP 5-tuple information, such as (UE IP, 10000, App IP, 80, GTP-U) and/or (UP GW IP, 10000, edge GW IP, 80, GTP-U). Optionally, the CP node may further send a path handover response to the AN2 node, to notify the AN2 node that a downlink data packet may be transmitted to the UE by using the AN2 node.

1409. The CP node sends a path handover notification or a path handover request to the MANO.

It should be understood that the handover notification or the path handover request herein includes the IP address of the UE and the IP address of the edge gateway, and in actual application, may further include information such as an IP address of an APP.

It should be noted that when the trigger information is the first traffic flow template, or the first traffic flow template and the timer parameter, the handover notification or the path handover request herein further includes the first traffic flow template.

1410. The MANO sends a path handover notification or a path handover request to the access GW (access gateway).

The handover notification or the path handover request may include the Internet protocol IP address of the user equipment UE and the IP address of the edge gateway. When the trigger information in step 1108 is the first traffic flow template, or the first traffic flow template and the timer parameter, the handover notification or the path handover request herein further includes the first traffic flow template. Same as the first traffic flow template sent by the control plane CP node to the user plane gateway UP GW, the first traffic flow template herein is used to determine an end data packet. The edge gateway is located on the target user plane path.

1411. The access GW sends a downlink data packet for the UE to the edge gateway based on the IP address of the UE and the IP address of the edge gateway.

For example, the access gateway may determine the target user plane path of the UE based on the IP address of the UE and the IP address of the edge gateway, to complete handover of a user plane path of the UE. The access GW may send the downlink data packet for the UE on the target user plane path, that is, the access GW sends the downlink data packet for the UE to the edge gateway.

It should be noted that before the user plane path is handed over, the access GW still sends the downlink data packet for the UE on the source user plane path.

1412. The access GW sends a data packet to the UP GW based on the first traffic flow template.

The UP GW is located on the source user plane path, and the UP GW receives an end data packet sent by the access GW. It should be understood that IP 5-tuple information of the end data packet sent herein to the UP GW is determined by the first traffic flow template.

It should be noted that step 1412 is an optional step, that is, when the trigger information in step 1408 is the timer parameter, step 1412 is optional. To be specific, in actual application, (1) when the trigger information is the first traffic flow template, the access GW sends one end data packet to the UP GW based on the first traffic flow template. IP 5-tuple information of the end data packet is the same as one piece of IP 5-tuple information included in the first traffic flow template. (2) When the trigger information is the first traffic flow template and the timer parameter, the access GW sends a plurality of end data packets to the UP GW based on the first traffic flow template. In this case, IP 5-tuple information of the plurality of end data packets may be the same or different. However, all the IP 5-tuple information of the plurality of end data packets needs to be included in the first traffic flow template.

It should be noted that there is no limitation on a time sequence of steps 1411 and 1412. A format of the end data packet may be (UE IP, 10000, App IP, 80, GTP-U) and/or (UP GW IP, 10000, edge GW IP, 80, GTP-U). A key to construction of the end data packet is that the end data packet can reach the UP GW and can be identified by the UP GW. Therefore, the CP node sends the first traffic flow template to the UP GW and the access GW. In addition, the end data packet herein may be constructed by the control plane, the edge gateway, or the like. Specifically, the control plane or the edge gateway generates an empty IP data packet based on the first traffic flow template. An IP data packet header is filled with an IP address and a port number in the first traffic flow template, and a protocol header of an IP data packet payload is filled with information in the first traffic flow template.

1413. The UP GW sends the end marker to the AN node on the source user plane path based on the trigger information and the ID of the source user plane path.

The end marker is used by the AN node to sort one or more downlink data packets received on the target user plane path. The access network AN node receives the end marker sent by the UP GW.

For example, the following cases may be included.

(1) The trigger information includes the first traffic flow template. When IP 5-tuple information of a downlink data packet for the UE that is received by the UP GW is the same as any IP 5-tuple information in the first traffic flow template, the UP GW sends the end marker to the AN node on the source user plane path based on the ID of the source user plane path.

The first traffic flow template herein may be simply understood as an end data packet filter. After detecting an end data packet from an Internet path, the UP GW sends the end marker on the source user plane path, and updates a local data flow context.

(2) The trigger information includes the first traffic flow template and the timer parameter. The UP GW starts a timer when IP 5-tuple information of a downlink data packet for the UE that is received by the UP GW is the same as any IP 5-tuple information in the first traffic flow template, and the timer is set based on the timer parameter. The UP GW restarts the timer if the UP GW receives an end data packet and the timer does not expire, and IP 5-tuple information of the end data packet is the same as any IP 5-tuple information in the first traffic flow template. When the timer expires, the UP GW sends the end marker to the AN node based on the ID of the source user plane path.

To be specific, the UP GW starts the timer after detecting, based on the first traffic flow template, an end data packet sent from the source user plane path. The UP GW resets the timer if the UP GW receives, in a time in which the timer does not expire, a data packet sent by a local network or another subsequent end data packet; or if the UP GW does not receive a data packet sent by a local network or an end data packet and the timer expires, the UP GW immediately sends the end marker on the source user plane path, and updates a local data flow context.

(3) The trigger information includes the timer parameter. The UP GW sets a timer based on the timer parameter; the UP GW starts the timer; and when the timer expires, the UP GW sends the end marker to the AN node on the source user plane path based on the ID of the source user plane path.

Herein, the UP GW immediately starts the timer after receiving the timer parameter. The UP GW resets the timer if the UP GW receives, in a time of the timer, a data packet sent by a local network; or if the UP GW continuously receives no data packet sent by a local network and the timer expires, it indicates that transmission of the data packet sent by the local network on the source user plane path (Internet) ends, and the UP GW sends the end marker on the source user plane path, and updates a local data flow context.

1414. The source AN node sends the end marker to the target AN node.

For example, the source AN node forwards the end marker to the target AN node through a forwarding tunnel between the source AN node and the target AN node.

1415. The target access network AN node sorts, based on the end marker, one or more downlink data packets received on the target user plane path.

It should be noted that before receiving the end marker, the target AN node buffers the one or more downlink data packets received on the target user plane path; and only after receiving the end marker, the target AN node can activate processing on the one or more downlink data packets from the target user plane path.

In this embodiment of this application, the UP GW determines, based on the trigger information and the ID of the source user plane path, when the UP GW to send the end marker. The trigger information may be the first traffic flow template and/or the timer parameter. Then the source AN node forwards the end marker to the target AN node, and the target AN node sorts, based on the end marker, the one or more downlink data packets received on the target user plane path. To be specific, an end marker forwarding method in an EPS system is enhanced to resolve a problem that the UP GW cannot determine when to send the end marker because residual data still exists on the Internet, and consequently a downlink data sequence cannot be ensured. In this embodiment of this application, a function of a user plane gateway may be enhanced, and most functions of a conventional network element may also be reused. There is no need to modify an existing handover procedure to a large extent, and therefore this embodiment of this application is simple and clear, and is easy to implement. In this way, a problem that a small amount of data on the source user plane path is lost due to Internet unreliability is resolved.

Figure 15A:
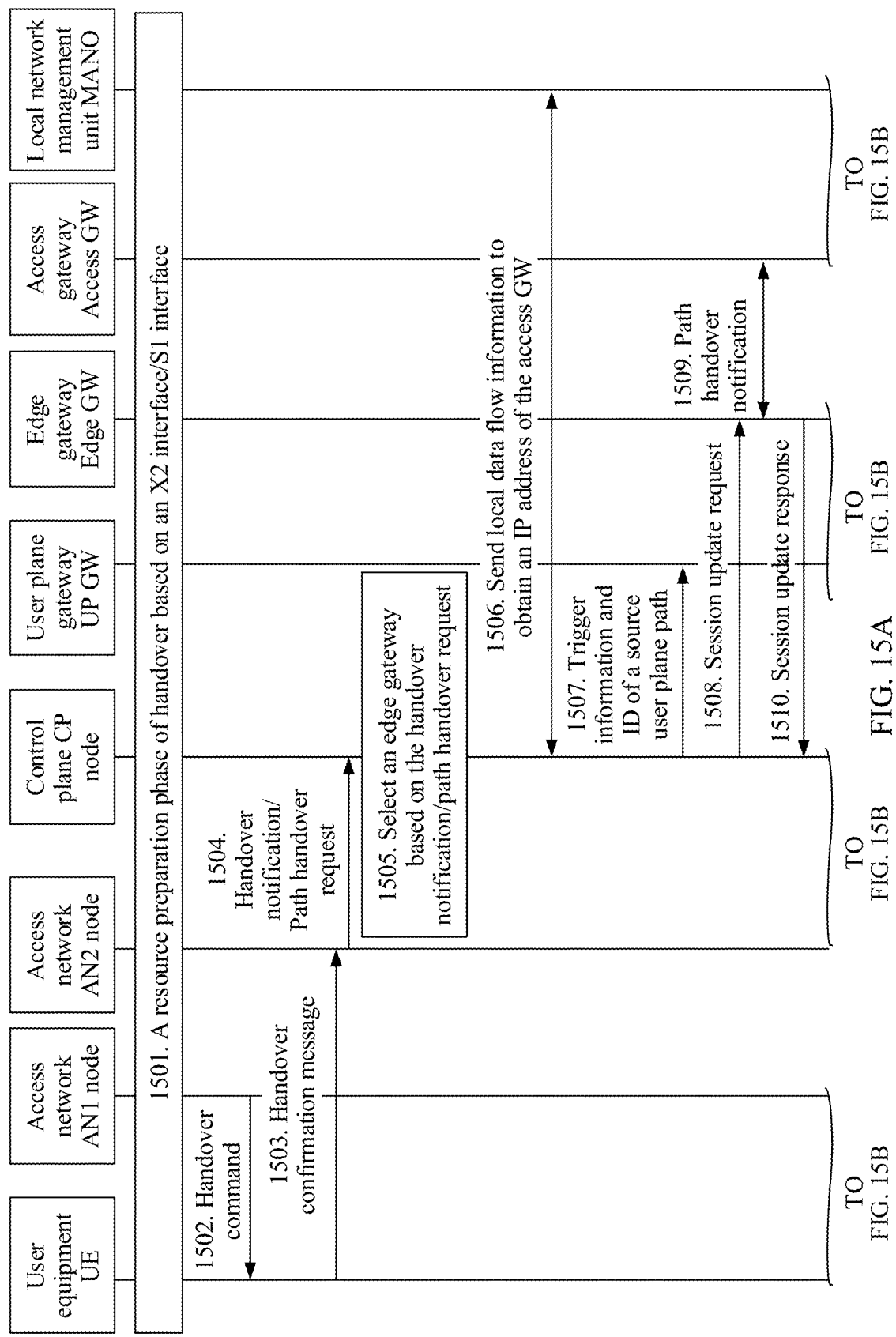
FIG. 15A and FIG. 15B are a schematic diagram of another embodiment of an end marker sending method according to an embodiment of this application.
Figure 15B:
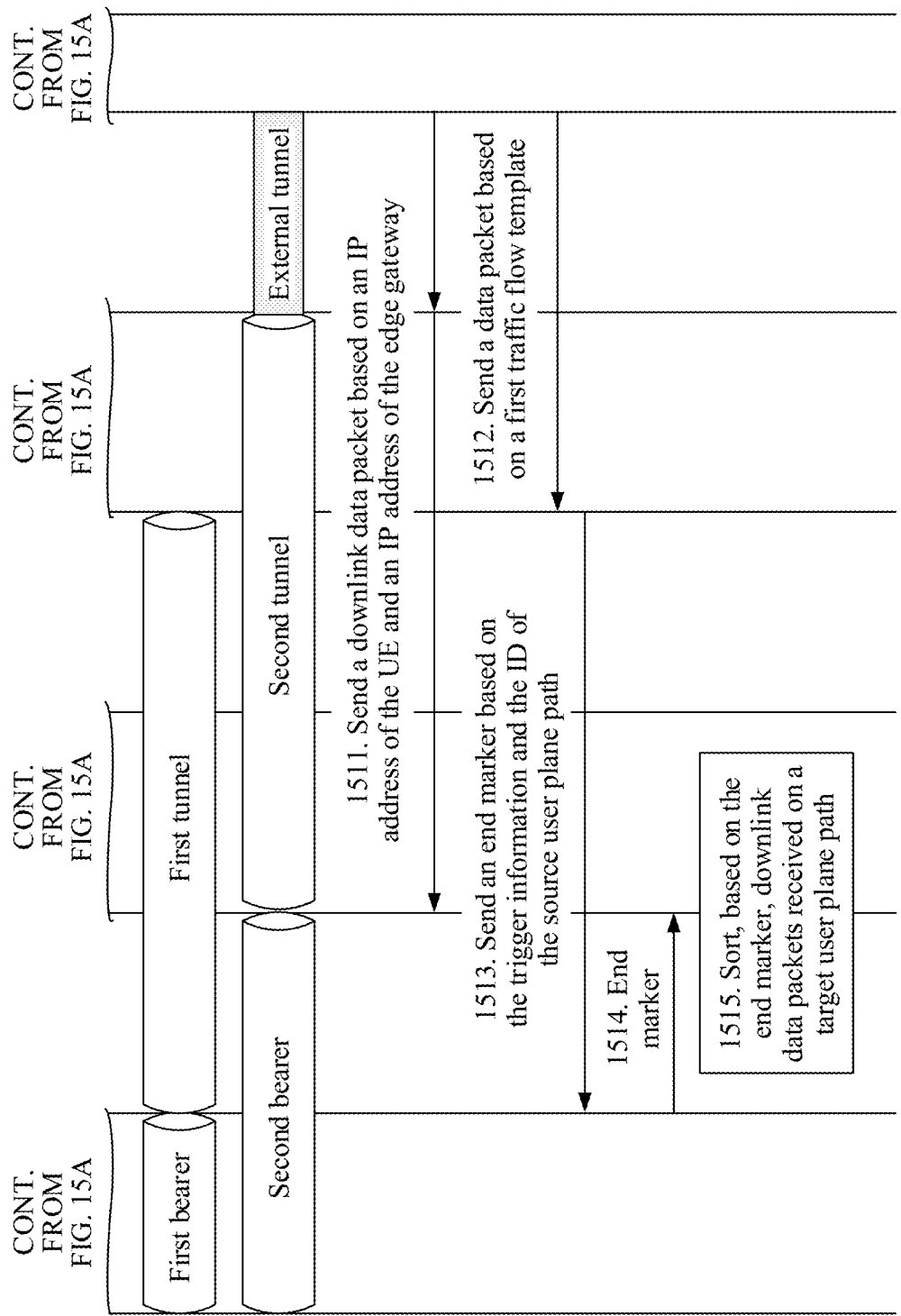

FIG. 15A and FIG. 15B are a schematic diagram of another embodiment of an end marker sending method according to an embodiment of this application, and the method includes the following steps.

Before instructing a management and orchestration (MANO) network element to hand over a path for a local data flow, a control plane first needs to notify a UP GW (a user plane gateway before path handover) of trigger information, and then instruct an edge gateway to hand over the path for the local data flow. The edge gateway instructs an access gateway in a local data network to complete path handover by creating a tunnel or updating a tunnel context to activate, for the local data flow, transmission of downlink data on a target user plane path. The UP GW sends an end marker on a source user plane path based on the trigger information, and updates a local data flow context. Details are shown below.

1501. A resource preparation phase of handover based on an S1 interface or an X2 interface.

1502. A source AN node sends a handover command to UE.

1503. The UE sends a handover confirmation message to a target AN node.

1504. The target AN node sends a handover notification or a path handover request to a CP node.

1505. The CP node selects the edge gateway based on the handover notification or the path handover request.

In this embodiment of this application, steps 1501 to 1505 are similar to steps 1401 to 1405 in FIG. 14A. Details are not described herein again.

1506. The CP node sends local data flow information to the MANO to obtain an IP address of the access GW.

The CP node sends the local data flow information to the MANO. The MANO sends the IP address of the access GW to the CP node based on the local data flow information. The local data flow information includes a local IP address that is being used by the UE. The MANO finds, based on local configuration information, access gateway information of a local network in which the local IP address is located.

1507. The CP node sends trigger information and an ID of the source user plane path to the UP GW.

The CP node sends the trigger information and the ID of the source user plane path to the UP GW. The trigger information and the ID of the source user plane path are used by the UP GW to send the end marker to the source AN node. The user plane gateway UP GW receives the trigger information and the ID of the source user plane path that are sent by the control plane CP node, and the UP GW is located on the source user plane path of the user equipment UE. The CP node may further send a second traffic flow template to the UP GW, and the second traffic flow template herein is used to filter a data packet sent by the local network.

For example, the trigger information herein may be at least one of a first traffic flow template and a timer parameter. The first traffic flow template is used to detect an end data packet, and the end data packet is used to indicate a last data packet transmitted on the source user plane path. For details, refer to descriptions in step 1408 in FIG. 14A. Details are not described herein again.

1508. The CP node sends a session update request to the edge gateway.

In this embodiment of this application, step 1508 is similar to step 1406 in FIG. 14A. Details are not described herein again.

1509. The edge gateway sends a path handover notification or a path handover request to the access GW.

It should be understood that the handover notification or the path handover request herein includes the IP address of the UE and an IP address of the edge gateway. It should be noted that when the trigger information is the first traffic flow template, or the first traffic flow template and the timer parameter, the handover notification or the path handover request herein further includes the first traffic flow template.

1510. The edge gateway sends a session update response to the CP node.

1511. The access GW sends a downlink data packet for the UE to the edge gateway based on the IP address of the UE and the IP address of the edge gateway.

1512. The access GW sends a data packet to the UP GW based on the first traffic flow template.

1513. The UP GW sends the end marker to the source AN node based on the trigger information.

1514. The source AN node sends the end marker to the target AN node.

1515. The target access network AN node sorts, based on the end marker, one or more downlink data packets received on the target user plane path.

In this embodiment of this application, step 1510 is similar to step 1407 in FIG. 14A, and steps 1511 to 1515 are similar to steps 1411 to 1415 in FIG. 14B. Details are not described herein again.

In this embodiment of this application, compared with the embodiment shown in FIG. 14A and FIG. 14B, a difference lies in that the control plane CP node does not hand over a path by using the MANO, and instead, instructs the edge gateway to establish a tunnel to the access gateway in the local data network or update an existing tunnel context, to complete path handover for the local data flow. A source user plane gateway is enhanced to support the control plane node in carrying the trigger information. The user plane gateway determines, based on the trigger information, an end of the local data flow on the source user plane path, to send the end marker and update a user plane context. To be specific, the UP GW determines, by using an end data packet and/or whether a timer expires, when to send the end marker, to assist the target AN node in sorting downlink data received on the target user plane path. To be specific, an end marker forwarding method in an EPS system is enhanced to resolve a problem that the user plane gateway cannot determine when to send the end marker because residual data still exists on the Internet, and consequently a downlink data sequence cannot be ensured. Therefore, a function of the user plane gateway is enhanced, and most functions of a conventional network element may also be reused. There is no need to modify an existing handover procedure to a large extent, and therefore this embodiment of this application is simple and clear, and is easy to implement.

Figure 16B:
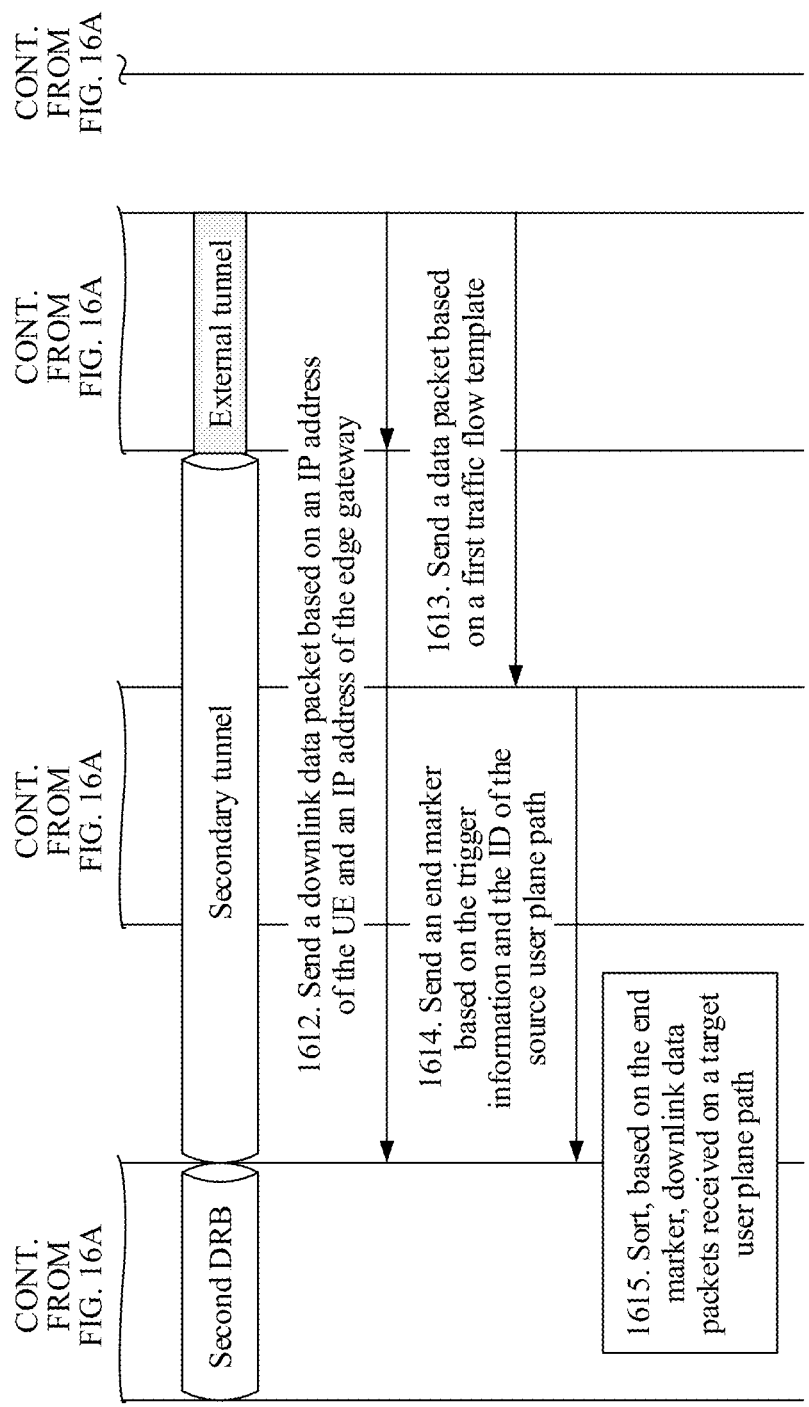

FIG. 16A and FIG. 16B are a schematic diagram of another embodiment of an end marker sending method according to an embodiment of this application, and the method includes the following steps.

In this embodiment of this application, currently an AN node cannot identify, based on an identifier of a source user plane path, a local data flow for which a path needs to be handed over, and no assistance can be provided in sorting, by the AN node, one or more downlink data packets received on a target user plane path. Therefore, when establishing the target user plane path, a CP node needs to send a flow handover indication message to the AN node, and the AN node detects the following event based on the flow handover indication message: whether data packets (a data packet sent by a local network and a data packet sent by the Internet) on an original air-interface data bearer that are before an end marker is received are successfully sent to UE. If the data packets are successfully sent to the UE, the AN node then sorts, based on the end marker, the one or more downlink data packets received on the target user plane path. Details are shown below.

1601. The CP node selects an edge gateway based on a received user plane report/handover request/application request.

The CP node selects the edge gateway for the local data flow after receiving the handover request sent by the AN node, or the application request sent by an MANO, or the user plane report sent by a UP GW. The edge gateway is located on the target user plane path. For example, a function of the user plane report is as follows: The user plane report is sent to the CP node, to indicate that the local data flow of the UE currently exists. In this case, the CP node knows the message that the local data flow exists. The source user plane path is a path including the UE, the AN, the UP GW, and an access GW, and the target user plane path is a path including the UE, the AN, the edge GW, and an access GW. It should be noted that a first data radio bearer (DRB), on the source user plane path, between the UE and the AN node is different from a second data radio bearer, on the target user plane path, between the UE and the AN node. Before a path of the UE is handed over, a first bearer DRB is between the UE and the AN node, and a primary tunnel is between the AN node and the UP GW. After the path of the UE is handed over, a second bearer DRB is between the UE and the AN node, a secondary tunnel is between the AN node and the edge GW, and an external tunnel is between the edge GW and the access GW.

1602. The CP node sends a bearer configuration request to the AN node, where the bearer configuration request includes the flow handover indication message.

The CP node sends the bearer configuration request (Bearer Setup Request) to the AN node, and the AN node receives the bearer configuration request sent by the CP node. The bearer configuration request includes information such as the flow handover indication information, the ID of the source user plane path, path information of the edge gateway, and a second traffic flow template. The flow handover indication message is used to instruct the AN node to determine, when the end marker is received, whether one or more downlink data packets received by the AN node on the source user plane path are successfully sent to the UE. To be specific, the CP node instructs the AN node to prepare a resource for the target user plane path. The bearer configuration request carries the path information of the edge gateway, and also carries a path reselection indication for the local data flow. In actual application, the second traffic flow template is used to filter the data packet sent by the local network, and is non-access stratum (NAS) information. The AN node transmits the second traffic flow template to the UE, so that the UE prepares a context.

1603. The AN node sends a radio resource control (RRC) connection reconfiguration (RRC Connection Reconfiguration) message to the UE.

1604. The UE sends an RRC message to the AN node.

Steps 1603 and 1604 are used by the AN node to prepare an air-interface data bearer.

1605. The AN node sends a bearer configuration response (Bearer Setup Response) to the CP node.

It should be noted that the one or more downlink data packets received by the AN node on the source user plane path include the data packet sent by the local network and the Internet data packet. Original path handover for the UE is to hand over the data packet sent by the local network to the target user plane path, to transmit the data packet to the UE. However, the AN node receives the flow handover indication message, and the flow handover indication message is used to instruct the AN node to determine, when the end marker is received, whether the one or more downlink data packets received by the AN node on the source user plane path are successfully sent to the UE. Therefore, after completing preparation of the air-interface data bearer, the AN node may transmit, on the first DRB, the one or more downlink data packets received on the source user plane path to the UE.

1606. The UE sends a path handover confirmation message to the CP node.

To be specific, after completing handover for the local data flow, the UE sends a response message to a control plane.

1607. The CP node sends local data flow information to the MANO to obtain an IP address of the access GW.

The local data flow information includes a local IP address that is being used by the UE. The MANO finds, based on local configuration information, access gateway information of a local network in which the local IP address is located.

1608. The CP node sends trigger information and the ID of the source user plane path to the UP GW.

The trigger information and the ID of the source user plane path are used by the UP GW to send the end marker to the AN node. The CP node may further send the second traffic flow template to the UP GW, and the second traffic flow template herein is used to filter the data packet sent by the local network.

For example, the trigger information herein may be at least one of a first traffic flow template and a timer parameter. The first traffic flow template is used to detect an end data packet, and the end data packet is used to indicate a last data packet transmitted on the source user plane path. For details, refer to descriptions in step 1408 in FIG. 14A. Details are not described herein again.

1609. The CP node sends a session update request to the edge gateway.

It should be understood that the session update request herein may be a bearer configuration request (Bearer Setup Request), and is used by the CP node to instruct the edge gateway to create the target user plane path for the local data flow. Information carried in the session update request includes but is not limited to path information of the AN node, which is specifically an IP address and a tunnel ID of an AN; path information of the edge gateway: an IP address and a tunnel ID of the edge gateway; a second flow filter template (TFT), which is also referred to as a second traffic flow template; quality of service (QoS) information, and the like. It should be noted that the second traffic flow template herein is used to filter the data packet sent by the local network.

1610. The edge gateway sends a path handover notification to the access GW.

It should be understood that the handover notification herein includes the IP address of the UE and the IP address of the edge gateway. It should be noted that when the trigger information is the first traffic flow template, or the first traffic flow template and the timer parameter, the handover notification or the path handover request herein further includes the first traffic flow template. The first traffic flow template herein is used to determine an end data packet.

1611. The edge gateway sends a session update response to the CP node.

It should be understood that the session update response herein may be a bearer configuration response (Berarer Setup Response). The bearer configuration response may include an identifier of the target user plane path of the UE, and the target user plane path includes the edge gateway edge GW. In other words, the CP node receives a confirmation message sent by the edge gateway.

1612. The access GW sends a downlink data packet for the UE to the edge gateway based on the IP address of the UE and the IP address of the edge gateway.

1613. The access GW sends a data packet to the UP GW based on the first traffic flow template.

1614. The UP GW sends the end marker to the access network AN node on the source user plane path based on the trigger information and the ID of the source user plane path.

In this embodiment of this application, steps 1612 to 1614 are similar to steps 1411 to 1413 shown in FIG. 14B. Details are not described herein again.

1615. The AN node sorts, based on the end marker, one or more downlink data packets received on the target user plane path.

When the AN node receives the end marker on the source user plane path, the AN node determines whether the one or more downlink data packets received by the AN node on the source user plane path are successfully sent to the UE. If the downlink data packets received by the AN node on the source user plane path are successfully sent to the UE, the AN node sorts, based on the end marker, the one or more downlink data packets received by the AN node on the target user plane path of the UE; or if at least one data packet in the one or more downlink data packets received by the AN node on the source user plane path fails to be sent to the UE, the AN node sends the at least one data packet to the UE.

It should be understood that the one or more downlink data packets received by the AN node herein include the data packet sent by the local network and the Internet data packet. The data packet sent by the local network is generated by the local data network and sent by the Internet, and the Internet data packet is sent by the Internet. It should be noted that before receiving the end marker, the AN node buffers the one or more downlink data packets received on the target user plane path. To be specific, based on the flow handover indication message, only after receiving the end marker and all the data packets on the original air-interface data bearer are sent, the AN node can activate processing on the one or more downlink data packets from the target user plane path.

For example, before receiving the end marker, the AN node sends, on the first DRB, the downlink data packets received on the source user plane path to the UE. If the AN node receives ten downlink data packets on the source user plane path, the AN sends the ten downlink data packets to the UE on the first DRB. If the downlink data packets are successfully sent to the UE, the AN node receives success identifiers fed back by the UE.

When the AN node receives the end marker, if the AN node receives the ten success identifiers fed back by the UE, it is proved that all the data packets sent by the UE to the UE on the first DRB are successfully sent. In this case, the AN node may sort, based on a sequence number in the end marker, the downlink data packets received on the target user plane path, and send sorted downlink data packets to the UE on the second DRB.

Alternatively, when the AN node receives the end marker, if the AN node receives only eight success identifiers fed back by the UE, it is proved that not all the data packets sent by the UE to the UE on the first DRB are successfully sent to the UE. If the remaining two downlink data packets have not been sent, the AN node sends the remaining two downlink data packets to the UE on the first DRB, and waits for success identifiers that are fed back. Alternatively, if the remaining two downlink data packets have been sent, but the AN node has not received success identifiers that are fed back by the UE, the AN node continues to wait until the remaining two downlink data packets are successfully sent to the UE. In this way, the AN node may sort, based on a sequence number in the end marker, the downlink data packets received on the target user plane path, and send sorted downlink data packets to the UE on the second DRB.

In this embodiment of this application, the UP GW determines, by using an end data packet and/or whether a timer expires, when the UP GW to send the end marker, to assist the AN node in sorting one or more downlink data packets. Further, on an air interface, the air-interface data bearer is used for sending a downlink data packet received on the source user plane path. When a path resource on the AN node is created, the flow handover indication message is sent, and the flow handover indication message is used to instruct the AN node to determine, when the end marker on the source user plane path is received, whether one or more downlink data packets received by the AN node on the source user plane path are successfully sent to the UE. If the one or more downlink data packets are successfully sent to the UE, the AN node may sort, based on the end marker, one or more downlink data packets received on the target user plane path, that is, the AN node can determine a time for activating the one or more downlink data packets received on the target user plane path, so as to resolve a packet disorder problem caused because the AN node cannot identify the local data flow on the path to be handed over.

Figure 17B:
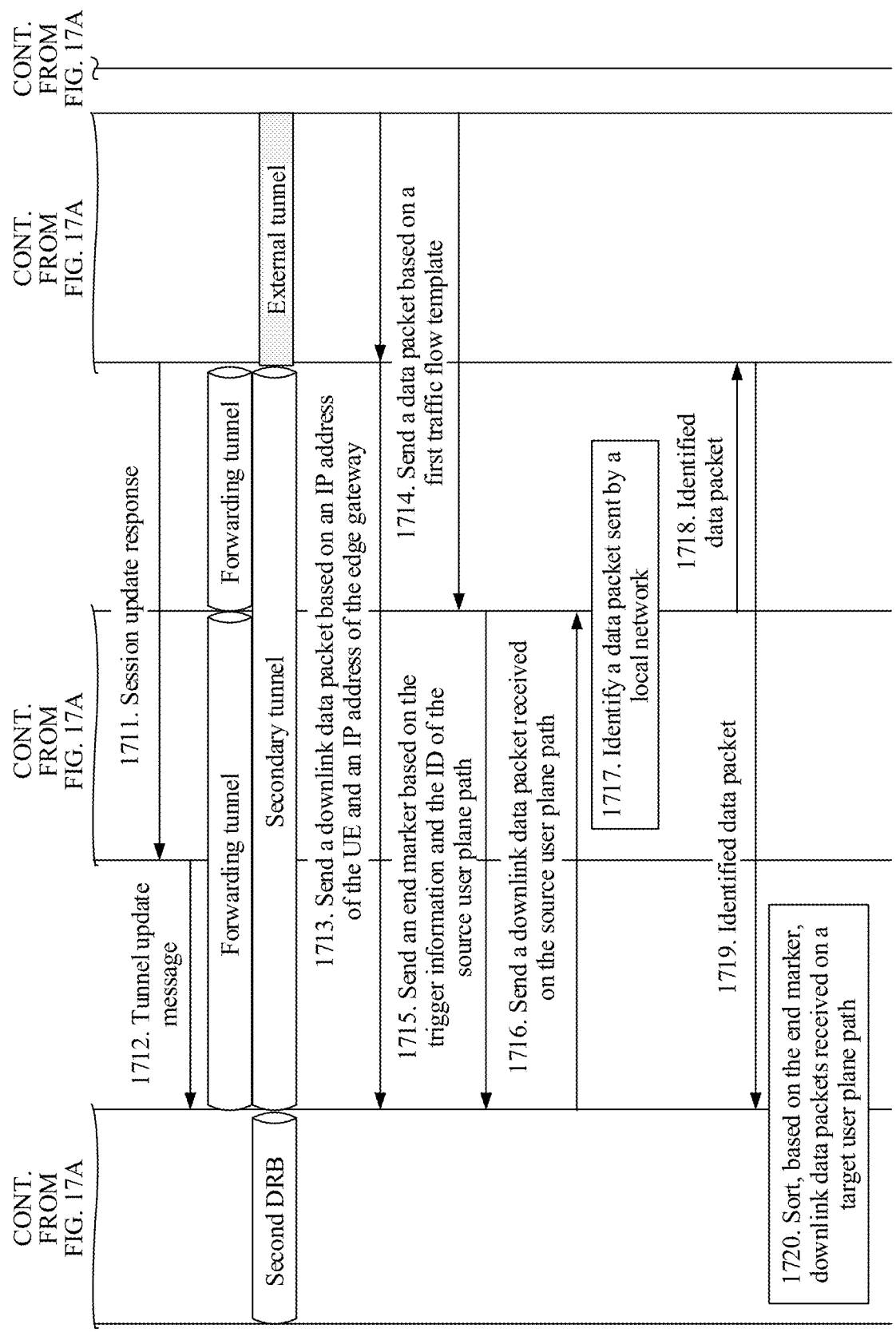

FIG. 17A and FIG. 17B are a schematic diagram of another embodiment of an end marker sending method according to an embodiment of this application, and the method includes the following steps.

In this embodiment of this application, an AN node does not need to identify a local data flow, and instead, selects an offloading node from a core network when preparing a path resource, and forwards one or more downlink data packets received by the AN node on a source user plane path to the offloading node, so that the offloading node helps identify the local data flow, and then send the local data flow to an edge gateway. The edge gateway further sends the local data flow to the AN node. After receiving an end marker, the AN node sorts, based on the end marker, one or more downlink data packets received on a target user plane path. As shown below, the offloading node is described by using a UP GW as an example.

1701. A CP node selects the edge gateway based on a received user plane report/handover request/application request.

The CP node selects the edge gateway for the local data flow after receiving the handover request sent by the AN node, or the application request sent by an MANO, or the user plane report sent by the UP GW. The edge gateway is located on the target user plane path. For example, a function of the user plane report is as follows: The user plane report is sent to the CP node, to indicate that the local data flow of UE exists on the source user plane path. In this case, the CP node knows the message that the local data flow exists. The source user plane path is a path including the UE, the AN node, the UP GW, and an access GW, and the target user plane path is a path including the UE, the AN node, the edge GW, and an access GW. It should be noted that a first data radio bearer (DRB), on the source user plane path, between the UE and the AN node is different from a second data radio bearer, on the target user plane path, between the UE and the AN node. Before a path of the UE is handed over, a first bearer DRB is between the UE and the AN node, and a primary tunnel is between the AN node and the UP GW. After the path of the UE is handed over, a second bearer DRB is between the UE and the AN node, a secondary tunnel is between the AN node and the edge GW, and an external tunnel is between the edge GW and the access GW.

1702. The CP node sends a bearer configuration request to the AN node.

The CP node sends the bearer configuration request (Bearer Setup Request) to the AN node, and the AN node receives the bearer configuration request sent by the CP node. The bearer configuration request includes information such as path information of the edge gateway and a second traffic flow template. To be specific, the CP node instructs the AN node to prepare a resource for the target user plane path, the bearer configuration request carries the information such as the path information of the edge gateway and the second traffic flow template, and the second traffic flow template is used to filter a data packet sent by a local network. In actual application, the second traffic flow template is non-access stratum (NAS) information, and the AN node transmits the second traffic flow template to the UE, so that the UE prepares a context.

1703. The AN node sends an RRC connection reconfiguration message to the UE.

1704. The UE sends an RRC connection reconfiguration complete message to the AN node.

1705. The AN node sends a bearer configuration response to the CP node.

1706. The UE sends a path handover confirmation message to the CP node.

1707. The CP node sends local data flow information to the MANO to obtain an IP address of the access GW.

1708. The CP node sends trigger information and an ID of the source user plane path to the UP GW.

1709. The CP node sends a session update request to the edge gateway.

1710. The edge gateway sends a path handover notification to the access GW.

1711. The edge gateway sends a session update response to the CP node.

In this embodiment of this application, steps 1703 to 1711 are similar to steps 1603 to 1611 shown in FIG. 16A and FIG. 16B. Details are not described herein again.

1712. The CP node sends a tunnel update message to the AN node, where the tunnel update message includes a flow handover indication message.

The CP node sends the tunnel update message to the AN node, and the AN node receives the tunnel update message sent by the CP node. The tunnel update message includes the flow handover indication message and the ID of the source user plane path, and the flow handover indication message is used to instruct the AN node to send a downlink data packet received by the AN node on the source user plane path to the UP GW. The downlink data packet received by the AN node includes the data packet sent by the local network and/or an Internet data packet.

1713. The access GW sends a downlink data packet for the UE to the edge gateway based on an IP address of the UE and an IP address of the edge gateway.

1714. The access GW sends a data packet to the UP GW based on a first traffic flow template.

1715. The UP GW sends the end marker to the access network AN node on the source user plane path based on the trigger information and the ID of the source user plane path.

In this embodiment of this application, it should be noted that steps 1713 to 1715 are similar to steps 1411 to 1413 shown in FIG. 14B. Details are not described herein again.

1716. The AN node sends, based on the flow handover indication message, one or more downlink data packets received by the AN node on the source user plane path to the UP GW.

It should be noted that when receiving the end marker, the AN node also forwards the end marker to the UP GW, but stops forwarding the downlink data packet received by the AN node on the source user plane path to the UP GW.

For example, if the AN node receives 15 data packets in total, the AN node forwards the 15 data packets to the UP GW through the forwarding tunnel shown in FIG. 14A and FIG. 14B. It should be noted that when the AN node receives one or more downlink data packets for the UE on the target user plane path, the AN node buffers the one or more downlink data packets, and does not sort the one or more downlink data packets.

1717. The UP GW identifies, based on the second traffic flow template and the ID of the source user plane path, the data packet sent by the local network from the one or more downlink data packets sent by the AN node that are received on the source user plane path.

It should be noted that in step 1708 in this embodiment of this application, the CP node further sends the second traffic flow template to the UP GW, and the second traffic flow template is used to identify the data packet sent by the local network. In this case, the UP GW identifies, based on the second traffic flow template and the ID of the source user plane path, the data packet sent by the local network from the one or more downlink data packets sent by the AN node that are received on the source user plane path.

To be specific, the UP GW identifies, based on the second traffic flow template and the ID of the source user plane path, ten data packets sent by the local network from the 15 data packets, and then sends remaining five Internet data packets to the AN node through a forwarding tunnel between the UP GW and the AN node. The AN node sends the five Internet data packets to the UE on the first DRB.

It should be noted that the ID of the source user plane path is an EPS bearer ID in 4G, and is a packet data unit session ID (Protocol Data Unit Session Identifier, PDU Session ID) in 5G. A correspondence between a path ID and a specific interface for implementing a path is stored in a context. For example, the correspondence is shown in Table 3:

TABLE 3

| Traffic flow template TFT | Path identifier ID |
|---|---|
| First target traffic flow template: {(192.168.1.1: 10000, 121.14.88.76: 80, TCP), (192.168.1.1: 10000, 121.14.88.77: 80, TCP), . . . } | Path 4 |
| Second target traffic flow template: {(192.168.1.2: 10000, 121.14.88.76: 80, TCP), (192.168.1.2: 10000, 121.14.88.77: 80, TCP), . . . } | Path 5 |
| Third target traffic flow template: {(192.168.1.3: 10000, 121.14.88.76: 80, TCP), (192.168.1.3: 10000, 121.14.88.77: 80, TCP), . . . } | Path 6 |

1718. The UP GW forwards the identified data packet to the edge gateway.

For example, the UP GW forwards, to the edge gateway through a forwarding tunnel between the UP GW and the edge gateway, the ten data packets sent by the local network. It should be noted that when the UP GW receives the end marker, the UP GW forwards the end marker to the edge gateway.

1719. The edge gateway forwards the received identified data packet to the AN node.

For example, the edge gateway further forwards, to the AN node through the secondary tunnel, the ten data packets sent by the local network. It should be noted that when receiving the end marker forwarded by UP GW, the edge gateway forwards the end marker to the AN node.

It should be noted that there is no limitation on a time sequence of steps 1713 to 1715 and a time sequence of steps 1716 to 1719.

1720. The AN node sorts, based on the end marker, one or more downlink data packets received on the target user plane path.

It should be understood that the data packets currently received by the AN node may include: (1) the Internet data packets forwarded back by the UP GW; (2) the data packets sent by the local network that are forwarded back by the edge gateway; (3) the one or more downlink data packets received on the target user plane path; and (4) the end marker forwarded from the edge gateway.

The AN node sends the Internet data packets (five Internet data packets) to the UE on the first DRB, and sends, to the UE on the second DRB, the data packets (ten data packets) sent by the local network. The AN node sorts, based on the end marker, the downlink data packets received on the target user plane path, and then sends sorted downlink data packets to the UE by using the second DRB.

Further, when receiving the end marker, the AN node may determine whether the Internet data packets sent by the AN node to the UE are successfully sent. If the Internet data packets are successfully sent, the AN node sorts, based on the end marker, the downlink data packets received on the target user plane path. Alternatively, if the Internet data packets fail to be sent, the AN node may continue to send the Internet data packets to the UE. When the Internet data packets are successfully sent, the AN node sorts, based on the end marker, the downlink data packets received on the target user plane path.

It should be noted that in this embodiment of this application, there are many different implementations, for example, another offloading unit such as the edge GW in the core network may be selected, and different forwarding paths may be established, for example, AN-UP GW-edge GW, AN-UP GW-AN, AN-edge GW-UP GW, AN-edge GW-edge GW, and AN-edge GW-AN-UP GW. For details, refer to the embodiment shown in FIG. 14A and FIG. 14B. Details are not described herein again.

In this embodiment of this application, the UP GW determines, by using an end data packet and/or whether a timer expires, when the UP GW to send the end marker, to assist the AN node in sorting the one or more downlink data packets received on the target user plane path. Compared with FIG. 13, a difference lies in that the UP GW in the core network is selected as the offloading node. To be specific, the AN node first forwards, back to the UP GW, the downlink data packet sent by the UP GW to the AN node, until receiving the end marker and normal transmission is restored. After detecting the end data packet, the UP GW sends the end marker on the source user plane path, and stops sending the data packet on the source user plane path until receiving the end marker forwarded back by the AN node. The UP GW detects, from the forwarded data packet, the data packet sent by the local network, and forwards the data packet to the edge GW. After receiving the end marker forwarded back by the AN node, the UP GW sends the end marker to the edge GW. After receiving the end marker, the edge GW forwards the end marker back to the AN node, and activates sorting of the one or more downlink data packets on the target user plane path.

Figure 18A:
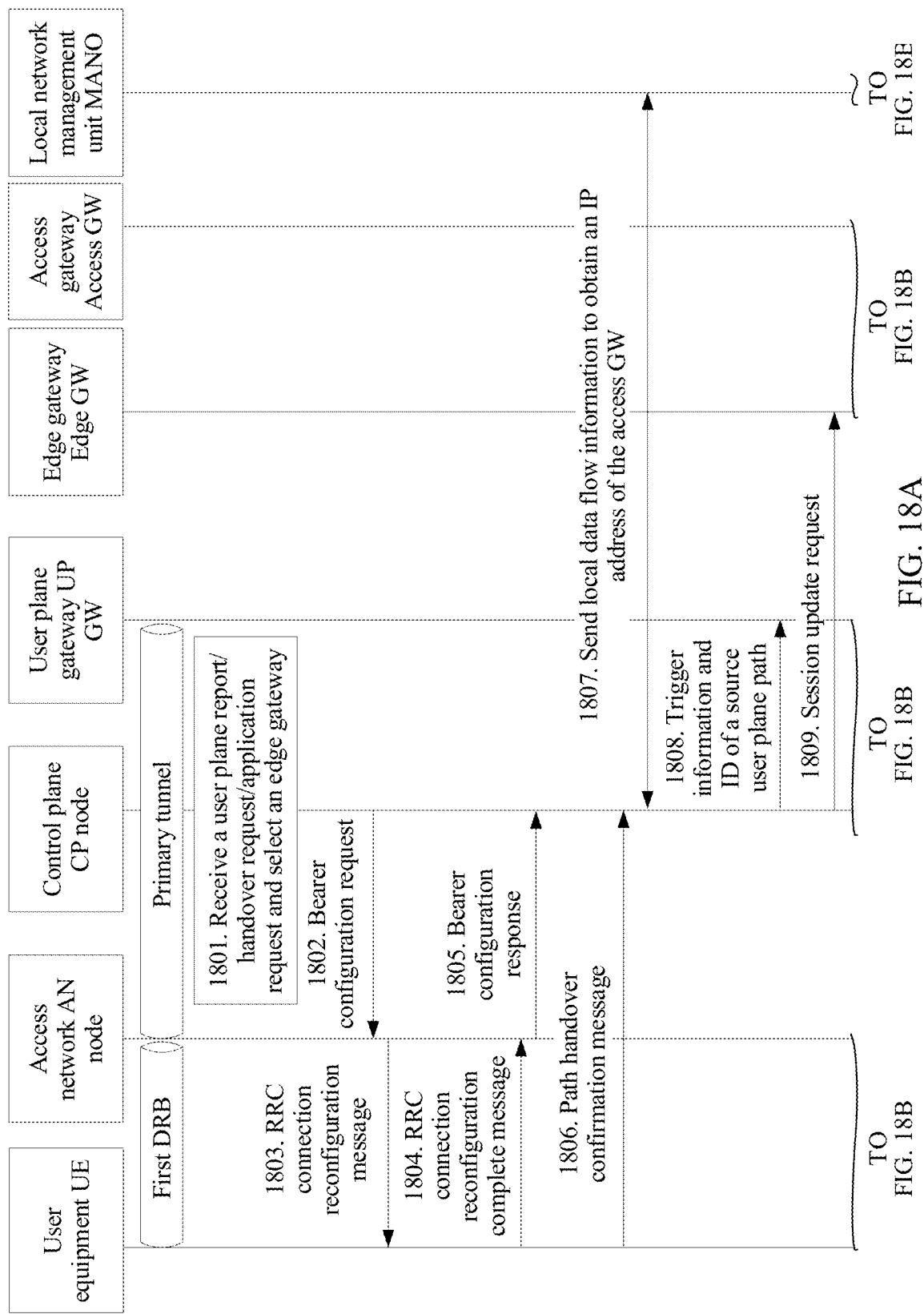
FIG. 18A and FIG. 18B are a schematic diagram of another embodiment of an end marker sending method according to an embodiment of this application.
Figure 18B:
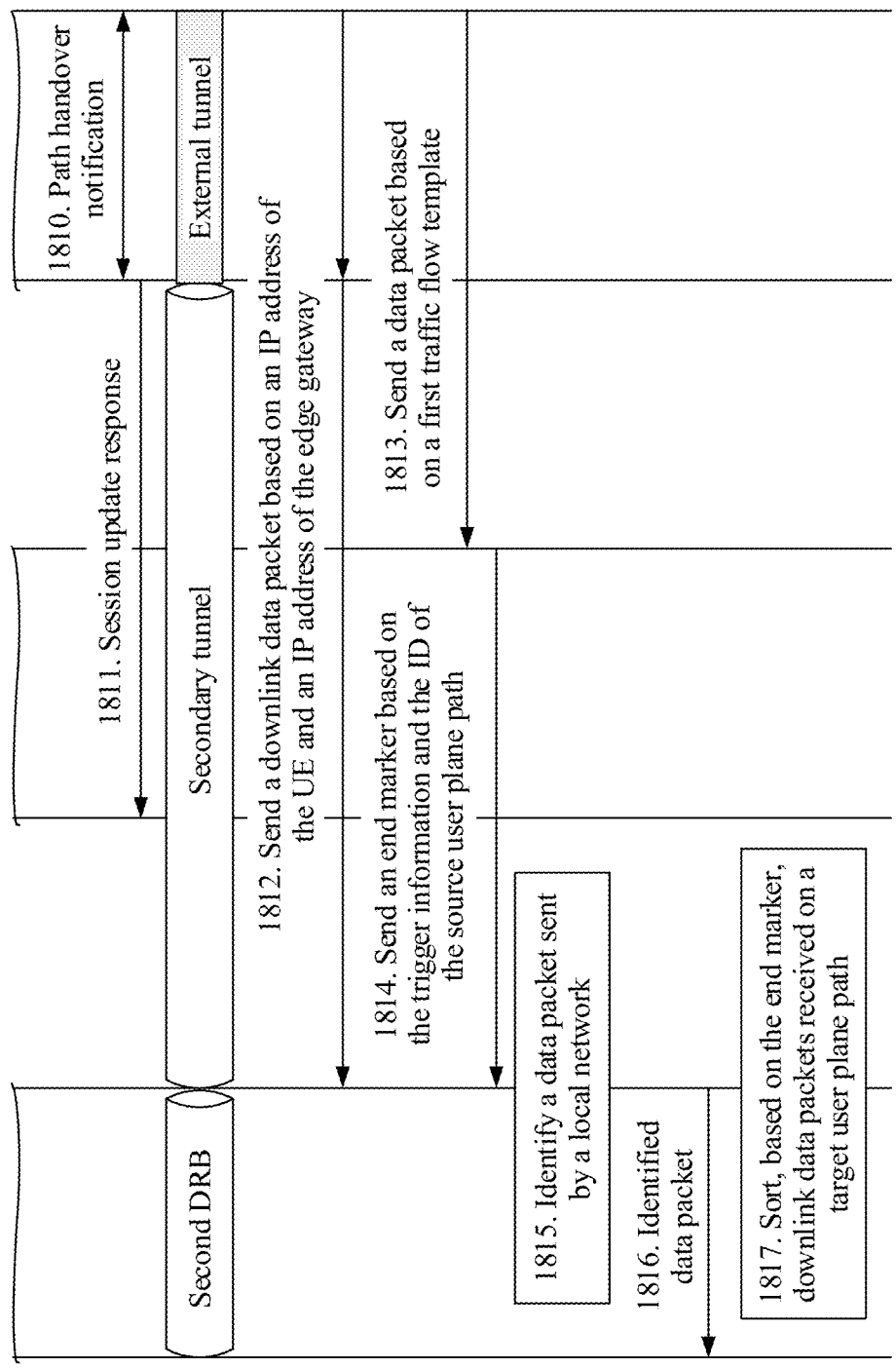

FIG. 18A and FIG. 18B are a schematic diagram of another embodiment of an end marker sending method according to an embodiment of this application, and the method includes the following steps.

In this embodiment of this application, an AN node may temporarily support a TFT. To be specific, the AN node may identify, based on the TFT, a local data flow from one or more downlink data packets received on a target user plane path, and send the local data flow to UE by using a second DRB. The AN node then sorts, based on an end marker, the one or more downlink data packets received on the target user plane path. Details are shown below.

1801. A CP node selects an edge gateway based on a received user plane report/handover request/application request.

The CP node selects the edge gateway for the local data flow after receiving the handover request sent by the AN node, or the application request sent by an MANO, or the user plane report sent by a UP GW. The edge gateway is located on the target user plane path. For example, a function of the user plane report is as follows: The user plane report is sent to the CP node, to indicate that the local data flow of the UE currently exists. In this case, the CP node knows the message that the local data flow exists. A source user plane path is a path including the UE, the AN node, the UP GW, and an access GW, and the target user plane path is a path including the UE, the AN node, the edge GW, and an access GW. It should be noted that a first data radio bearer (DRB), on the source user plane path, between the UE and the AN is different from a second data radio bearer, on the target user plane path, between the UE and the AN node. Before a path of the UE is handed over, a first bearer DRB is between the UE and the AN node, and a primary tunnel is between the AN node and the UP GW. After the path of the UE is handed over, a second bearer DRB is between the UE and the AN node, a secondary tunnel is between the AN node and the edge GW, and an external tunnel is between the edge GW and the access GW.

1802. The CP node sends a bearer configuration request (Bearer Setup Request) to the AN node.

The bearer configuration request includes flow handover indication information, an ID of the source user plane path, path information of the edge gateway, and a second traffic flow template. The flow handover indication message is used to instruct the AN node to send, to the UE based on the traffic flow template and the ID of the source user plane path by using a target DRB, a data packet that is sent by a local network and that is received by the AN node on the source user plane path. The target DRB, namely, the second DRB, is a transmission path between the UE and the AN node on the target user plane path of the UE. The second traffic flow template is used to filter the data packet sent by the local network.

The CP node instructs the AN node to prepare a resource for the target user plane path. The bearer configuration request carries the path information of the edge gateway and the ID of the source user plane path, and also carries a path reselection indication for the local data flow and the second traffic flow template.

1803. The AN node sends an RRC connection reconfiguration message to the UE.

1804. The UE sends an RRC connection reconfiguration complete message to the AN node.

1805. The AN node sends a bearer configuration response to the CP node.

1806. The UE sends a path handover confirmation message to the CP node.

1807. The CP node sends local data flow information to the MANO to obtain an IP address of the access GW.

1808. The CP node sends trigger information and the ID of the source user plane path to the UP GW.

1809. The CP node sends a session update request to the edge gateway.

1810. The edge gateway sends a path handover notification to the access GW.

1811. The edge gateway sends a session update response to the CP node.

In this embodiment of this application, it should be noted that steps 1803 to 1811 are similar to steps 1603 to 1611 shown in FIG. 16A and FIG. 16B. Details are not described herein again.

1812. The access GW sends a downlink data packet for the UE to the edge gateway based on an IP address of the UE and an IP address of the edge gateway.

1813. The access GW sends a data packet to the UP GW based on a first traffic flow template.

1814. The UP GW sends the end marker to the access network AN node on the source user plane path based on the trigger information and the ID of the source user plane path.

In this embodiment of this application, it should be noted that steps 1812 to 1814 are similar to steps 1411 to 1413 shown in FIG. 14B. Details are not described herein again.

1815. The AN node identifies, based on the traffic flow template and the ID of the source user plane path, the data packet sent by the local network.

The AN node identifies, based on the second traffic flow template and the ID of the source user plane path, the data packet sent by the local network. The data packet sent by the local network is sent by the local data network by using the Internet. For example, because the traffic flow template includes a plurality of pieces of IP 5-tuple information, and each data packet includes IP 5-tuple information, Table 4 shows example descriptions of the second traffic flow template.

TABLE 4

| Traffic flow template TFT | Path identifier ID |
| --- | --- |
| First target traffic flow template: {(192.168.1.1: 10000, 121.14.88.76: 80, GTP-U), (192.168.1.1: 10000, 121.14.88.77: 80, GTP-U), . . . } | Path ID 1 |
| Second target traffic flow template: {(192.168.1.2: 10000, 121.14.88.76: 80, GTP-U), (192.168.1.2: 10000, 121.14.88.77: 80, GTP-U), . . . } | Path ID 2 |
| Third target traffic flow template: {(192.168.1.3: 10000, 121.14.88.76: 80, GTP-U), (192.168.1.3: 10000, 121.14.88.77: 80, GTP-U), . . . } | Path ID 3 |

If the AN node currently receives 15 data packets, based on Table 4, when IP 5-tuple information in the 15 data packets appears in the second traffic flow template shown in Table 4, the data packets are data packets sent by the local network; and when IP 5-tuple information does not appear in the second traffic flow template shown in Table 4, the data packets are Internet data packets. It is assumed that the AN node identifies that there are ten data packets sent by the local network and five Internet packets.

1816. The AN node sends the identified data packet to the UE based on the flow handover indication message by using the target DRB.

The AN node sends, based on the flow handover indication message, the identified data packet to the UE by using the target DRB. To be specific, the AN node sends the five Internet data packets to the UE by using the first DRB, and sends, to the UE by using the second DRB, the ten data packets sent by the local network.

It should be noted that there is no limitation on a time sequence of steps 1815 and 1816 and a time sequence of steps 1803 to 1814.

1817. The AN node sorts, based on the end marker, one or more downlink data packets received on the target user plane path.

It should be understood that before receiving the end marker, the AN node buffers the one or more downlink data packets received on the target user plane path. After receiving the end marker, the AN node sorts, based on a sequence number in the end marker, the one or more downlink data packets received on the target user plane path, and further sends sorted one or more downlink data packets to the UE by using the second DRB. In addition, the AN node needs to delete the second traffic flow template.

In this embodiment of this application, the UP GW determines, by using an end data packet and/or whether a timer expires, when the UP GW to send the end marker, to assist the target AN node in sorting one or more downlink data packets. Further, on an air interface, an air-interface data bearer is separately used for the local data flow, and the AN node can temporarily support the TFT to identify the local data flow. When a path resource on the AN node is created, the flow handover indication message is sent, and the flow handover indication message is used to instruct the AN node to send, to the UE based on the traffic flow template and the ID of the source user plane path by using the target DRB, the data packet that is sent by the local network and that is received by the AN node on the source user plane path. In this case, the AN node may sort, based on the received end marker, one or more downlink data packets received on the target user plane path, that is, the AN node can determine a time for activating the one or more downlink data packets received on the target user plane path, so as to resolve a packet disorder problem caused because the AN node cannot identify the local data flow on the path to be handed over.

Figure 19:
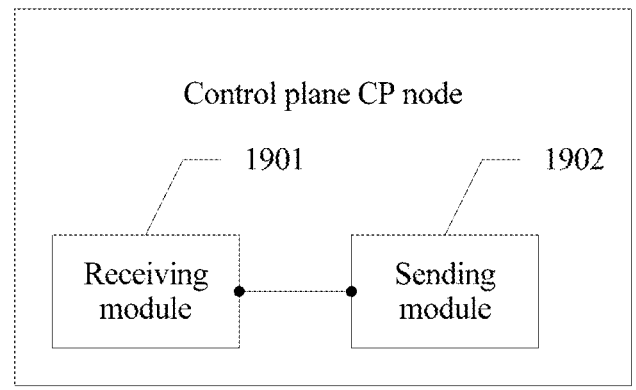
FIG. 19 is a schematic diagram of an embodiment of a control plane CP node according to an embodiment of this application.

The end marker sending methods in the embodiments of this application are described above. The CP node, the UP GW, the access GW, and the AN node in the embodiments of this application are separately described below. FIG. 19 is a schematic diagram of an embodiment of a control plane CP node according to an embodiment of this application, and the CP node includes:

a receiving module 1901, configured to receive a session update response, where the session update response includes an identifier ID of a source user plane path of user equipment UE or an ID of a target user plane path of the UE, and the source user plane path includes a user plane gateway UP GW; and a sending module 1902, configured to send trigger information and the ID of the source user plane path to the UP GW based on the session update response, where the trigger information is used by the UP GW to send an end marker to an access network AN node on the source user plane path.

The CP node shown in FIG. 19 may be configured to perform the method shown in any one of FIG. 11 to FIG. 18B, and a same or corresponding technical feature of the CP node may be cited in this embodiment.

Optionally, in some embodiments of this application, the trigger information includes at least one of a first traffic flow template and a timer parameter.

Optionally, in some embodiments of this application, the sending module 1902 is further configured to send a flow handover indication message to the AN node. The flow handover indication message includes the ID of the source user plane path, and the flow handover indication message is used to instruct the AN node to determine, when the end marker is received, whether one or more downlink data packets received by the AN node on the source user plane path are successfully sent to the UE.

Optionally, in some embodiments of this application, the sending module 1902 is further configured to send a first flow handover indication message to the AN node. The first flow handover indication message includes the ID of the source user plane path, and the first flow handover indication message is used to instruct the AN node to send a downlink data packet received by the AN node on the source user plane path to the UP GW.

The sending module 1902 is further configured to send a second flow handover indication message to the UP GW. The second flow handover indication message includes the ID of the source user plane path and a second traffic flow template, and the second flow handover indication message is used to instruct the UP GW to identify, based on the second traffic flow template and the ID of the source user plane path, a data packet sent by a local network from one or more downlink data packets received by the UP GWs on the source user plane path, and send the identified data packet to an edge gateway. The edge gateway is located on the target user plane path.

Optionally, in some embodiments of this application, the sending module 1902 is further configured to send a flow handover indication message to the AN node. The flow handover indication message includes a second traffic flow template and the ID of the source user plane path, and the flow handover indication message is used to instruct the AN node to identify, based on the second traffic flow template and the ID of the source user plane path, a data packet sent by a local network from the one or more downlink data packets received by the AN node on the source user plane path, and send the identified data packet to the UE by using a target DRB. The target DRB is a transmission path between the UE and the AN node on the target user plane path.

Figure 20:
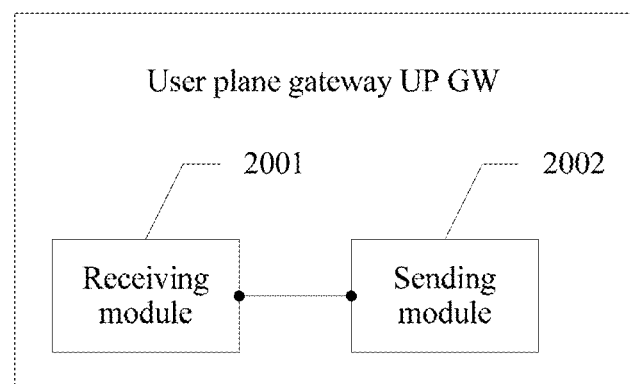
FIG. 20 is a schematic diagram of an embodiment of a user plane gateway UP GW according to an embodiment of this application.

FIG. 20 is a schematic diagram of an embodiment of a user plane gateway UP GW according to an embodiment of this application, and the UP GW includes:

a receiving module 2001, configured to receive trigger information/an identifier ID of a source user plane path of user equipment UE that is sent by a control plane CP node, where the UP GW is located on the source user plane path; and a sending module 2002, configured to send an end marker to an access network AN node on the source user plane path based on the trigger information and the ID of the source user plane path.

The UP GW shown in FIG. 20 may be configured to perform the method shown in any one of FIG. 11 to FIG. 18B, and a same or corresponding technical feature of the UP GW may be cited in this embodiment.

Optionally, in some embodiments of this application, the trigger information includes at least one of a first traffic flow template and a timer parameter.

Optionally, in some embodiments of this application, the trigger information includes the first traffic flow template. The sending module 2002 is specifically configured to: when IP 5-tuple information of a downlink data packet for the UE that is received by the UP GW is the same as any IP 5-tuple information in the first traffic flow template, send, by the sending module, the end marker to the AN node on the source user plane path based on the ID of the source user plane path.

Optionally, in some embodiments of this application, the trigger information includes the timer parameter.

The sending module 2002 is specifically configured to: set a timer based on the timer parameter; start the timer; and when the timer expires, send, by the sending module, the end marker to the AN node on the source user plane path based on the ID of the source user plane path.

Optionally, in some embodiments of this application, the trigger information includes the first traffic flow template and the timer parameter.

The sending module 2002 is specifically configured to start a timer when IP 5-tuple information of a downlink data packet for the UE that is received by the UP GW is the same as any IP 5-tuple information in the first traffic flow template, where the timer is set based on the timer parameter.

restart, by the sending module, the timer if the UP GW receives an end data packet and the timer does not expire, where IP 5-tuple information of the end data packet is the same as any IP 5-tuple information in the first traffic flow template; and when the timer expires, send, by the sending module, the end marker to the AN node based on the ID of the source user plane path.

Figure 21:
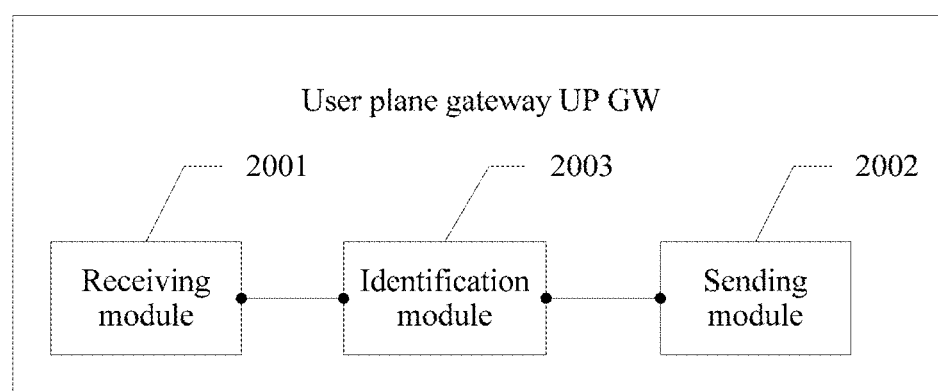
FIG. 21 is a schematic diagram of another embodiment of a user plane gateway UP GW according to an embodiment of this application.

Optionally, in some embodiments of this application, based on the UP GW shown in FIG. 20, FIG. 21 is a schematic diagram of another embodiment of a UP GW according to an embodiment of this application. The UP GW further includes an identification module 2003.

The receiving module 2001 is further configured to receive a flow handover indication message sent by the CP node. The flow handover indication message includes the ID of the source user plane path and a second traffic flow template.

The identification module 2003 is further configured to identify, based on the second traffic flow template and the ID of the source user plane path, a data packet sent by a local network from one or more downlink data packets sent by the AN node that are received on the source user plane path.

The sending module 2002 is further configured to send the identified data packet to an edge gateway. The edge gateway is located on a target user plane path of the UE.

Figure 22:
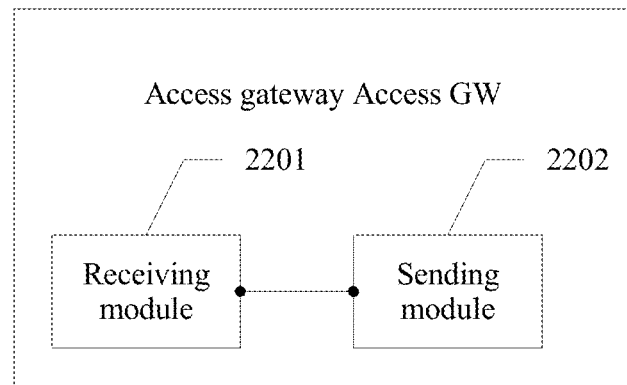
FIG. 22 is a schematic diagram of an embodiment of an access gateway access GW according to an embodiment of this application.

FIG. 22 is a schematic diagram of an embodiment of an access gateway access GW according to an embodiment of this application, and the access GW includes:

a receiving module 2201, configured to receive a path handover notification, where the path handover notification includes a traffic flow template; and a sending module 2202, configured to send an end data packet to a UP GW based on the traffic flow template.

The access gateway shown in FIG. 22 may be configured to perform the method shown in any one of FIG. 11 to FIG. 18B, and a same or corresponding technical feature of the access gateway may be cited in this embodiment.

Optionally, in some embodiments of this application, the receiving module 2201 is specifically configured to receive the path handover notification sent by an edge gateway or a local management unit.

Figure 23:
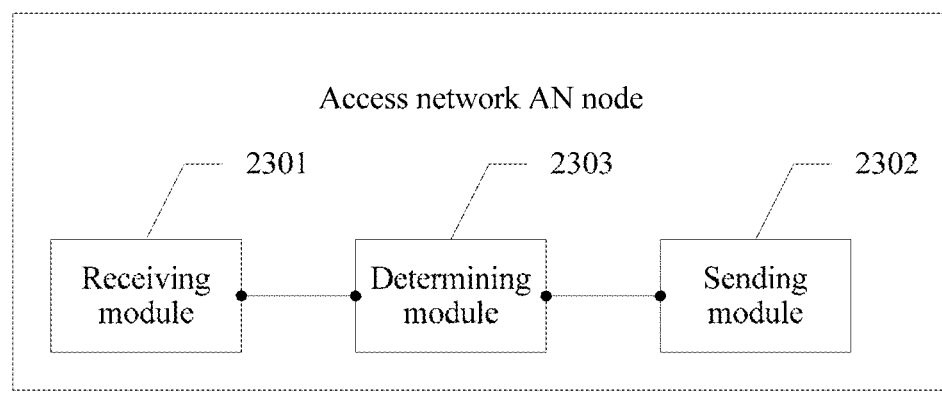
FIG. 23 is a schematic diagram of an embodiment of an access network AN node according to an embodiment of the present invention.

FIG. 23 is a schematic diagram of an embodiment of an access network AN node according to an embodiment of this application, and the AN node includes:

a receiving module 2301, configured to receive a flow handover indication message sent by a control plane CP node, where the flow handover indication message includes an identifier ID of a source user plane path of user equipment UE, and the flow handover indication message is used to instruct the AN node to determine, when an end marker on the source user plane path is received, whether one or more downlink data packets received by the AN node on the source user plane path are successfully sent to the UE;

a determining module 2302, configured to: when the AN node receives the end marker on the source user plane path, determine whether the one or more downlink data packets received by the AN node on the source user plane path are successfully sent to the UE; and a sending module 2303, configured to: if the one or more downlink data packets received by the AN node on the source user plane path are successfully sent to the UE, sort, based on the end marker, one or more downlink data packets received by the AN node on a target user plane path of the UE.

The AN node shown in FIG. 23 may be configured to perform the method shown in any one of FIG. 11 to FIG. 18B, and a same or corresponding technical feature of the AN node may be cited in this embodiment.

Optionally, in some embodiments of this application, the sending module 2303 is further configured to: if at least one data packet in the one or more downlink data packets received by the AN node on the source user plane path fails to be sent to the UE, send the at least one data packet to the UE.

Figure 24:
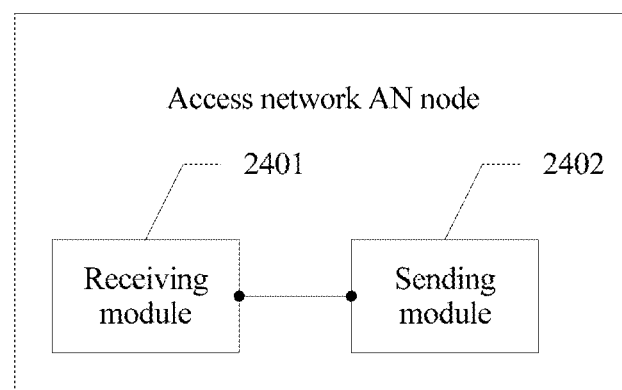
FIG. 24 is a schematic diagram of another embodiment of an access network AN node according to an embodiment of the present invention.

FIG. 24 is a schematic diagram of another embodiment of an access network AN node according to an embodiment of this application, and the AN node includes:

a receiving module 2401, configured to receive a flow handover indication message from a control plane CP node, where the flow handover indication message includes an identifier ID of a source user plane path of user equipment UE; and a sending module 2402, configured to send, based on the flow handover indication message, one or more downlink data packets received by the AN node on the source user plane path, where the source user plane path includes a user plane gateway UP GW.

The AN node shown in FIG. 24 may be configured to perform the method shown in any one of FIG. 11 to FIG. 18B, and a same or corresponding technical feature of the AN node may be cited in this embodiment.

Optionally, in some embodiments of this application, the flow handover indication message is used to instruct the AN node to send the one or more downlink data packets received by the AN node on the source user plane path to the UP GW.

The sending module 2402 is specifically configured to send, based on the flow handover indication message, the one or more downlink data packets received by the AN node on the source user plane path to the UP GW.

Optionally, in some embodiments of this application, the flow handover indication message further includes a traffic flow template. The flow handover indication message is used to instruct the AN node to send, to the UE based on the traffic flow template and the ID of the source user plane path by using a target DRB, a data packet that is sent by a local network and that is received by the AN node on the source user plane path. The target DRB is a transmission path between the UE and the AN node on a target user plane path of the UE.

The sending module 2402 is specifically configured to: identify, based on the traffic flow template, the data packet sent by the local network; and send the identified data packet to the UE based on the flow handover indication message and the ID of the source user plane path by using the target DRB.

Figure 25:
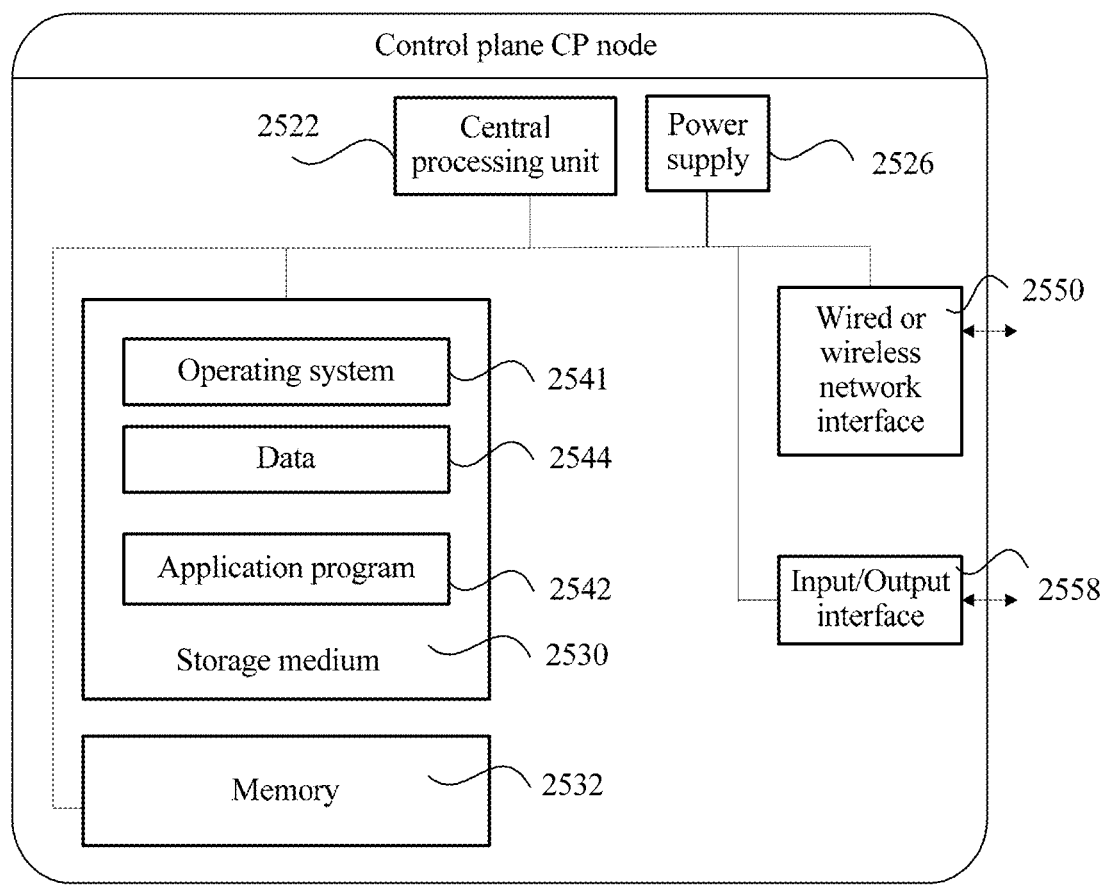
FIG. 25 is a schematic diagram of another embodiment of a control plane CP node according to an embodiment of this application.

FIG. 25 is a schematic diagram of another embodiment of a control plane CP node according to an embodiment of this application.

A relatively large difference may be caused between CP nodes due to a difference in configuration or performance. The CP node may include one or more central processing units (CPUs) 2522 (for example, one or more processors) and a memory 2532, and one or more storage application programs 2542 or a storage medium 2530 (for example, one or more mass storage devices) of data 2544. The memory 2532 and the storage medium 2530 may be transitory storage or persistent storage. A program stored in the storage medium 2530 may include one or more modules (not shown in the figure), and each module may include a series of instructions and operations to be performed on the CP node. Further, the central processing unit 2522 may be configured to communicate with the storage medium 2530, and perform, on the CP node, the series of instructions and operations in the storage medium 2530.

The CP node may further include one or more power supplies 2526, one or more wired or wireless network interfaces 2550, one or more input/output interfaces 2558, and/or one or more operating systems 2541, for example, Windows Server™, Mac OS X™, Unix™, Linux™, and FreeBSD™.

Steps performed by the CP node in the foregoing embodiment may be based on the structure of the CP node shown in FIG. 25.

Figure 26:
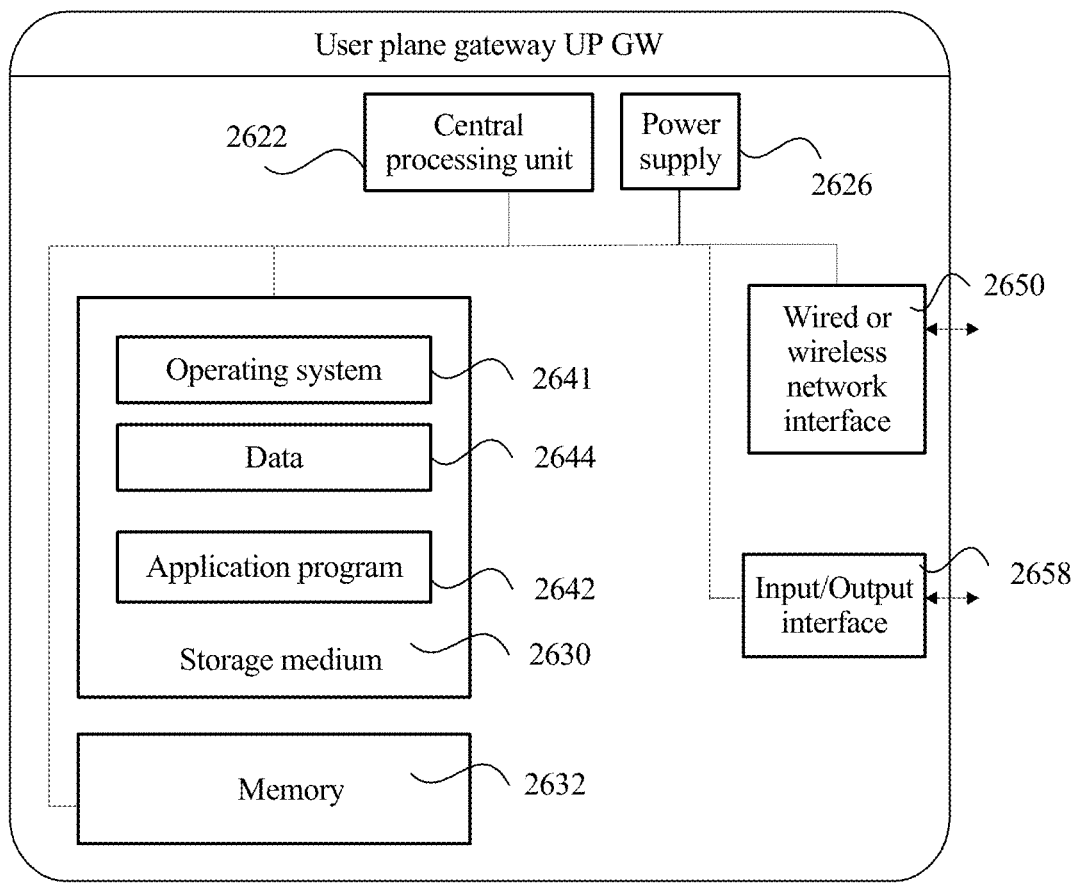
FIG. 26 is a schematic diagram of another embodiment of a user plane gateway UP GW according to an embodiment of this application.

FIG. 26 is a schematic diagram of another embodiment of a user plane gateway UP GW according to an embodiment of this application.

A relatively large difference may be caused between UP GWs due to a difference in configuration or performance. The UP GW may include one or more central processing units (CPUs) 2622 (for example, one or more processors) and a memory 2632, and one or more storage application programs 2642 or a storage medium 2630 (for example, one or more mass storage devices) of data 2644. The memory 2632 and the storage medium 2630 may be transitory storage or persistent storage. A program stored in the storage medium 2630 may include one or more modules (not shown in the figure), and each module may include a series of instructions and operations to be performed on the UP GW. Further, the central processing unit 2622 may be configured to communicate with the storage medium 2630, and perform, on the UP GW, the series of instructions and operations in the storage medium 2630.

The UP GW may further include one or more power supplies 2626, one or more wired or wireless network interfaces 2650, one or more input/output interfaces 2658, and/or one or more operating systems 2641, for example, Windows Server™, Mac OS X™, Unix™, Linux™, and FreeBSD™.

Steps performed by the UP GW in the foregoing embodiment may be based on the structure of the UP GW shown in FIG. 26.

Figure 27:
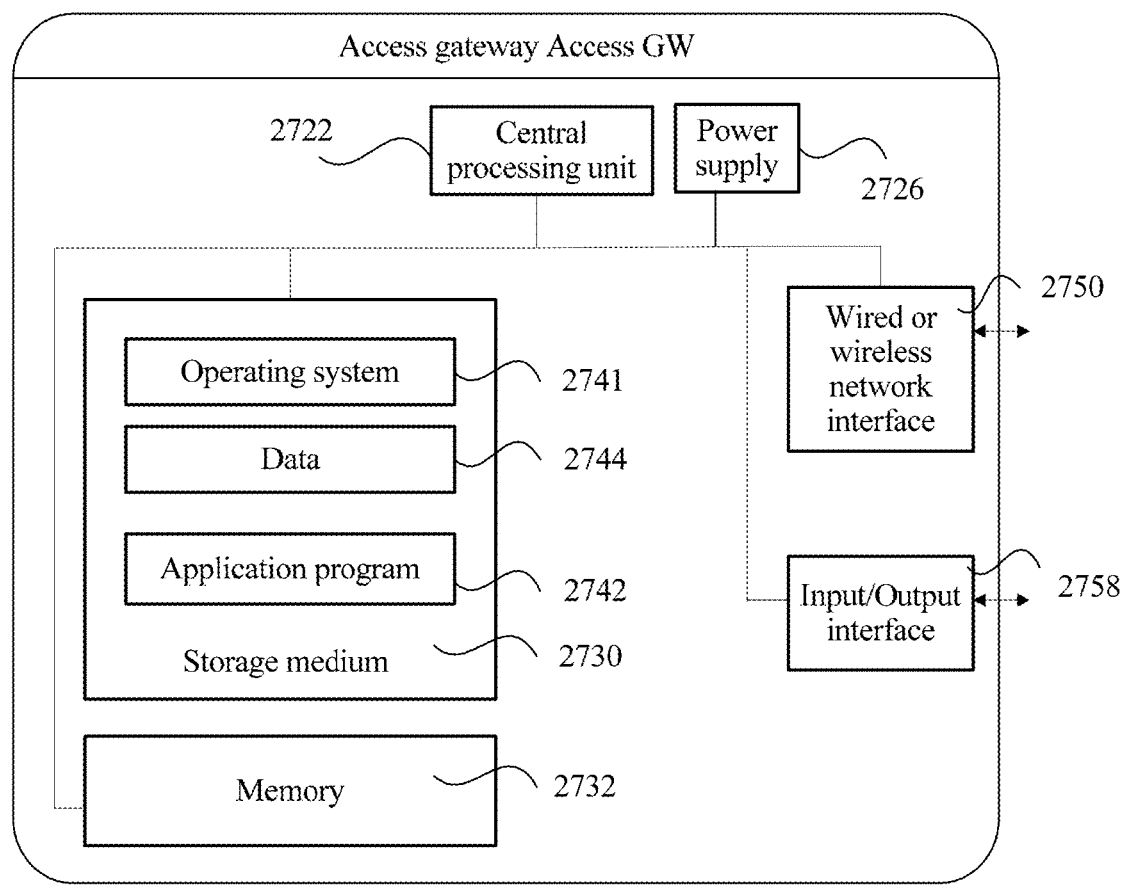
FIG. 27 is a schematic diagram of another embodiment of an access gateway access GW according to an embodiment of this application.

FIG. 27 is a schematic diagram of another embodiment of an access gateway access GW according to an embodiment of this application.

A relatively large difference may be caused between access GWs due to a difference in configuration or performance. The access GW may include one or more central processing units (CPUs) 2722 (for example, one or more processors) and a memory 2732, and one or more storage application programs 2742 or a storage medium 2730 (for example, one or more mass storage devices) of data 2744. The memory 2732 and the storage medium 2730 may be transitory storage or persistent storage. A program stored in the storage medium 2730 may include one or more modules (not shown in the figure), and each module may include a series of instructions and operations to be performed on the access GW. Further, the central processing unit 2722 may be configured to communicate with the storage medium 2730, and perform, on the access GW, the series of instructions and operations in the storage medium 2730.

The access GW may further include one or more power supplies 2727, one or more wired or wireless network interfaces 2750, one or more input/output interfaces 2758, and/or one or more operating systems 2741, for example, Windows Server™, Mac OS X™, Unix™, Linux™, and FreeBSD™.

Steps performed by the access GW in the foregoing embodiment may be based on the structure of the access GW shown in FIG. 27.

Figure 28:
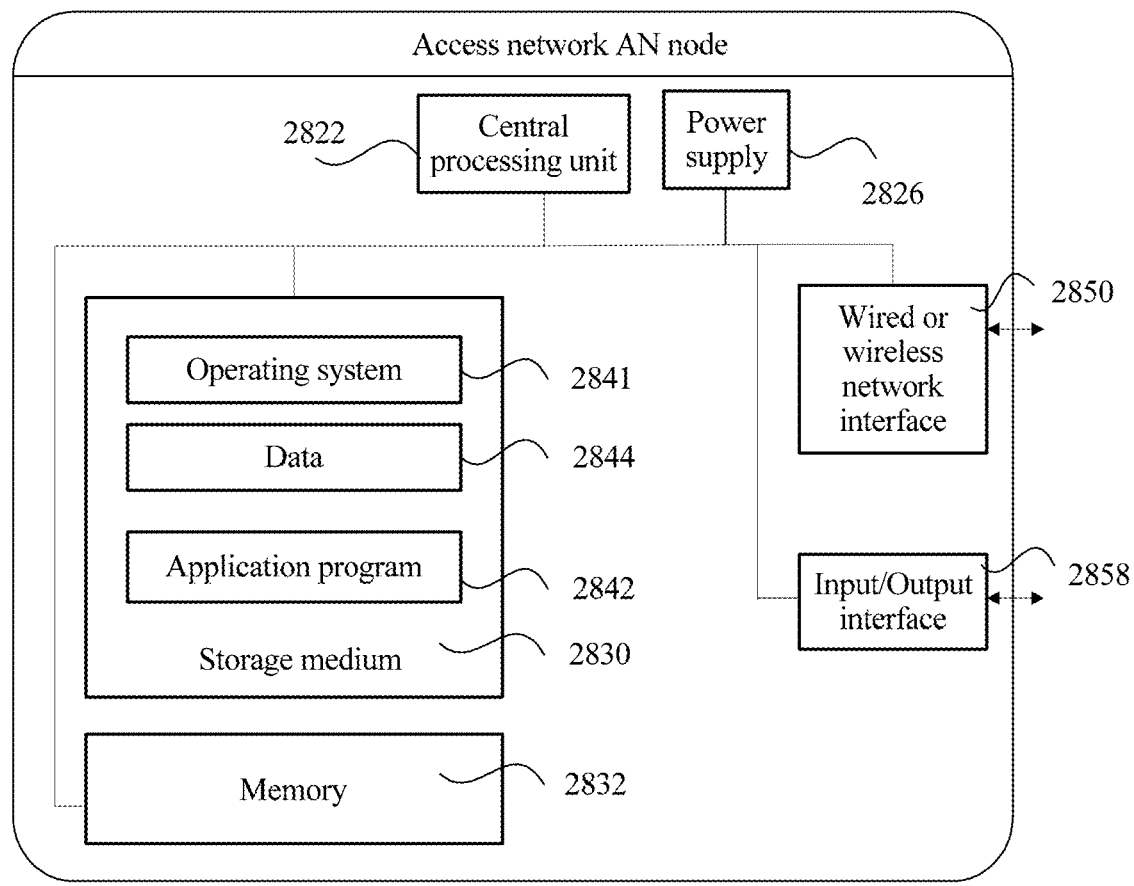
FIG. 28 is a schematic diagram of another embodiment of an access network AN node according to an embodiment of the present invention.

FIG. 28 is a schematic diagram of another embodiment of an access network AN node according to an embodiment of this application.

A relatively large difference may be caused between AN nodes due to a difference in configuration or performance. The AN node may include one or more central processing units (CPUs) 2822 (for example, one or more processors) and a memory 2832, and one or more storage application programs 2842 or a storage medium 2830 (for example, one or more mass storage devices) of data 2844. The memory 2832 and the storage medium 2830 may be transitory storage or persistent storage. A program stored in the storage medium 2830 may include one or more modules (not shown in the figure), and each module may include a series of instruction and operations for the AN node. Further, the central processing unit 2822 may be configured to communicate with the storage medium 2830, and perform, on the AN node, the series of instructions and operations in the storage medium 2830.

The AN node may further include one or more power supplies 2828, one or more wired or wireless network interfaces 2850, one or more input/output interfaces 2858, and/or one or more operating systems 2841, for example, Windows Server™, Mac OS X™, Unix™, Linux™, and FreeBSD™.

Steps performed by the AN node in the foregoing embodiment may be based on the structure of the AN node shown in FIG. 28.

Optionally, in some embodiments of this application, a computer program product including an instruction is provided. When the instruction runs on a computer, the computer performs the method shown in any one of FIG. 11 to FIG. 18B performed by the CP node. A same or corresponding technical feature of the CP node may be cited in this embodiment.

Optionally, in some embodiments of this application, a computer program product including an instruction is provided. When the instruction runs on a computer, the computer performs the method shown in any one of FIG. 11 to FIG. 18B performed by the UP GW. A same or corresponding technical feature of the UP GW may be cited in this embodiment.

Optionally, in some embodiments of this application, a computer program product including an instruction is provided. When the instruction runs on a computer, the computer performs the method shown in any one of FIG. 11 to FIG. 18B performed by the access gateway. A same or corresponding technical feature of the access gateway may be cited in this embodiment.

Optionally, in some embodiments of this application, a computer program product including an instruction is provided. When the instruction runs on a computer, the computer performs the method shown in any one of FIG. 11 to FIG. 18B performed by the AN node. A same or corresponding technical feature of the AN node may be cited in this embodiment.

Optionally, in some embodiments of this application, a computer program product including an instruction is provided. When the instruction runs on a computer, the computer performs the method shown in any one of FIG. 11 to FIG. 18B performed by the AN node. A same or corresponding technical feature of the AN node may be cited in this embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include", "comprise" and any other variants mean to cover the non-exclusive inclusion, for example, a process, method, system, product, or device that includes a list of steps or units is not necessarily limited to those expressly listed units, but may include other units not expressly listed or inherent to such a process, method, system, product, or device.

What is claimed is:

1. An end marker sending method, the method comprising:
   receiving, by a control plane (CP) node, a session update response, wherein the session update response comprises an identifier (ID) of a source user plane path of user equipment (UE) or an ID of a target user plane path of the UE, and wherein the source user plane path comprises a user plane gateway (UP GW);
   sending, by the CP node, trigger information and the ID of the source user plane path to the UP GW based on the session update response, wherein the trigger information is used by the UP GW to send an end marker to an access network (AN) node on the source user plane path, and wherein the trigger information indicates to the UP GW when to send the end marker;
   sending, by the CP node, a first flow handover indication message to the AN node, wherein the first flow handover indication message comprises the ID of the source user plane path, and wherein the first flow handover indication message is used to instruct the AN node to send a downlink data packet received by the AN node on the source user plane path to the UP GW; and
   sending, by the CP node, a second flow handover indication message to the UP GW, wherein the second flow handover indication message comprises the ID of the source user plane path and a second traffic flow template, and
   wherein the second flow handover indication message is used to instruct the UP GW to:
      identify, based on the second traffic flow template and the ID of the source user plane path, a data packet sent by a local network from one or more downlink data packets received by the UP GW on the source user plane path; and
      send the identified data packet to an edge gateway, wherein the edge gateway is located on the target user plane path.

2. The method according to claim 1, wherein the trigger information comprises at least one of a first traffic flow template or a timer parameter.

3. An end marker sending method, the method comprising:
   receiving, by a user plane gateway (UP GW), trigger information and an identifier (ID) of a source user plane path of user equipment (UE) from a control plane (CP) node, wherein the UP GW is located on the source user plane path, and wherein the trigger information indicates to the UP GW when to send the end marker; and
   sending, by the UP GW, an end marker to an access network (AN) node on the source user plane path based on the trigger information and the ID of the source user plane path,
   wherein the trigger information comprises a timer parameter, and
   wherein the sending, by the UP GW, an end marker to an AN node on the source user plane path based on the trigger information and the ID of the source user plane path comprises:
      setting, by the UP GW, a timer based on the timer parameter;
      starting, by the UP GW, the timer; and
      when the timer expires, sending, by the UP GW, the end marker to the AN node on the source user plane path based on the ID of the source user plane path.

4. The method according to claim 3, wherein the trigger information comprises at least one of a first traffic flow template and a timer parameter.

5. The method according to claim 4, wherein the trigger information comprises the first traffic flow template; and wherein the sending, by the UP GW, an end marker to an AN node on the source user plane path based on the trigger information and the ID of the source user plane path comprises:
    when IP 5-tuple information of a downlink data packet for the UE that is received by the UP GW is the same as any IP 5-tuple information in the first traffic flow template, sending, by the UP GW, the end marker to the AN node on the source user plane path based on the ID of the source user plane path.

6. The method according to claim 3, wherein the method further comprises:
    receiving, by the UP GW, a flow handover indication message from the CP node, wherein the flow handover indication message comprises the ID of the source user plane path and a second traffic flow template;
    identifying, by the UP GW and based on the second traffic flow template and the ID of the source user plane path, a data packet sent by a local network from one or more downlink data packets that are sent by the AN node and that are received on the source user plane path; and
    sending, by the UP GW, the identified data packet to an edge gateway, wherein the edge gateway is located on a target user plane path of the UE.

7. An end marker sending method, the method comprising:
    receiving, by a control plane (CP) node, a session update response, wherein the session update response comprises an identifier (ID) of a source user plane path of user equipment (UE) or an ID of a target user plane path of the UE, and wherein the source user plane path comprises a user plane gateway (UP GW);
    sending, by the CP node, trigger information and the ID of the source user plane path to the UP GW based on the session update response, and wherein the trigger information indicates to the UP GW when to send the end marker;
    sending, by the UP GW, an end marker to an access network (AN) node on the source user plane path based on the trigger information and the ID of the source user plane path;
    sending, by the CP node, a first flow handover indication message to the AN node, wherein the first flow handover indication message comprises the ID of the source user plane path, and wherein the first flow handover indication message is used to instruct the AN node to send a downlink data packet received by the AN node on the source user plane path to the UP GW; and
    sending, by the CP node, a second flow handover indication message to the UP GW, wherein the second flow handover indication message comprises the ID of the source user plane path and a second traffic flow template, and
    wherein the second flow handover indication message is used to instruct the UP GW to:
        identify, based on the second traffic flow template and the ID of the source user plane path, a data packet sent by a local network from the one or more downlink data packets received by the UP GW on the source user plane path; and
        send the identified data packet to an edge gateway, wherein the edge gateway is located on the target user plane path.

8. The method according to claim 7, wherein the trigger information comprises at least one of a first traffic flow template or a timer parameter.

9. The method according to claim 8, wherein the trigger information comprises the first traffic flow template; and
    wherein the sending, by the UP GW, an end marker to an AN node on the source user plane path based on the trigger information and the ID of the source user plane path comprises:
        when IP 5-tuple information of a downlink data packet for the UE that is received by the UP GW is the same as any IP 5-tuple information in the first traffic flow template, sending, by the UP GW, the end marker to the AN node on the source user plane path based on the ID of the source user plane path.

10. The method according to claim 8, wherein the trigger information comprises the timer parameter, and
    wherein the sending, by the UP GW, an end marker to an AN node on the source user plane path based on the trigger information and the ID of the source user plane path comprises:
        setting, by the UP GW, a timer based on the timer parameter;
        starting, by the UP GW, the timer; and
        when the timer expires, sending, by the UP GW, the end marker to the AN node on the source user plane path based on the ID of the source user plane path.

11. The method according to claim 7, wherein the method further comprises:
    receiving, by the UP GW, a flow handover indication message from the CP node, wherein the flow handover indication message comprises the ID of the source user plane path and a second traffic flow template;
    identifying, by the UP GW and based on the second traffic flow template and the ID of the source user plane path, a data packet sent by a local network from one or more downlink data packets that are sent by the AN node and that are received on the source user plane path; and
    sending, by the UP GW, the identified data packet to an edge gateway, wherein the edge gateway is located on a target user plane path of the UE.

12. The method according to claim 7, wherein the method further comprises:
    receiving, by the AN node, the end marker from the UP GW.

13. The method according to claim 12, wherein the method further comprises:
    sorting, by the AN node, one or more downlink data packets received on the target user plane path based on the end marker.

\* \* \* \* \*